US010482292B2

(12) United States Patent
Clouser et al.

(10) Patent No.: US 10,482,292 B2
(45) Date of Patent: Nov. 19, 2019

(54) RFID SCANNING DEVICE

(71) Applicant: Gary L. Sharpe, Naples, FL (US)

(72) Inventors: Doug Clouser, Galloway, OH (US); Kurt Wolf, Circleville, OH (US); Gary L. Sharpe, Naples, FL (US); Brian Dutro, Columbus, OH (US)

(73) Assignee: Gary L. Sharpe, Naples, FL (US)

( * ) Notice: Subject to any disclaimer, the term of this patent is extended or adjusted under 35 U.S.C. 154(b) by 0 days.

(21) Appl. No.: 15/724,218

(22) Filed: Oct. 3, 2017

(65) Prior Publication Data

US 2019/0272396 A1    Sep. 5, 2019

Related U.S. Application Data

(60) Provisional application No. 62/403,319, filed on Oct. 3, 2016, provisional application No. 62/465,329, filed on Mar. 1, 2017.

(51) Int. Cl.
*G06K 7/10* (2006.01)
*G06Q 10/08* (2012.01)

(52) U.S. Cl.
CPC ....... *G06K 7/10316* (2013.01); *G06Q 10/087* (2013.01)

(58) Field of Classification Search
CPC .................................................. G06K 7/10316
USPC .................................. 235/381, 383, 384.385
See application file for complete search history.

(56) References Cited

U.S. PATENT DOCUMENTS

| 4,884,827 A | 12/1989 | Kelley |
| 5,713,485 A | 2/1998 | Liff et al. |
| 5,930,145 A | 7/1999 | Yuyama et al. |
| 5,963,134 A | 10/1999 | Bowers et al. |
| 5,986,662 A | 11/1999 | Argiro et al. |
| 6,112,502 A | 9/2000 | Frederick et al. |

(Continued)

FOREIGN PATENT DOCUMENTS

| CA | 2722328 | 10/2009 |
| CA | 2722328 A1 | 10/2009 |

(Continued)

OTHER PUBLICATIONS

Barlas, Stephen, "Pharmacy Product Tracing Likely to Go National—Costs to Pharmacies Worrisome", Pharmacy & Therapeutics, Jan. 2009, vol. 34 No. 1, p. 14.

(Continued)

*Primary Examiner* — Allyson N Trail
(74) *Attorney, Agent, or Firm* — Standley Law Group LLP; Jeffrey Standley; Jeffrey Norris

(57) ABSTRACT

Systems, devices and methods for performing inventory management using RFID technology. The system includes a box for receiving one or more items containing RFID tags. Items are scanned against a baseline content data to confirm all items are present and whether any items have expired. The box has security features to prevent unauthorized access to its contents and create an audit trail of access. Access to the box may be granted when a user presents an authorized RFID-enabled card, wrist band, or other item. Multiple locking features provide for additional security. Scanning, authorization, and notification functions may be controlled locally by a processing unit contained within the box itself or remotely by an outside server.

19 Claims, 36 Drawing Sheets

(56) References Cited

U.S. PATENT DOCUMENTS

| | | |
|---|---|---|
| 6,189,727 B1 | 2/2001 | Shoenfeld |
| 6,249,299 B1 | 6/2001 | Tainer |
| 6,275,157 B1 | 8/2001 | Mays et al. |
| 6,294,999 B1 | 9/2001 | Yarin et al. |
| 6,330,351 B1 | 12/2001 | Yasunaga |
| 6,574,166 B2 | 6/2003 | Niemiec |
| 6,632,619 B1 | 10/2003 | Harrison et al. |
| 6,771,369 B2 | 8/2004 | Rzasa et al. |
| 6,825,864 B2 | 11/2004 | Botten et al. |
| 6,847,861 B2 | 1/2005 | Lunak et al. |
| 6,851,615 B2 | 2/2005 | Jones |
| 6,861,954 B2 | 3/2005 | Levin |
| 6,877,658 B2 | 4/2005 | Raistrick et al. |
| 6,879,876 B2 | 4/2005 | O'Dougherty et al. |
| 6,899,626 B1 | 5/2005 | Luciano et al. |
| 6,900,021 B1 | 5/2005 | Harrison et al. |
| 6,933,849 B2 | 8/2005 | Sawyer |
| 6,935,560 B2 | 8/2005 | Andreasson et al. |
| 6,952,681 B2 | 10/2005 | McQuade et al. |
| 6,985,870 B2 | 1/2006 | Martucci et al. |
| 6,992,574 B2 | 1/2006 | Aupperle et al. |
| 6,994,249 B2 | 2/2006 | Peterka et al. |
| 7,036,729 B2 | 5/2006 | Chung |
| 7,061,831 B2 | 6/2006 | De La Huerga |
| 7,111,780 B2 | 9/2006 | Broussard et al. |
| 7,116,343 B2 | 10/2006 | Botten et al. |
| 7,118,029 B2 | 10/2006 | Nycz et al. |
| 7,140,542 B2 | 11/2006 | Andreasson et al. |
| 7,146,247 B2 | 12/2006 | Kirsch et al. |
| 7,151,456 B2 | 12/2006 | Godfrey |
| 7,158,030 B2 | 1/2007 | Chung |
| 7,165,077 B2 | 1/2007 | Kalies |
| 7,175,081 B2 | 2/2007 | Andreasson et al. |
| 7,177,721 B2 | 2/2007 | Kirsch et al. |
| 7,178,729 B2 | 2/2007 | Shaffer et al. |
| 7,182,256 B2 | 2/2007 | Andreasson et al. |
| 7,212,100 B2 | 5/2007 | Terenna |
| 7,212,127 B2 | 5/2007 | Jacober et al. |
| 7,227,469 B2 | 6/2007 | Varner et al. |
| 7,232,066 B2 | 6/2007 | Andreasson et al. |
| 7,253,736 B2 | 8/2007 | Tethrake et al. |
| 7,256,699 B2 | 8/2007 | Tethrake et al. |
| 7,263,501 B2 | 8/2007 | Tirinato et al. |
| 7,264,323 B2 | 9/2007 | Tainer et al. |
| 7,268,684 B2 | 9/2007 | Tethrake et al. |
| 7,275,645 B2 | 10/2007 | Mallett et al. |
| 7,299,981 B2 | 11/2007 | Hickle et al. |
| 7,316,231 B2 | 1/2008 | Hickle |
| 7,317,393 B2 | 1/2008 | Maloney |
| 7,318,529 B2 | 1/2008 | Mallett et al. |
| 7,341,147 B2 | 3/2008 | Mallett et al. |
| 7,348,884 B2 | 3/2008 | Higham |
| 7,354,884 B2 | 4/2008 | Hada et al. |
| 7,362,228 B2 | 4/2008 | Nycz et al. |
| 7,375,737 B2 | 5/2008 | Botten et al. |
| 7,394,383 B2 | 7/2008 | Hager et al. |
| 7,440,818 B2 | 10/2008 | Handfield et al. |
| 7,446,747 B2 | 11/2008 | Youngblood et al. |
| 7,454,880 B1 | 11/2008 | Austin et al. |
| 7,486,188 B2 | 2/2009 | Van Alstyne |
| 7,492,257 B2 | 2/2009 | Tethrake et al. |
| 7,492,261 B2 | 2/2009 | Cambre et al. |
| 7,504,954 B2 | 3/2009 | Spaeder |
| 7,518,502 B2 | 4/2009 | Austin et al. |
| 7,518,516 B2 | 4/2009 | Azevedo et al. |
| 7,551,089 B2 | 6/2009 | Sawyer |
| 7,559,483 B2 | 7/2009 | Hickle et al. |
| 7,564,364 B2 | 7/2009 | Zweig |
| 7,596,427 B1 | 9/2009 | Frederick et al. |
| 7,630,791 B2 | 12/2009 | Nguyen et al. |
| 7,639,136 B1 | 12/2009 | Wass et al. |
| 7,644,016 B2 | 1/2010 | Nycz et al. |
| 7,672,872 B2 | 3/2010 | Shanton |
| 7,706,915 B2 | 4/2010 | Mohapatra et al. |
| 7,706,916 B2 | 4/2010 | Hilton |
| 7,712,670 B2 | 5/2010 | Sauerwein, Jr. et al. |
| 7,715,277 B2 | 5/2010 | De La Huerga |
| 7,729,597 B2 | 6/2010 | Wright et al. |
| 7,734,157 B2 | 6/2010 | Wright et al. |
| 7,735,732 B2 * | 6/2010 | Linton ................ G07G 1/0045 235/383 |
| 7,747,477 B1 | 6/2010 | Louie et al. |
| 7,752,085 B2 | 7/2010 | Monroe |
| 7,772,964 B2 | 8/2010 | Tethrake et al. |
| 7,775,056 B2 | 8/2010 | Lowenstein |
| 7,783,163 B2 | 8/2010 | Wright et al. |
| 7,783,174 B2 | 8/2010 | Wright et al. |
| 7,801,422 B2 | 9/2010 | Wright et al. |
| 7,815,117 B2 | 10/2010 | Tuschel et al. |
| 7,834,765 B2 | 11/2010 | Sawyer |
| 7,834,766 B2 | 11/2010 | Sawyer |
| 7,837,093 B1 | 11/2010 | Leu et al. |
| 7,837,107 B1 | 11/2010 | Leu et al. |
| 7,858,841 B2 | 12/2010 | Krautkramer et al. |
| 7,860,730 B1 | 12/2010 | Goodall et al. |
| 7,868,754 B2 | 1/2011 | Salvat, Jr. |
| 7,893,876 B2 | 2/2011 | Brown et al. |
| 7,908,030 B2 | 3/2011 | Handfield et al. |
| 7,918,830 B2 | 4/2011 | Langan et al. |
| 7,933,033 B2 | 4/2011 | Ohishi et al. |
| 7,976,508 B2 | 7/2011 | Hoag |
| 7,985,711 B2 | 7/2011 | Tohmatsu et al. |
| 7,990,272 B2 | 8/2011 | Wass et al. |
| 7,996,286 B2 | 8/2011 | Kreiner et al. |
| 8,002,174 B2 | 8/2011 | Coyne, III et al. |
| 8,006,903 B2 | 8/2011 | Braun et al. |
| 8,009,913 B2 | 8/2011 | Greyshock |
| 8,031,347 B2 | 10/2011 | Edwards et al. |
| 8,042,738 B2 | 10/2011 | Cloix |
| 8,049,627 B1 | 11/2011 | Addante |
| 8,063,925 B2 | 11/2011 | Tainer et al. |
| 8,065,858 B2 | 11/2011 | Leu et al. |
| 8,072,635 B2 | 12/2011 | Roberts et al. |
| 8,077,041 B2 | 12/2011 | Stern et al. |
| 8,082,192 B2 | 12/2011 | Nycz et al. |
| 8,099,339 B1 | 1/2012 | Pinsonneault et al. |
| 8,108,068 B1 | 1/2012 | Boucher et al. |
| 8,111,159 B2 | 2/2012 | Andreasson et al. |
| 8,112,175 B2 | 2/2012 | Handfield et al. |
| 8,131,397 B2 | 3/2012 | Vahlberg et al. |
| 8,154,390 B2 | 4/2012 | Heath et al. |
| 8,160,741 B1 | 4/2012 | Shoenfeld |
| 8,174,392 B1 | 5/2012 | Sagbhini et al. |
| 8,186,587 B2 | 5/2012 | Zmood et al. |
| 8,212,677 B2 | 7/2012 | Ferguson |
| 8,219,413 B2 | 7/2012 | Martinez et al. |
| 8,224,483 B1 | 7/2012 | Ansari et al. |
| 8,231,749 B2 | 7/2012 | Dent et al. |
| 8,258,961 B2 | 9/2012 | Phillips et al. |
| 8,261,939 B2 | 9/2012 | Knoth |
| 8,271,128 B1 | 9/2012 | Schultz |
| 8,272,492 B1 * | 9/2012 | Chang ................ G07F 9/10 194/350 |
| 8,279,069 B2 | 10/2012 | Sawyer |
| 8,283,287 B2 | 10/2012 | Aihara et al. |
| 8,284,059 B2 | 10/2012 | Ross |
| 8,285,083 B2 | 10/2012 | Canessa et al. |
| 8,285,607 B2 | 10/2012 | Danilewitz |
| 8,286,222 B2 | 10/2012 | Silverbrook et al. |
| 8,292,173 B2 | 10/2012 | Yturralde et al. |
| 8,292,186 B2 | 10/2012 | Deloche et al. |
| 8,296,950 B2 | 10/2012 | Colbrunn et al. |
| 8,313,024 B2 | 11/2012 | Marino |
| 8,319,607 B2 | 11/2012 | Grimlund et al. |
| 8,328,082 B1 | 12/2012 | Bochenko et al. |
| 8,339,649 B2 | 12/2012 | Ohishi et al. |
| 8,341,041 B2 | 12/2012 | Hull |
| 8,346,632 B2 | 1/2013 | Saghbini |
| 8,355,753 B2 | 1/2013 | Bochenko et al. |
| 8,355,962 B2 | 1/2013 | Delaney et al. |
| 8,359,338 B2 | 1/2013 | Butterfield et al. |
| 8,371,448 B1 | 2/2013 | Reaux |
| 8,376,228 B2 | 2/2013 | DeVet et al. |
| 8,384,545 B2 | 2/2013 | Hussain et al. |

(56) References Cited

U.S. PATENT DOCUMENTS

| | | |
|---|---|---|
| 8,385,972 B2 | 2/2013 | Bochenko et al. |
| 8,386,070 B2 | 2/2013 | Eliuk et al. |
| 8,394,053 B2 | 3/2013 | Bochenko et al. |
| 8,403,212 B2 | 3/2013 | van Esch |
| 8,403,224 B2 | 3/2013 | Fedorko et al. |
| 8,405,508 B2 | 3/2013 | Burke |
| 8,438,067 B2 | 5/2013 | Omura et al. |
| 8,461,076 B2 | 6/2013 | Okada et al. |
| 8,483,550 B2 | 7/2013 | Wright et al. |
| 8,509,604 B2 | 8/2013 | Wright et al. |
| 8,515,251 B2 | 8/2013 | Wright et al. |
| 8,519,849 B2 | 8/2013 | Ross-Messemer |
| 8,530,379 B2 | 9/2013 | Shimizu et al. |
| 8,564,416 B2 | 10/2013 | Steven et al. |
| 8,565,552 B2 | 10/2013 | Sommer et al. |
| 8,582,171 B2 | 11/2013 | Srnka et al. |
| 8,593,278 B2 | 11/2013 | Churbock et al. |
| 8,593,678 B2 | 11/2013 | Ohishi et al. |
| D694,817 S | 12/2013 | Adam et al. |
| 8,606,596 B1 | 12/2013 | Bochenko et al. |
| 8,636,202 B2 | 1/2014 | Keefe et al. |
| 8,639,525 B2 | 1/2014 | Levine et al. |
| 8,686,859 B2 | 4/2014 | Hussain et al. |
| 8,699,054 B2 | 4/2014 | Edwards et al. |
| 8,702,674 B2 | 4/2014 | Bochenko |
| 8,723,674 B2 | 5/2014 | Conley et al. |
| 8,749,356 B2 | 6/2014 | Hussain et al. |
| 8,755,056 B2 | 6/2014 | Edwards et al. |
| 8,825,680 B2 | 9/2014 | Burke et al. |
| 8,922,435 B2 | 12/2014 | Fontecchio et al. |
| 8,945,066 B2 | 2/2015 | Bochenko et al. |
| 8,985,388 B2 | 3/2015 | Ratnaker |
| 8,990,099 B2 | 3/2015 | MacDonald et al. |
| 9,037,479 B1 | 5/2015 | MacDonald et al. |
| 9,058,412 B2 | 6/2015 | MacDonald et al. |
| 9,058,413 B2 | 6/2015 | MacDonald et al. |
| 9,171,280 B2 | 10/2015 | Gitchell et al. |
| 9,367,665 B2 | 6/2016 | MacDonald et al. |
| 9,378,484 B1 * | 6/2016 | Russell .............. G06Q 10/0875 |
| 9,449,296 B2 | 9/2016 | MacDonald et al. |
| 9,539,374 B2 | 1/2017 | Halpern |
| 9,582,644 B2 | 2/2017 | Gitchell et al. |
| 9,734,294 B2 | 8/2017 | MacDonald et al. |
| 9,805,169 B2 | 10/2017 | MacDonald et al. |
| 2002/0026330 A1 | 2/2002 | Klein |
| 2002/0049650 A1 | 4/2002 | Reff |
| 2002/0087360 A1 | 7/2002 | Pettit |
| 2002/0087362 A1 | 7/2002 | Cobb et al. |
| 2002/0087554 A1 | 7/2002 | Seelinger |
| 2003/0055685 A1 | 3/2003 | Cobb et al. |
| 2003/0074223 A1 | 4/2003 | Hickle et al. |
| 2003/0102970 A1 | 6/2003 | Creel et al. |
| 2003/0160698 A1 | 8/2003 | Andreasson et al. |
| 2003/0216974 A1 | 11/2003 | Browne |
| 2004/0008123 A1 | 1/2004 | Carrender et al. |
| 2004/0032330 A1 | 2/2004 | Hoffman |
| 2004/0051368 A1 | 3/2004 | Caputo et al. |
| 2004/0055221 A1 | 3/2004 | Hoffman |
| 2004/0057609 A1 | 3/2004 | Weinberg |
| 2004/0081669 A1 | 4/2004 | Greeven et al. |
| 2004/0158507 A1 | 8/2004 | Meek, Jr. et al. |
| 2004/0178071 A1 | 9/2004 | Harrison et al. |
| 2004/0215486 A1 | 10/2004 | Braverman |
| 2004/0225528 A1 | 11/2004 | Brock |
| 2005/0014849 A1 | 1/2005 | Pettit et al. |
| 2005/0014948 A1 | 1/2005 | Galbo et al. |
| 2005/0060171 A1 | 3/2005 | Molnar |
| 2005/0062603 A1 | 3/2005 | Fuerst et al. |
| 2005/0087544 A1 * | 4/2005 | Skavnak .................. G07F 11/42 221/75 |
| 2005/0108044 A1 | 5/2005 | Koster |
| 2005/0125097 A1 | 6/2005 | Chudy et al. |
| 2005/0127176 A1 | 6/2005 | Dickinson et al. |
| 2005/0149378 A1 | 7/2005 | Cyr et al. |
| 2005/0149414 A1 | 7/2005 | Schrodt et al. |
| 2005/0184151 A1 | 8/2005 | DiMaggio et al. |
| 2005/0283259 A1 | 12/2005 | Wolpow |
| 2005/0285732 A1 | 12/2005 | Sengupta et al. |
| 2005/0285746 A1 | 12/2005 | Sengupta et al. |
| 2006/0006999 A1 | 1/2006 | Walczyk et al. |
| 2006/0043177 A1 | 3/2006 | Nycz et al. |
| 2006/0043179 A1 | 3/2006 | Nycz et al. |
| 2006/0065726 A1 | 3/2006 | Andreasson et al. |
| 2006/0109105 A1 | 5/2006 | Varner et al. |
| 2006/0132311 A1 | 6/2006 | Kruest et al. |
| 2006/0145871 A1 | 7/2006 | Donati et al. |
| 2006/0152338 A1 | 7/2006 | Hsu |
| 2006/0152364 A1 | 7/2006 | Walton |
| 2006/0152367 A1 | 7/2006 | Narayanaswamy |
| 2006/0208886 A1 | 9/2006 | Beamer |
| 2006/0267731 A1 | 11/2006 | Chen |
| 2007/0001809 A1 | 1/2007 | Kodukula et al. |
| 2007/0008399 A1 | 1/2007 | Botten et al. |
| 2007/0023512 A1 | 2/2007 | Miller et al. |
| 2007/0023513 A1 | 2/2007 | Andreasson et al. |
| 2007/0074722 A1 | 4/2007 | Giroux et al. |
| 2007/0114279 A1 | 5/2007 | Lessing et al. |
| 2007/0150382 A1 | 6/2007 | Danilewitz |
| 2007/0187475 A1 | 8/2007 | MacLeod |
| 2007/0188306 A1 | 8/2007 | Tethrake et al. |
| 2007/0200702 A1 | 8/2007 | Chung |
| 2007/0213659 A1 | 9/2007 | Trovato et al. |
| 2007/0213684 A1 | 9/2007 | Hickle et al. |
| 2007/0229268 A1 | 10/2007 | Swan et al. |
| 2007/0272746 A1 | 11/2007 | Ortiz et al. |
| 2008/0004908 A1 | 1/2008 | Oh et al. |
| 2008/0012687 A1 | 1/2008 | Rubinstein |
| 2008/0045930 A1 | 2/2008 | Makin et al. |
| 2008/0046295 A1 | 2/2008 | Albrecht |
| 2008/0094214 A1 | 4/2008 | Azevedo et al. |
| 2008/0122878 A1 | 5/2008 | Keefe et al. |
| 2008/0128482 A1 | 6/2008 | Chen et al. |
| 2008/0129496 A1 | 6/2008 | Koblasz |
| 2008/0150722 A1 | 6/2008 | Jackson |
| 2008/0157967 A1 | 7/2008 | Jones et al. |
| 2008/0172253 A1 | 7/2008 | Chung et al. |
| 2008/0184719 A1 | 8/2008 | Lowenstein |
| 2008/0191013 A1 | 8/2008 | Liberatore |
| 2008/0218307 A1 | 9/2008 | Schoettle |
| 2008/0228160 A1 | 9/2008 | Harrison |
| 2008/0243088 A1 | 10/2008 | Evans |
| 2008/0270178 A1 | 10/2008 | McRae et al. |
| 2008/0296373 A1 | 12/2008 | Zmood et al. |
| 2008/0297356 A1 | 12/2008 | Oberle |
| 2008/0306772 A1 | 12/2008 | Shahrokh |
| 2008/0316045 A1 | 12/2008 | Sriharto et al. |
| 2009/0002173 A1 | 1/2009 | Bergsten et al. |
| 2009/0020442 A1 | 1/2009 | Dietrich et al. |
| 2009/0058653 A1 | 3/2009 | Geissler et al. |
| 2009/0144087 A1 | 6/2009 | Kelsch et al. |
| 2009/0153290 A1 | 6/2009 | Bierach |
| 2009/0164042 A1 | 6/2009 | Handfield et al. |
| 2009/0194987 A1 | 8/2009 | Christie et al. |
| 2009/0224891 A1 | 9/2009 | Vishik et al. |
| 2009/0231138 A1 | 9/2009 | Lai et al. |
| 2009/0267740 A1 | 10/2009 | Pizzuto |
| 2009/0267772 A1 | 10/2009 | Dehnadi |
| 2009/0277815 A1 | 11/2009 | Kohl |
| 2009/0294521 A1 | 12/2009 | De La Huerga |
| 2010/0022953 A1 | 1/2010 | Bochenko et al. |
| 2010/0022987 A1 | 1/2010 | Bochenko et al. |
| 2010/0036310 A1 | 2/2010 | Hillman |
| 2010/0036678 A1 | 2/2010 | Bray |
| 2010/0036755 A1 | 2/2010 | Saghbini |
| 2010/0042439 A1 | 2/2010 | Martinez et al. |
| 2010/0079337 A1 | 4/2010 | Shiau et al. |
| 2010/0098425 A1 | 4/2010 | Kewitsch |
| 2010/0108761 A1 | 5/2010 | Nycz et al. |
| 2010/0114951 A1 | 5/2010 | Bauman et al. |
| 2010/0176917 A1 | 7/2010 | Bacarella |
| 2010/0185458 A1 | 7/2010 | Newcomb et al. |
| 2010/0204659 A1 | 8/2010 | Bochenko et al. |
| 2010/0217621 A1 | 8/2010 | Schoenberg et al. |
| 2010/0219097 A1 | 9/2010 | Ramasubramanian et al. |

(56) References Cited

U.S. PATENT DOCUMENTS

| | | |
|---|---|---|
| 2010/0238039 A1 | 9/2010 | Tethrake et al. |
| 2010/0268548 A1 | 10/2010 | Louie et al. |
| 2010/0275625 A1 | 11/2010 | Lowenstein |
| 2010/0299158 A1 | 11/2010 | Siegel |
| 2010/0328474 A1 | 12/2010 | Hsieh |
| 2010/0332246 A1 | 12/2010 | Fedorko et al. |
| 2011/0006879 A1 | 1/2011 | Lambrou et al. |
| 2011/0063091 A1 | 3/2011 | Kang |
| 2011/0068922 A1 | 3/2011 | Ross |
| 2011/0093279 A1 | 4/2011 | Levine et al. |
| 2011/0112682 A1 | 5/2011 | Matsukawa et al. |
| 2011/0115612 A1 | 5/2011 | Kulinets et al. |
| 2011/0125315 A1 | 5/2011 | Handfield et al. |
| 2011/0131056 A1 | 6/2011 | Chudy et al. |
| 2011/0139871 A1 | 6/2011 | Yturralde et al. |
| 2011/0161112 A1 | 6/2011 | Keefe et al. |
| 2011/0163871 A1 | 7/2011 | Einav et al. |
| 2011/0166878 A1 | 7/2011 | Louie et al. |
| 2011/0184751 A1 | 7/2011 | Holmes |
| 2011/0187549 A1 | 8/2011 | Balasing |
| 2011/0225100 A1 | 9/2011 | Sangal et al. |
| 2011/0227722 A1 | 9/2011 | Salvat, Jr. |
| 2011/0240729 A1 | 10/2011 | Schuck |
| 2011/0257991 A1 | 10/2011 | Shukla |
| 2011/0270441 A1 | 11/2011 | Handfield et al. |
| 2011/0291809 A1 | 12/2011 | Niemiec et al. |
| 2011/0301446 A1 | 12/2011 | Kaman |
| 2011/0313395 A1 | 12/2011 | Krulevitch et al. |
| 2012/0037266 A1 | 2/2012 | Bochenko |
| 2012/0041778 A1 | 2/2012 | Kraft |
| 2012/0044054 A1 | 2/2012 | Hussain et al. |
| 2012/0061463 A1 | 3/2012 | Burke |
| 2012/0089411 A1 | 4/2012 | Smka et al. |
| 2012/0089418 A1 | 4/2012 | Kamath et al. |
| 2012/0116798 A1 | 5/2012 | Heath et al. |
| 2012/0125994 A1 | 5/2012 | Heath et al. |
| 2012/0130534 A1 | 5/2012 | Wurm |
| 2012/0173440 A1 | 7/2012 | Dehlinger et al. |
| 2012/0177256 A1 | 7/2012 | Keefe et al. |
| 2012/0179132 A1 | 7/2012 | Valk et al. |
| 2012/0185951 A1 | 7/2012 | Bauman et al. |
| 2012/0209619 A1 | 8/2012 | Knotts et al. |
| 2012/0240067 A1 | 9/2012 | Bauman et al. |
| 2012/0273087 A1 | 11/2012 | Stavsky et al. |
| 2012/0278096 A1 | 11/2012 | Holness |
| 2012/0278228 A1 | 11/2012 | Rubinstein |
| 2012/0323208 A1 | 12/2012 | Bochenko et al. |
| 2012/0325330 A1 | 12/2012 | Prince et al. |
| 2013/0018356 A1 | 1/2013 | Prince et al. |
| 2013/0038452 A1 | 2/2013 | Sawyer |
| 2013/0041784 A1 | 2/2013 | Danilewitz |
| 2013/0092727 A1 | 4/2013 | Edwards et al. |
| 2013/0105568 A1 | 5/2013 | Jablonski et al. |
| 2013/0151005 A1 | 6/2013 | Gerold et al. |
| 2013/0191149 A1 | 7/2013 | Kolberg et al. |
| 2013/0221082 A1 | 8/2013 | Botten |
| 2013/0221087 A1 | 8/2013 | Keefe et al. |
| 2013/0225945 A1 | 8/2013 | Prince et al. |
| 2013/0327822 A1 | 12/2013 | Keefe et al. |
| 2014/0060729 A1 | 3/2014 | Srnka et al. |
| 2014/0066880 A1 | 3/2014 | Prince et al. |
| 2014/0117081 A1 | 5/2014 | Jablonski et al. |
| 2014/0136229 A1 | 5/2014 | Levine et al. |
| 2014/0138440 A1 | 5/2014 | D'Ambrosio et al. |
| 2014/0142975 A1 | 5/2014 | Keefe et al. |
| 2014/0184390 A1 | 7/2014 | Elizondo, II |
| 2014/0184391 A1 | 7/2014 | Elizondo, II |
| 2014/0197954 A1 | 7/2014 | Caputo et al. |
| 2014/0210596 A1 | 7/2014 | Hussain et al. |
| 2014/0262919 A1 | 9/2014 | Hussain et al. |
| 2014/0263614 A1 | 9/2014 | Keefe et al. |
| 2014/0276213 A1 | 9/2014 | Bochenko |
| 2014/0279548 A1* | 9/2014 | Wang ............ G06Q 30/012 |
| | | 705/50 |
| 2014/0282197 A1 | 9/2014 | Keefe et al. |
| 2014/0291397 A1 | 10/2014 | Caputo et al. |
| 2014/0316561 A1* | 10/2014 | Tkachenko ........... G07F 11/002 |
| | | 700/236 |
| 2014/0367080 A1 | 12/2014 | Hussain et al. |
| 2014/0372145 A1 | 12/2014 | MacDonald et al. |
| 2015/0058182 A1 | 2/2015 | Kress-Spatz et al. |
| 2015/0115029 A1 | 4/2015 | Rahim et al. |
| 2015/0235005 A1 | 8/2015 | MacDonald et al. |
| 2015/0339622 A1 | 11/2015 | MacDonald et al. |
| 2016/0019367 A1 | 1/2016 | Olson et al. |
| 2016/0132649 A1 | 5/2016 | Gitchell et al. |
| 2017/0061095 A1 | 3/2017 | Waskins et al. |
| 2017/0132734 A1 | 5/2017 | MacDonald et al. |
| 2017/0212993 A1 | 7/2017 | Gitchell et al. |
| 2018/0279781 A1 | 10/2018 | Jeffries et al. |

FOREIGN PATENT DOCUMENTS

| | | |
|---|---|---|
| CA | 2790220 | 6/2013 |
| CN | 102791310 B | 12/2014 |
| IN | 201204914 P4 | 10/2013 |
| WO | 02095675 | 11/2002 |
| WO | 2006135830 | 2/2006 |
| WO | 2006026246 | 3/2006 |
| WO | 2010074781 | 7/2010 |
| WO | 2011115676 | 9/2011 |
| WO | 2011150013 | 12/2011 |
| WO | 2013082423 | 6/2013 |
| WO | 2013116873 | 8/2013 |
| WO | 2013134256 | 9/2013 |
| WO | 2014092754 A1 | 6/2014 |
| WO | 2014159928 | 10/2014 |
| WO | 2014189834 | 11/2014 |

OTHER PUBLICATIONS

Belson, D., "Storage, Distribution, and Dispensing of Medical Supplies", Create Interim Report Under FEMA Grant EMW-2004-GR-0112, Apr. 21, 2005, pp. 1-36.

Cakici et al., "Using RFID for the management of pharmaceutical inventory-system optimization and shrinkage control", Decision Support Systems, 2011, pp. 842-852.

CPG Sec. 400.210, Radiofrequency Identification Feasibility Studies and Pilot Programs for Drugs, Nov. 2004, Compliance Policy Guide, available at: http://www.fda.gov/ICECI/ComplianceManuals/CompliancePolicyGuidanceManual/ucm074357.htm.

Crash Cart Inventory Checklist, Outpatient Surgery Magazine, Oct. 2004, "Outpatient Surgery", available at: http://www.outpatientsurgery.net/resources/forms/2004/pdf/OutpatientSurgeryMagazine 0410 crashCart.pdf, in 1 page.

Curtin et al., "Making the 'Most' out of RFID: a research agenda for the study of the adoption, usage and impact of RFID", Information Technology Management, Apr. 2007, pp. 87-110.

Gonzalez, Stephanie, "Health Maintenance System (HMS) Hardware Research, Design, and Collaboration", NASA USRP—Internship Final Report, 2010, pp. 1-20.

Harrop et al., "RFID for Healthcare and Pharmaceuticals, 2008-2018", Securing Pharma, May 2008, pp. 1-12.

Houliston, Bryan, "Integrating RFID Technology into a Drug Administration System", Bulletin of Applied Computing and Information Technology, vol. 3, No. 1, May 2005, pp. 8. Retrieved Sep. 26, 2013 from http://citrenz.ac.nz/bacit/0301/2005Houliston RFID.htm.

Jorgensen et al., "Executable Use Cases: Requirements for a Pervasive Health Care System", IEEE Software, Mar./Apr. 2004, pp. 34-41.

Lai et al., "Enhancing Medication Safety and Reduce Adverse Drug Events on Inpatient Medication Administration using RFID", WSEAS Transactions on Communications, Oct. 2008, vol. 7, No. 10, pp. 1045-1054.

Lampe et al., "The Smart Box Application Model", Advances in Pervasive Computing, 2004, pp. 1-6.

"McKesson's Announces New Touch-Screen Driven Medication Dispensing Solution", Business Wire, Jun. 15, 2009, pp. 2, Available at: http://www.businesswire.com/news/home/20090615005349/

(56) References Cited

OTHER PUBLICATIONS en/McKesson-Announces-Touch-Screen-Driven-Medication-Dispensing-Solution#.VR7quPnF 10.
"Medical Packaging Inc. Announces Clear Stem Flag Label System for Ampoules, Vials, and Syringes", Feb. 1, 2006 available at: http://www.medpak.com/v1/news/20060201 CSFLAG.pdf, in 1 page.
O'Driscoll et al., "RFID: An Ideal Technology for Ubiquitous Computing?" Dublin Institute of Technology School of Electronics and Communications Conference Papers, Jan. 1, 2008, pp. 1-17.
Pappu, Ph.D et al., "RFID in Hospitals: Issues and Solutions" Consortium for the Accelerated Deployment of RFID in Distribution, Sep. 2004, pp. 1-12.
Tzeng et al., "Evaluating the Business Value of RFID: Evidence from Five Case Studies", International Journal of Production Economics, 2008, vol. 112, pp. 601-613.
Wang et al., "Applying RFID Technology to Develop a Distant Medical Care Service Platform", International Journal of Electronic Business Management, 2010, vol. 8, No. 2, pp. 161-170.
O'Connor, "Johnson & Johnson Finds Value in Multiple RFID Apps" (Apr. 23, 2008), retrieved Aug. 21, 2017, 2 pages, available at http://www.rfidjounal.com/articles/pdf?4046.
Collins, "RFID Cabinet Manages Medicine" (Aug. 12, 2004), retrieved Aug. 21, 2017, 1 page, available at http://www.rfidjournal.com/articles/pdf?1081.
O'Connor, Mary Catherine, "To Keep Drugs from Expiring, Hospital Tests Intelliguard System", RFID Journal, Jan. 12, 2011, pp. 3. http://www.rfidjournal.com/articles/view?8123.
Liu et al, "Point-of-Care Support for Error Free Medication Process" (Jun. 25, 2007), retrieved Aug. 21, 2017, 12 pages, available at: http://ieeexplore.ieee.org/document/4438162/.
McCall et al., "RMAIS: RFID-based Medication Adherence Intelligence System" (Aug. 31, 2010), retrieved Aug. 21, 2017, 4 pages, available at http://ieeexplore.ieee.org/document/5627529/.
Tsai et al., "iMAT: Intelligent Medication Administration Tools" (Jul. 1, 2010), retrieved Aug. 21, 2017, 8 pages, available at http://ieeexplore.ieee.org/document/5556551/.
Tsai et al., "Smart Medication Dispenser: Design, Architecture, and Implementation" (Sep. 27, 2010), retrieved Aug. 21, 2017, 12 pages, available at http://ieeexplore.ieee.org/document/5585838/.
Becker et al. SmartDrawer: RFID-Based Smart Medicine Drawer for Assistive Environments,pp. 1-8, PETRA '09, Jun. 9-13, 2009, Corfu, Greece.
Mike Mowry, A Survey of RFID in the Medical Industry With Emphasis on Applications to Surgery and Surgical Devices, MAE188 Introduction to RFID Dr. Rajit Gadh UCLA, Jun. 9, 2008, pp. 1-22, USA.
JD Howard, Implementation of RFID in the Pharmaceutical Industry, Advisor: Dr. Jay Singh, Feb. 2009, pp. 1-11, San Luis Obispo, CA, USA.
Yahia Zare Mehrjerfi, RFID-enabled healthcare systems: risk-benefit analysis, Department of Industrial Engineering, Yazd University, vol. 4 No. 3, 2010, pp. 282-300, Yazd, Iran.
Cakici et al, Using RFID for the management of pharmaceutical inventory—system optimization and shrinkage control, www.elsevier.com, Feb. 5, 2011, pp. 1-11, Rochester, NY, USA.
John Edwards, RFID Smart Shelves and Cabinets, www.rfidjournal.com, Aug. 24, 2009, pp. 1-4, USA.
Bendavid et al., Using RFID to Improve Hospital Supply Chain Management for High Value and Consignment Items, ScieneDirect, Procedia Computer Science 5 (2011) 849-856, Canada.
Wickipedia, Faraday cage, http://wikipedi.org/w/index.php?title=Faraday, Apr. 23, 2018, pp. 1-3.
Floerkemeier et al., The Smart Box Concept for Ubiquitous Computing Environments, Institute for Pervasive Computing Department of Computer Science, pp. 1-4, ETH Zurich, Switzerland.
School of Electrical and Electronic Engineering, Dublin Institute of Technology, RFID: an Ideal Technology for Ubiquitous Computing?, http://arrow.dit.ie/engschcecon, Jan. 1, 2008, pp. 1-17.
Loc Ho et al. A Prototype on RFID and Sensor Networks for Elder Healthcare: Progress Report, Loc Ho, et al., SIGCOMM '05 Workshops, pp. 70-75, Aug. 22-26, 2005, Philadelphia, PA, USA.
C. Saygin, Adaptive Inventory Management Using RFID Data, C. Saygin, Adv Manuf Technol (2007) 32: 1045-1051.
Yannick Meiller et al. Adaptive Knowledge-Based System for Health Care Applications with RFID-Generated Information, Elsevier, Decision Support Systems, Received May 29, 2010.
AmerisourceBergen Specialty Group Reconfigures Cubixx Medical Cabinet, Pharmaceutical Commerce, Jan. 9, 2011, Posted in Supply Chain/Logistics, Tagged Nov./Dec. 2010.
Malabika Parida et al., Application of RFID Technology for In-House Drug Management System, IEEE, 2012 15th International Conference on Network-Based Information Systems.
Beth Bacheldor, Healthcare Deploys RFID Refrigerated Drug Cabinets, Sep. 24, 2007, RFID Journal.
Beth Bacheldor, Cardinal Health Readies Item-Level Pilot, May 31, 2006, RFID Journal.
Crash Cart Inventory Checklist (Sample), Courtesy of Progressive Surgical Solutions, LLC, Outpatient Surgery Magazine, Oct. 2004.
Data Gathering Developments, Manufacturing Chemist, p. 24, Feb. 2005.
Chia-Chen Chao et al., Determining Technology Trends and Forecasts of RFID by a Historical Review and Bibliometric Analysis from 1991 to 2005, et al., Elsevier, ScienceDirect, 2006.
Doing the Wave: Inventory Management with RFID, Kathryn Green, Sr. Director Radiology Services and Cardiovascular Diagnostic & Interventional Services, UMass Memorial Medical Center, Worchester, Massachusetts, vol. 15—Issue 9—Sep. 2007.
Mary Cahtherine O'Connor, Drug Distributor Uses RFID to Vend Meds, May 23, 2006, RFID Journal.
Chun-Liang Lai et al.m Enhancing Medication Safety and Reduce Adverse Drug Events on Inpatient Medication Administration Using RFID, WSEAS.
Chih-Peng Lin et al., Fair Sharing Using Real-time Polling Service to Adaptive VBR Stream Transmission in a 802.16 Wireless Networks, Transactions on Communications, ISSN: 1109-2742, Issue 10, vol. 7, Oct. 2008.
Mary Catherine O'Connor, GlaxoSmithKline Tests RFID on HIV Drug, Mar. 24, 2006, RFID Journal.
Carol Humble, RN, How RFID Freed Nurses from the Pain of Inventory Duties, Memorial Health Care System, Chattanooga, TN, vol. 17—Issue 12—Dec. 2009.
Intel & Siemens Launch RFID Blood Bank in Malaysia, Aug. 16, 2007, RFID Journal.
Mary Catherine O'Connor, Interrogators Start to Evolve, Jun. 1, 2006, RFID Journal.
Ergin Erdem et al., Investigation of RFID Tag Readability for Pharmaceutical Products at Item Level, Drug Development and Industrial Pharmacy, 2009; 35(11): 1312-1324.
Andrea Cangialosi et al., Leveraging RFID in Hospitals: Patient Life Cycle and Mobility Perspectives, IEEE Applications & Practice, Sep. 2007.
Jones et al., Marketing Intelligence & Planning: The benefits, challenges and impacts of radio frequency identification technology (RFID) for retailers in the UK., Marketing Intelligence & Planning, vol. 23 Issue: 4, pp. 395-402, Mar. 2005.
Mary Catherine O'Connor, McKesson Starts RFID Pilot for Viagra, Feb. 17, 2005, RFID Journal.
Jerry Fahrni, More RFID Refrigerator Stuff—Cubixx and myCubixx, Sep. 3, 2012.
New RFID Medical Cabinets Deployed at 50 Hospitals, Sep. 17, 2007, RFID Journal.
Mary Catherine O'Connor, Pfizer Using RFID to Fight Fake Viagra, Jan. 6, 2006, RFID Journal.
Elizabeth Wasserman, Purdue Pharma to Run Pedigree Pilot, May 31, 2005, RFID Journal.
Ygal Bendavid et al., Redesigning the Replenishment Process of Medical Supplies in Hospitals with RFID, Business Process Management Journal, (2010), vol. 16, Issue: 6, pp. 991-1013.

(56) References Cited

OTHER PUBLICATIONS

Shang-Wei Wang et al., RFID Applications in Hospitals: a Case Study on a Demonstration RFID Project in a Taiwan Hospital, Proceedings of the 39th Hawaii International Conference on System Sciences, 2006.
Mark Roberti, RFID Basics for Health Care: Understanding the Fundamental Concepts That Affect RFID Deployments, RFID Journal presentation, Sep. 17, 2009, The Westin Waltham-Boston, Waltham, MA.
Mark O. Lewis et al., RFID—Enabled Capabilities and Their Impact on Healthcare Process Performance, Jan. 1, 2010, Association for Information Systems AIS Electronic Library (AISeL), ICIS 2010 Proceedings, International Conference in Information Systems.
RFID Medical Cabinets Evaluated in New Benchmark, Sep. 12, 2007, RFID Journal.
Antti Lahtela et al., RFID and NFC in Healthcare: Safety of Hospitals Medication Care, University of Kuopio, Kuopio, Finland, 2008 Second International Conference on Pervasive Computing Technologies for Healthcare, 241-244, IEEE.
Beth Bacheldor, Children's Hospital Boston Joins Others Using RFID to Track Implantables, Mar. 5, 2018, pp. 1-3, RFID Journal.
Amitava Dutta et al., RFID and Operations Management: Technology, Value, and Incentives, Production and Operations Management, vol. 16, No. 5, Sep.-Oct. 2007, pp. 646-655.
Ari Juels, RFID Security and Privacy: A Research Survey, IEEE Journal on Selected Areas in Communications, vol. 24, No. 2, pp. 381-394, Feb. 2006.
Christian Floerkemeier et al., The Smart Box Concept for Ubiquitous Computing Environments, Institute for Pervasive Computing, Department of Computer Science, ETH Zurich, Switzerland, Jan. 2004.
Clair Swedberg, Tennessee Hospital Tracks High-Value Items, Aug. 5, 2009, RFID Journal.
Mary Catherine O'Connor, To Keep Drugs from Expiring, Hospital Tests Intelliguard System, Jan. 12, 2011, RFID Journal.
Beth Bacheldor, UCSD Medical Center Expands Its RFID Deployment, Oct. 29, 2008, RFID Journal.
Beth Bacheldor, UMass Med Center Finds Big Savings Through Tagging, Nov. 21, 2007, RFID Journal.
Kinsella, B., Kit Check Announces New RFID Scanning Station, Little Blue Box is Smaller, Lighter, Provided Free for Users, Jun. 2, 2014, 2 pages, Kit Check, webpage includes video link at https://kitcheck.com/2014/06/new-kit-check-smaller-rfid-scanning-station-little-blue-box/.
Inderbir Singh et al., Versatility of Radio Frequency Identification (RFID) Tags in the Pharmaceutical Industry, Instrumentation Science and Technology, 36: 656-663, 2008.
The Orange Book, Approved Drug Products with Therapeutic Equivalence Evaluations, 2018.
Kit Check, Kit Check Installs in One Hour, video link at https://kitcheck.com/learn-more/video/kit-check-installs-in-one-hour/, publication date unknown, accessed Jul. 8, 2019.
Kit Check, Overview, video link at https://www.youtube.com/watch?v=UvNnoZYgGW4, published Oct. 13, 2013.
Kit Check, Wick Video, video link at https://www.youtube.com/watch?v=tDpVoM4iMbl, published Oct. 14, 2013.
Brown, Dennis E., RFID Implementation, McGraw-Hill Communications, 2007, 34 pages (excerpts), The McGraw-Hill Companies.
Glover, Bill et al., RFID Essentials, First Edition, Jan. 2006, 37 pages (excerpts), O'Reilly Media, Inc., Sebastopol, CA.
Bacheldor, Beth, Children's Hospital Boston Joins Others Using RFID to Track Implantables, RFID Journal, Mar. 5, 2008, 3 pages.
U.S. Department of Health and Human Services, Food and Drug Administration, Approved Drug Products with Therapeutic Equivalence Evaluations ("The Orange Book"), 28th edition, 2008, first published in 1980, 1103 pages.
Reexamination Control No. 90014344, Request for Ex Parte Reexamination of U.S. Pat. No. 8,990,099 B2 with Appendices A-D, filed with the USPTO on Jul. 25, 2019, 1387 pages.
Reexamination Control No. 90014345, Request for Ex Parte Reexamination of U.S. Pat. No. 9,058,412 B2 with Appendices A-D, filed with the USPTO on Jul. 26, 2019, 1429 pages.
Reexamination Control No. 90014343, Request for Ex Parte Reexamination of U.S. Pat. No. 9,058,413 B2 with Appendices A-D, filed with the USPTO on Jul. 25, 2019, 1463 pages.
Reexamination Control No. 90014346, Request for Ex Parte Reexamination of U.S. Pat. No. 9,367,665 B2 with Appendices A-D, filed with the USPTO on Jul. 26, 2019, 1477 pages.
Reexamination Control No. 90014347, Request for Ex Parte Reexamination of U.S. Pat. No. 9,805,169 B2 with Appendices A-D, filed with the USPTO on Jul. 29, 2019, 1535 pages.
Case IPR2019-00376, Petition for Inter Partes Review of U.S. Pat. No. 8,990,099 with Exhibits 1001-1011 filed with the USPTO Patent Trial and Appeal Board on Nov. 30, 2018 by Health Care Logistics, Inc., Patent Owner's Preliminary Response filed with the USPTO Patent Trial and Appeal Board on Mar. 8, 2019 by Kit Check, Inc., and Decision Denying Institution of Inter Partes Review entered by the USPTO Patent Trial and Appeal Board on Jun. 4, 2019, 863 pages.
Case IPR2019-00385, Petition for Inter Partes Review of U.S. Pat. No. 9,058,412 with Exhibits 1001-1014 filed with the USPTO Patent Trial and Appeal Board on Nov. 30, 2018 by Health Care Logistics, Inc., Patent Owner's Preliminary Response filed with the USPTO Patent Trial and Appeal Board on Mar. 8, 2019 by Kit Check, Inc., and Decision Denying Institution of Inter Partes Review entered by the USPTO Patent Trial and Appeal Board on Jun. 3, 2019, 2013 pages.
Case IPR2019-00387, Petition for Inter Partes Review of U.S. Pat. No. 9,058,413 with Exhibits 1001-1014 filed with the USPTO Patent Trial and Appeal Board on Dec. 1, 2018 by Health Care Logistics, Inc., Patent Owner's Preliminary Response filed with the USPTO Patent Trial and Appeal Board on Mar. 13, 2019 by Kit Check, Inc., and Decision Denying Institution of Inter Partes Review entered by the USPTO Patent Trial and Appeal Board on Jun. 7, 2019, 2014 pages.
Case IPR2019-00394, Petition for Inter Partes Review of U.S. Pat. No. 9,367,665 with Exhibits 1001-1014 filed with the USPTO Patent Trial and Appeal Board on Dec. 3, 2018 by Health Care Logistics, Inc., Patent Owner's Preliminary Response filed with the USPTO Patent Trial and Appeal Board on Mar. 13, 2019 by Kit Check, Inc., and Decision Denying Institution of Inter Partes Review entered by the USPTO Patent Trial and Appeal Board on Jun. 11, 2019, 638 pages.
Case IPR2019-00388, Petition for Inter Partes Review of U.S. Pat. No. 9,805,169 with Exhibits 1001-1010 filed with the USPTO Patent Trial and Appeal Board on Dec. 1, 2018 by Health Care Logistics, Inc., Patent Owner's Preliminary Response filed with the USPTO Patent Trial and Appeal Board on Mar. 13, 2019 by Kit Check, Inc., and Decision Denying Institution of Inter Partes Review entered by the USPTO Patent Trial and Appeal Board on Jun. 3, 2019, 625 pages.
Complaint, Kit Check, Inc., Plaintiff, v. Health Care Logistics, Inc., Defendant, Case No. 2:17-cv-1041, United States District Court for the Southern District of Ohio Eastern Division, Dec. 1, 2017, 45 pages.
Defendant's First Amended Answer, Affirmative Defenses, and Counterclaims to Plaintiffs Complaint, Kit Check, Inc. v. Health Care Logistics, Inc., Case No. 2:17-cv-01041-ALM-CMV, United States District Court for the Southern District of Ohio Eastern Division, Feb. 9, 2018, 117 pages.
Defendant Health Care Logistics, Inc.'s Motion for Judgment on the Pleadings Pursuant to FED. R. CIV. P. 12(C), Kit Check, Inc. v. Health Care Logistics, Inc., Case No. 2:17-cv-01041-ALM-CMV, United States District Court for the Southern District of Ohio Eastern Division, May 25, 2018, 43 pages.
Plaintiff Kit Check, Inc.'s Memorandum in Opposition to Defendant Health Care Logistics, Inc.'s Motion for Judgment on the Pleadings, Kit Check, Inc. v. Health Care Logistics, Inc., Case No. 2:17-cv-01041, United States District Court for the Southern District of Ohio Eastern Division, Jun. 29, 2018, 91 pages.
Defendant Health Care Logistics, Inc.'s Reply in Support of Motion for Judgment on the Pleadings Pursuant to FED. R. CIV. P. 12(C),

(56) References Cited

OTHER PUBLICATIONS

*Kit Check, Inc.* v. *Health Care Logistics, Inc.*, Case No. 2:17-cv-01041-ALM-CMV, United States District Court for the Southern District of Ohio Eastern Division, Jul. 20, 2018, 76 pages.
Joint Claim Construction and Prehearing Statement, *Kit Check, Inc.* v. *Health Care Logistics, Inc.*, Case No. 2:17-cv-01041, United States District Court for the Southern District of Ohio Eastern Division, Sep. 20, 2018, 21 pages.
Plaintiff Kit Check, Inc.'s Opening Claim Construction Brief, *Kit Check, Inc.* v. *Health Care Logistics, Inc.*, Case No. 2:17-cv-01041, United States District Court for the Southern District of Ohio Eastern Division, Nov. 16, 2018, 93 pages.
Defendant Health Care Logistics, Inc.'s Opening Claim Construction Brief, *Kit Check, Inc.* v. *Health Care Logistics, Inc.*, Case No. 2:17-cv-01041, United States District Court for the Southern District of Ohio Eastern Division, Nov. 16, 2018, 307 pages.
Deposition of Jeffrey Fischer, *Kit Check, Inc.* v. *Health Care Logistics, Inc.*, Case No. 2:17-cv-01041, United States District Court for the Southern District of Ohio Eastern Division, Dec. 19, 2018, 86 pages.
Plaintiff Kit Check, Inc.'s Responsive Claim Construction Brief, *Kit Check, Inc.* v. *Health Care Logistics, Inc.*, Case No. 2:17-cv-01041, United States District Court for the Southern District of Ohio Eastern Division, Jan. 3, 2019, 88 pages.
Defendant Health Care Logistics, Inc.'s Response to Plaintiff Kit Check, Inc.'s Opening Claim Construction Brief, *Kit Check, Inc.* v. *Health Care Logistics, Inc.*, Case No. 2:17-cv-01041-ALM-CMV, United States District Court for the Southern District of Ohio Eastern Division, Jan. 3, 2019, 32 pages.
Defendant Health Care Logistics, Inc.'s Motion for Stay, *Kit Check, Inc.* v. *Health Care Logistics, Inc.*, Case No. 2:17-cv-01041-ALM-CMV, United States District Court for the Southern District of Ohio Eastern Division, Jan. 21, 2019, 12 pages.
Opinion & Order, *Kit Check, Inc.* v. *Health Care Logistics, Inc.*, Case No. 2:17-cv-01041, United States District Court for the Southern District of Ohio Eastern Division, Mar. 14, 2019, 17 pages.
Joint Stipulation of Partial Dismissal Without Prejudice, *Kit Check, Inc.* v. *Health Care Logistics, Inc.*, Case No. 2:17-cv-01041, United States District Court for the Southern District of Ohio Eastern Division, Apr. 16, 2019, 2 pages.
Joint Notice Regarding Claim Terms Which No Longer Need to be Construed at Markman, *Kit Check, Inc.* v. *Health Care Logistics, Inc.*, Case No. 2:17-cv-01041, United States District Court for the Southern District of Ohio Eastern Division, Apr. 16, 2019, 2 pages.
Opinion & Order, *Kit Check, Inc.* v. *Health Care Logistics, Inc.*, Case No. 2:17-cv-01041, United States District Court for the Southern District of Ohio Eastern Division, Apr. 29, 2019, 4 pages.
Notice to the Court Regarding PTAB's Decision to Deny Institution on All of Defendant's IPR Petitions, *Kit Check, Inc.* v. *Health Care Logistics, Inc.*, Case No. 2:17-cv-01041, United States District Court for the Southern District of Ohio Eastern Division, Jun. 12, 2019, 120 pages.
Notice of Status of Defendant Health Care Logistics Inc.'s Requests for Inter Partes Review, *Kit Check, Inc.* v. *Health Care Logistics, Inc.*, Case No. 2:17-cv-01041-ALM-CMV, United States District Court for the Southern District of Ohio Eastern Division, Jun. 20, 2019, 3 pages.
Roberti, Mark, RFID Basics for Health Care, Understanding the fundamental concepts that affect RFID deployments, RFID Journal presentation, Sep. 17, 2009, 33 pages, The Westin Waltham-Boston, Waltham, MA.

* cited by examiner

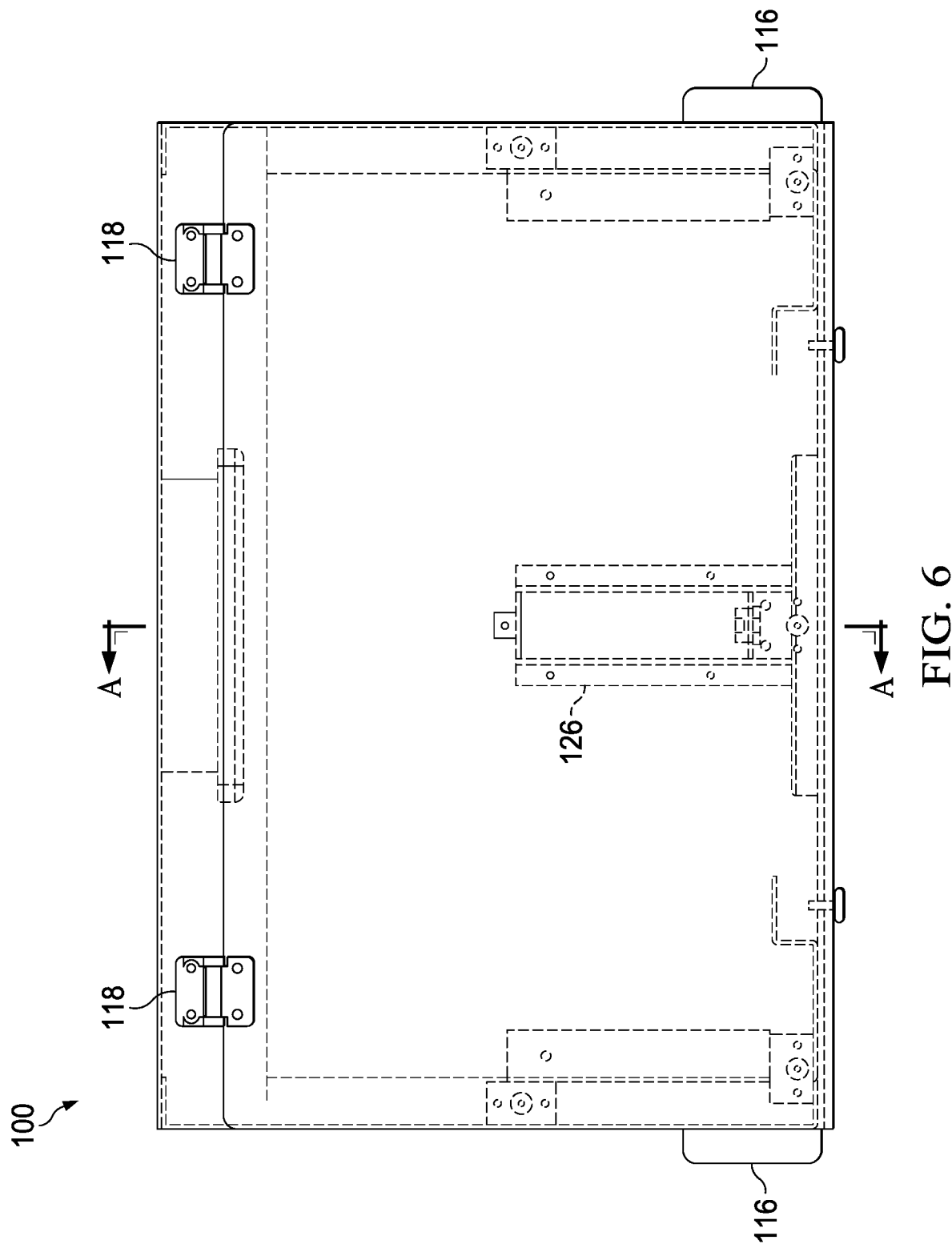

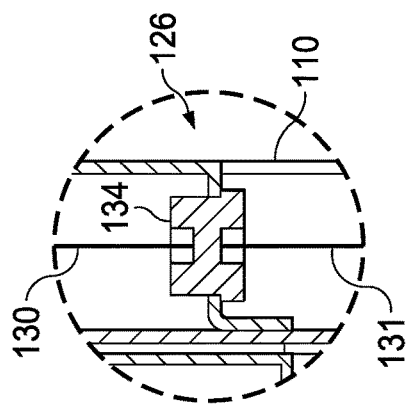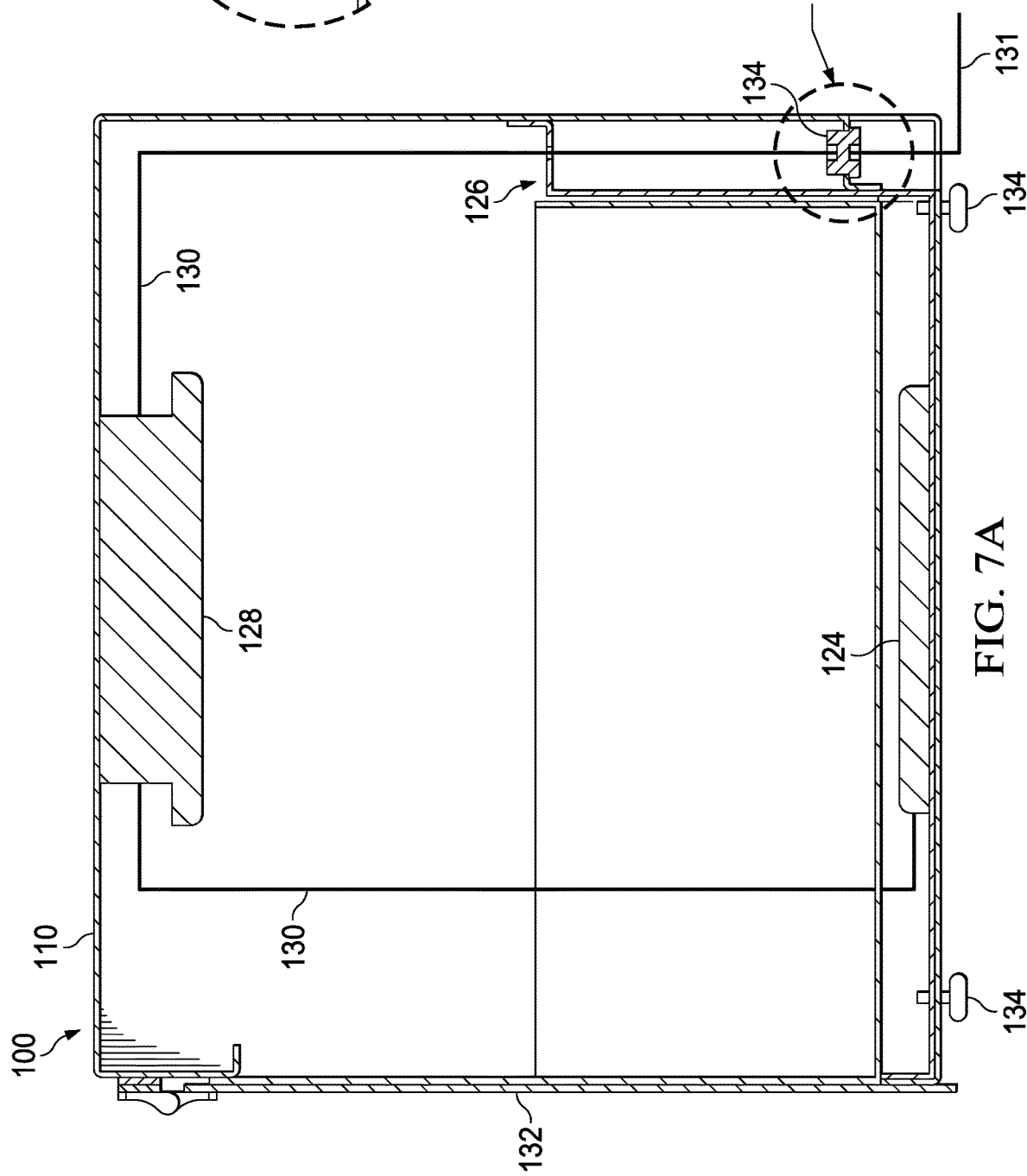

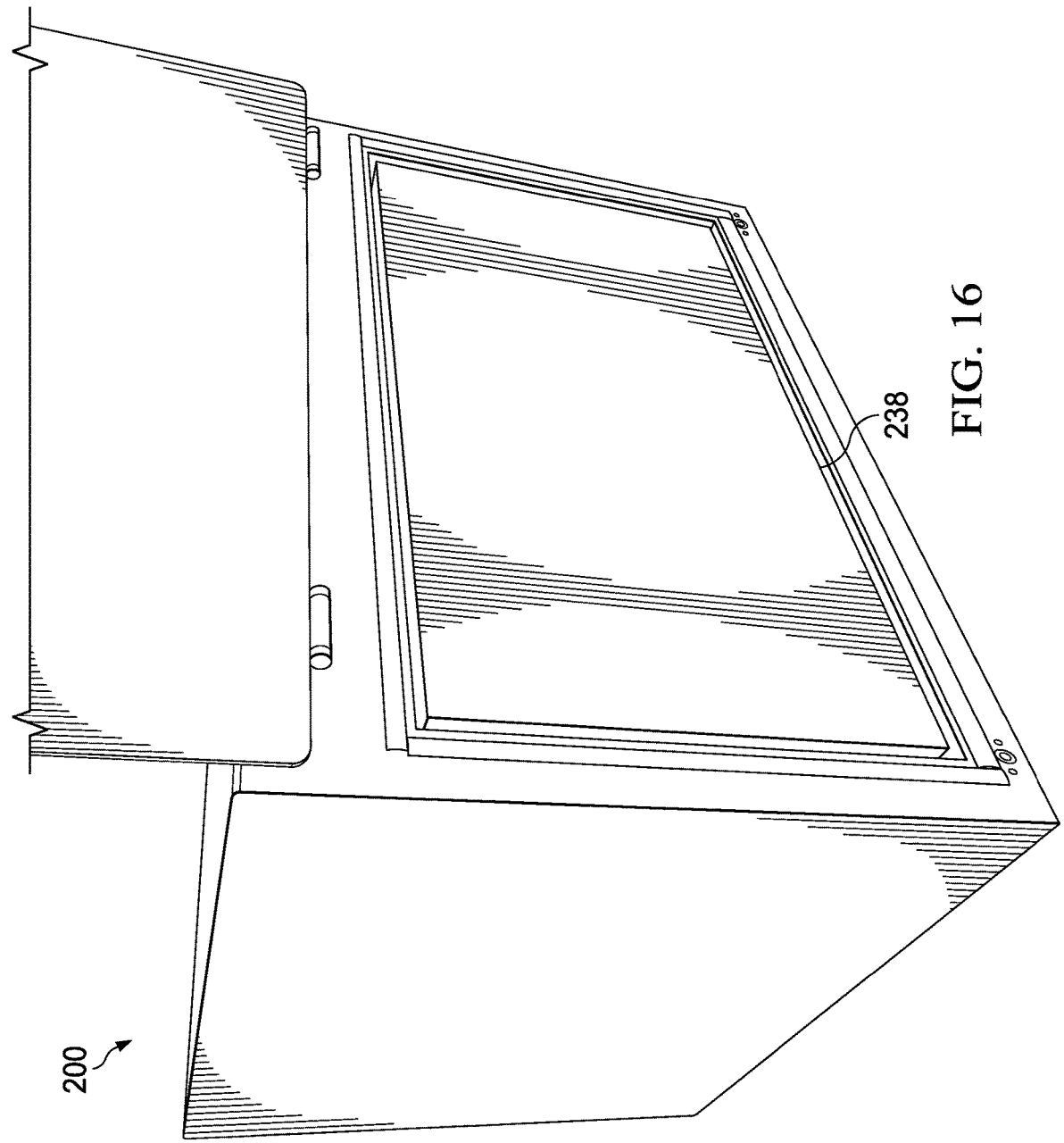

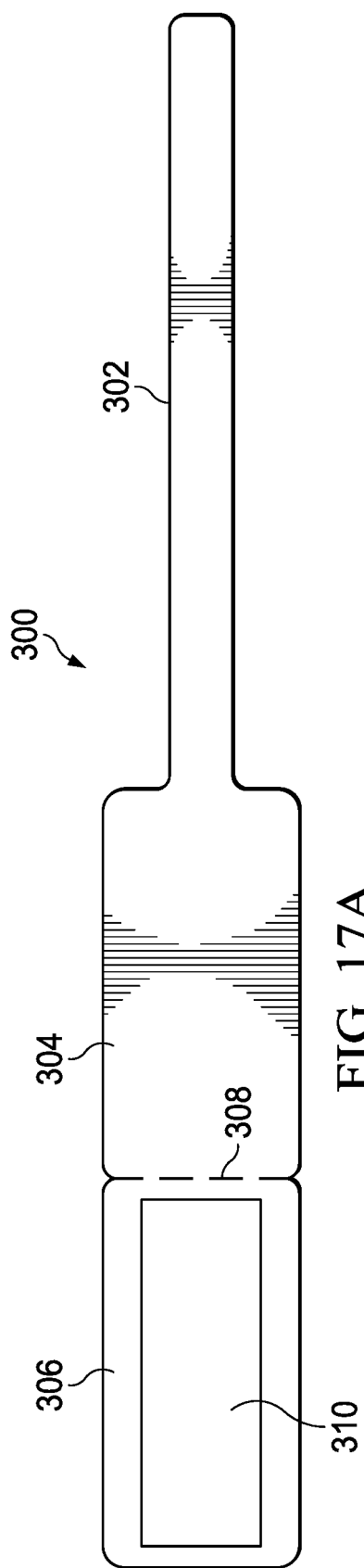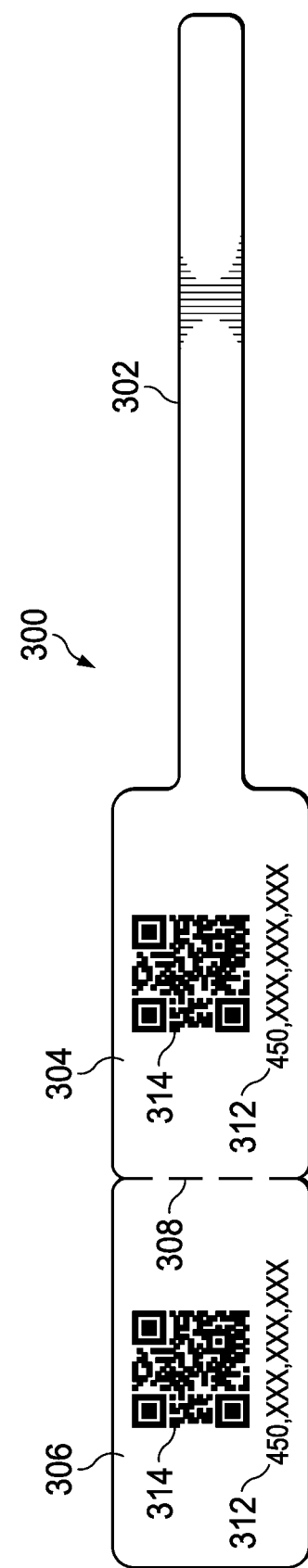

ural such as a crash cart tray, while in other embodiments the RFID box may be sized and shaped to receive multiple trays at the same time. The RFID box may have brackets, tabs, or other features that allow it to be secured to a wall for easy access. The box may also have a light that can visually communicate information to users including, for example, whether an item is missing, an item is expired, or whether an unauthorized user has accessed the device.

The RFID tags may comprise a thin tail section for attachment to the objects to be inventoried and a pair of tabs separated from one another by a perforation. The tabs may include an RFID antenna and indication markers such as serial number, bar codes, and QR codes. Furthermore, the tabs may be configured to be folded against one another such that they create a flag. Alternatively, the second tab, which has the RFID antenna, may be torn from the first tab and adhered directly to the object to be inventoried.

An object of the present invention is to provide an RFID bulk scanning device that can be manufactured with relatively minimal labor effort and cost.

It is a further object of this invention to provide an RFID bulk scanning device that can scan objects to be inventoried located therein with a high degree of accuracy.

It is a further object of this invention to provide an RFID bulk scanning device that prevents electromagnetic leakage and interference.

It is a further object of this invention to provide an RFID bulk scanning system that can compare the current contents of the RFID bulk scanning device with a baseline data to determine, among other things, whether an item is missing or expired.

It is a further object of this invention to provide an RFID tag that can work efficiently with said RFID bulk scanning device and system.

It is a further object of this invention to provide an RFID scanning device that is compact and has wide utility.

It is a further object of this invention to provide RFID scanning devices of the type generally described herein, being adapted for the purposes set forth herein, and overcoming disadvantages found in the prior art. These and other advantages are provided by the invention described and shown in more detail below.

BRIEF DESCRIPTION OF THE DRAWINGS

Novel features and advantages of the present invention, in addition to those mentioned above, will become apparent to those skilled in the art from a reading of the following detailed description in conjunction with the accompanying drawings wherein identical reference characters refer to identical parts and in which:

FIG. 6 is a rear view of the RFID box of FIG. 1 indicating section line A-A;

FIG. 7A is a side sectional view taken along section line A-A of FIG. 6 and indicating Detail A;

FIG. 7B is a detailed side sectional view of Detail A shown in FIG. 7A;

FIG. 16 is a perspective view of the RFID box of FIG. 11 with the inventory basket of FIG. 15 located therein;

FIG. 17A is a rear view of an exemplary RFID tag for use with the present invention;

FIG. 17B is a front view of the RFID tag of FIG. 17A;

DETAILED DESCRIPTION OF THE INVENTION

Figure 1:
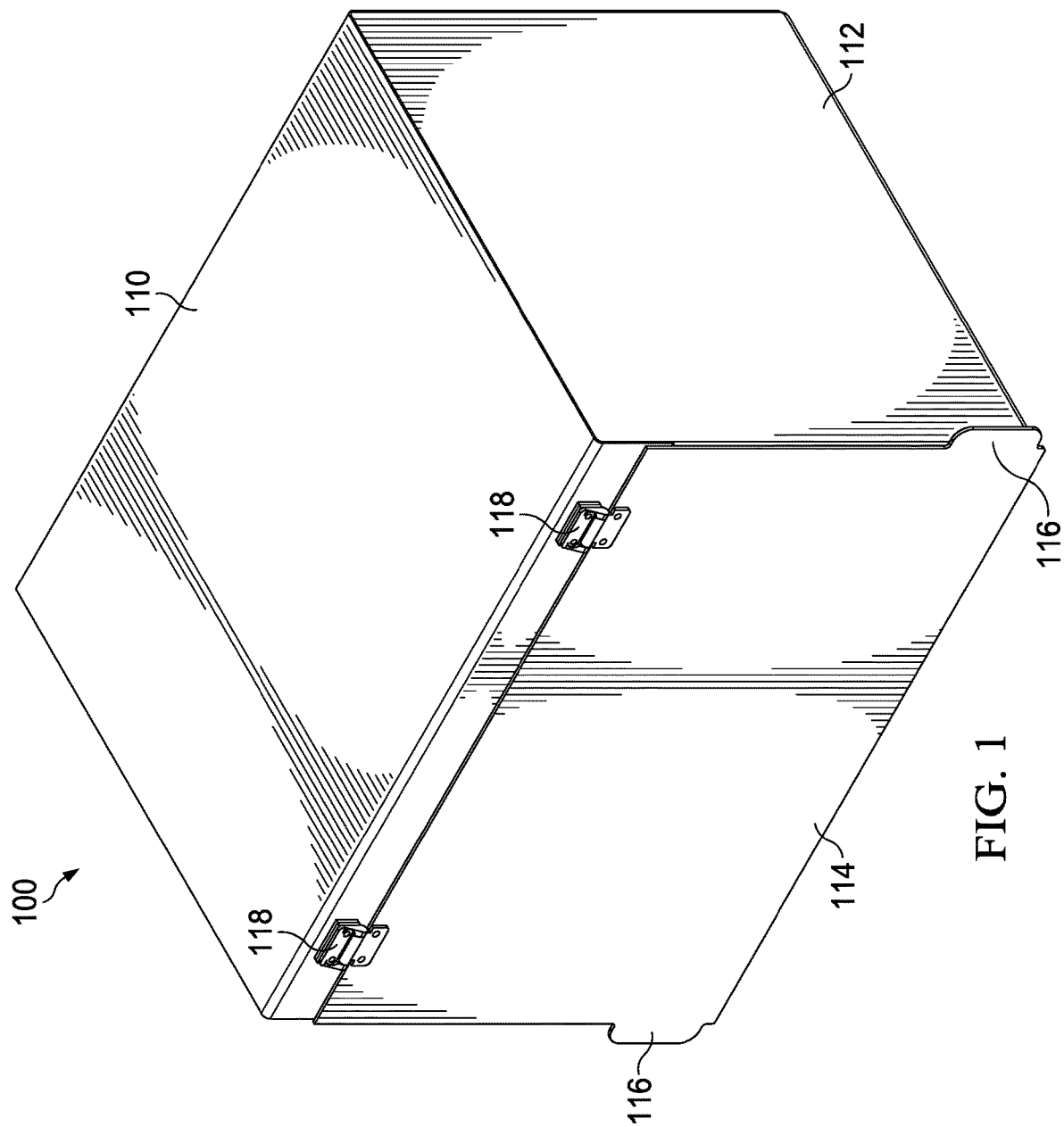
FIG. 1 is a perspective view of an exemplary embodiment of RFID box in accordance with the present invention.

FIG. 1 though FIG. 7B illustrate an exemplary embodiment of an RFID box 100 in accordance with the present invention. In exemplary embodiments of the present invention, the RFID box 100 is rectangular in shape and comprises a housing. The housing may comprise a door 114, an enclosure 110, and a pair of side panels 112. This is merely exemplary, as any size and shape RFID box 100 is contemplated along with any number of components constituting the housing of said RFID box 100.

The enclosure 110 may be C-shaped such that it forms the top, rear, and bottom surfaces of the housing and surrounds an interior cavity 113 that is accessible through the door 114. The enclosure 110 may additionally include a lip that extends vertically from the top and the bottom surfaces such that it forms a portion of the front surface of the housing and partially defines an aperture in the front surface of the housing. The pair of side panels 112 may be configured to fit within the enclosure 110 on either side thereof such that the side panels 112 forms the side surfaces of the RFID box 100. In exemplary embodiments of the present invention, the side panels 112 may be open top box shaped such that they likewise create a lip that protrudes inwardly from the left and right side panels such that it forms a portion of the front surface of the housing and partially defines an aperture in the front surface of the housing.

One or more hinges 118 may connect the door 114 to the housing such that the RFID box 100 is completely enclosed. In exemplary embodiments of the present invention, a pair of hinges 118 are located on the lip formed along the upper edge of the enclosure 110 and connect the door 114 to the enclosure 110. This may reduce sagging of the door 114 otherwise resulting from placing the hinges on the side of the RFID box 100. Sagging of the door 114 may create gaps in the RFID box 100 housing and result in electromagnetic leakage.

In exemplary embodiments of the present invention, the hinges 118 are continuous tension hinges that are configured to bias the door 114 in the opened position, preferably at a 170° angle from the front surface of the RFID box 100. The door 114 may be sized and located to cover the front of the RFID box 100 and be substantially flush with the side and bottom edges thereof, thereby preferably overlapping with at least a portion of the lip created by the enclosure 110 and the side panels 112. In exemplary embodiments of the present invention, the door 114 may comprise one or more tabs 116 that protrude beyond the side panels 112 to facilitate a user manipulating the door 114 between a closed position and an opened position. In other exemplary embodiments of the present invention, the door 114 may comprise pull handles, knobs, or other devices for opening and closing the door 114.

Figure 2:
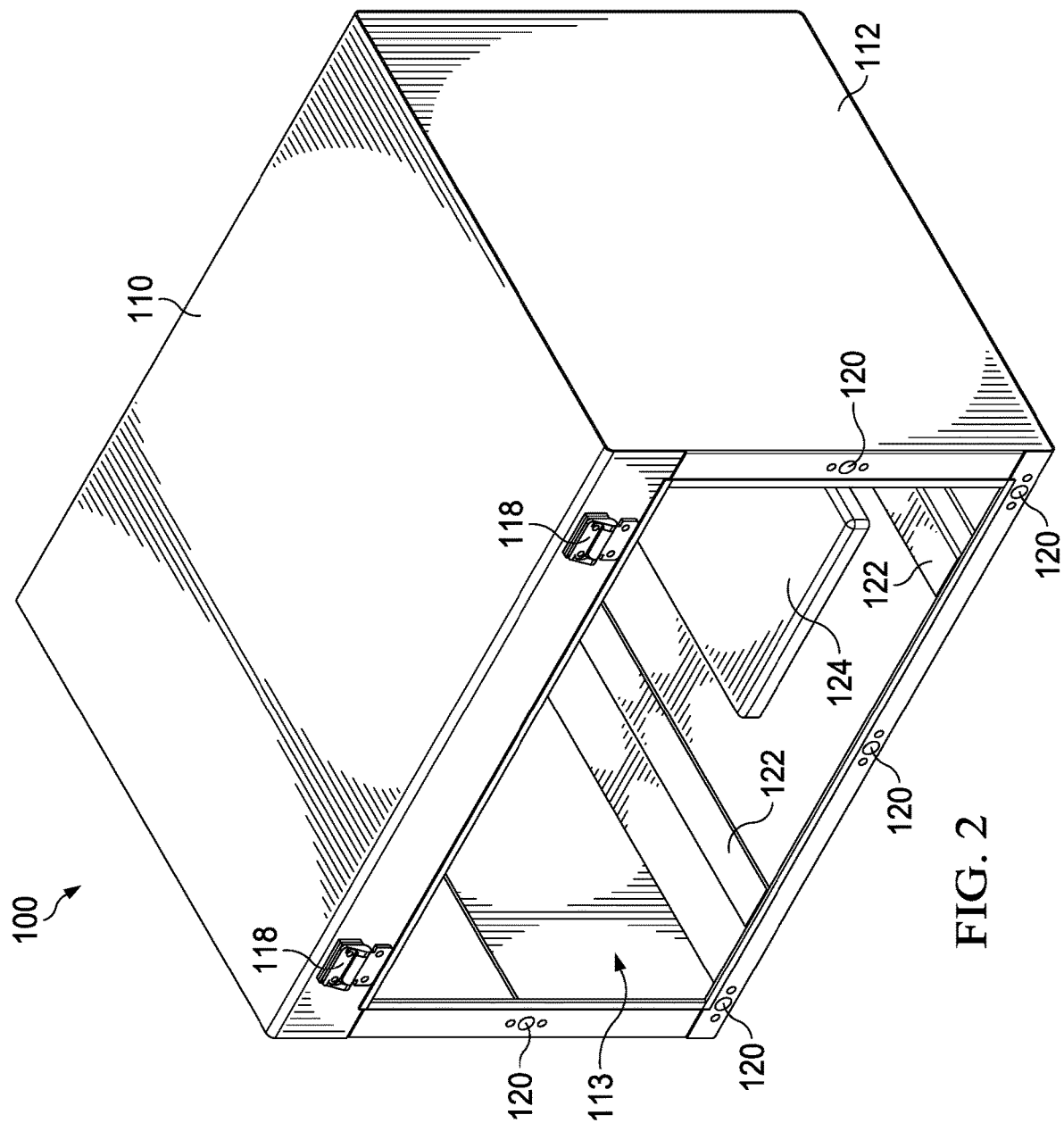
FIG. 2 is a perspective view of the device of the RFID box of FIG. 1 illustrated with the door removed to show in the interior of the RFID box.
Figure 3:
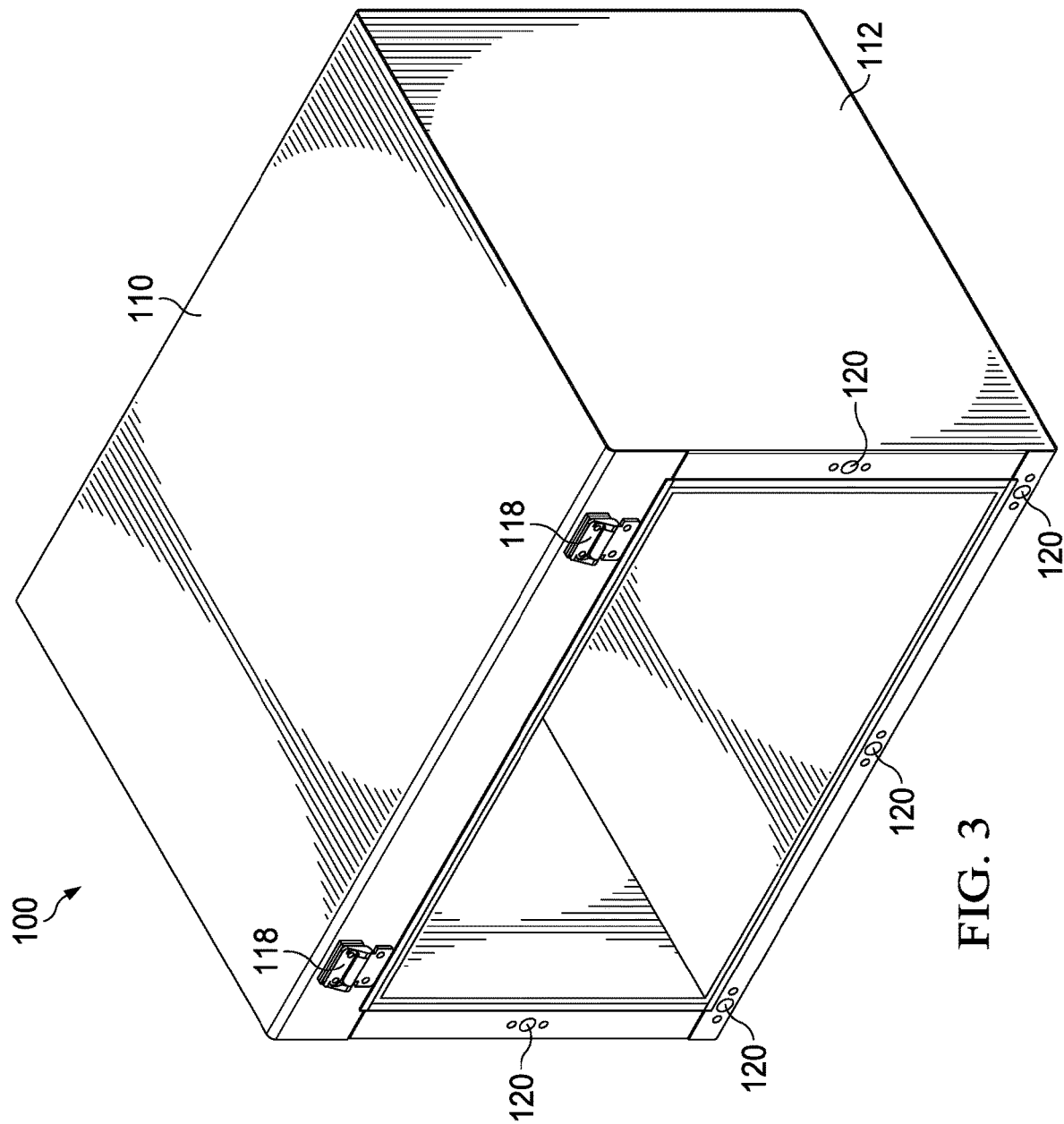
FIG. 3 is a perspective view similar to FIG. 2 shown with some of the interior elements removed to further illustrate the interior of the RFID box.
Figure 4:
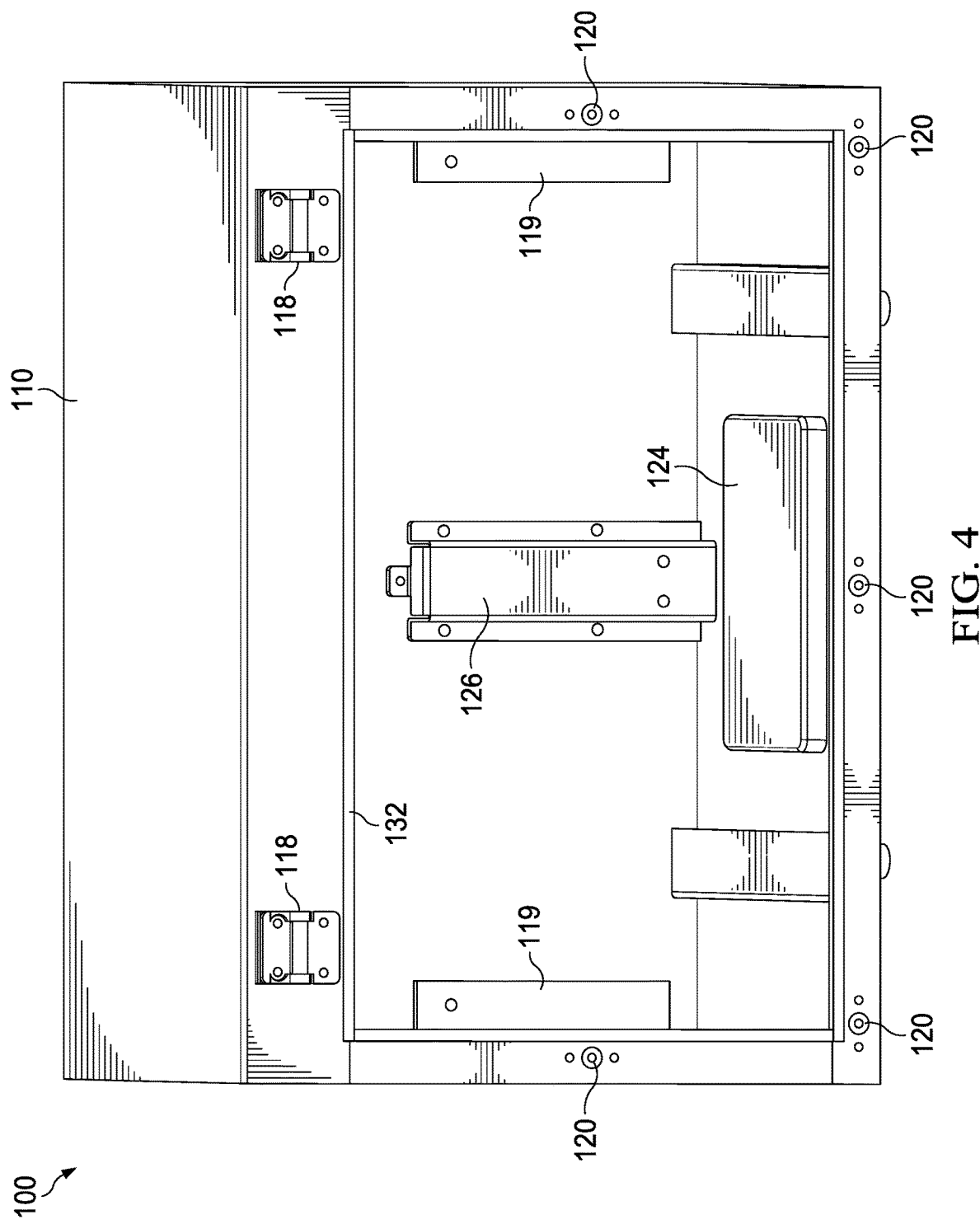
FIG. 4 is a front perspective view of the RFID box of FIG. 1 illustrated with the door removed to show the interior of the RFID box.
Figure 5:
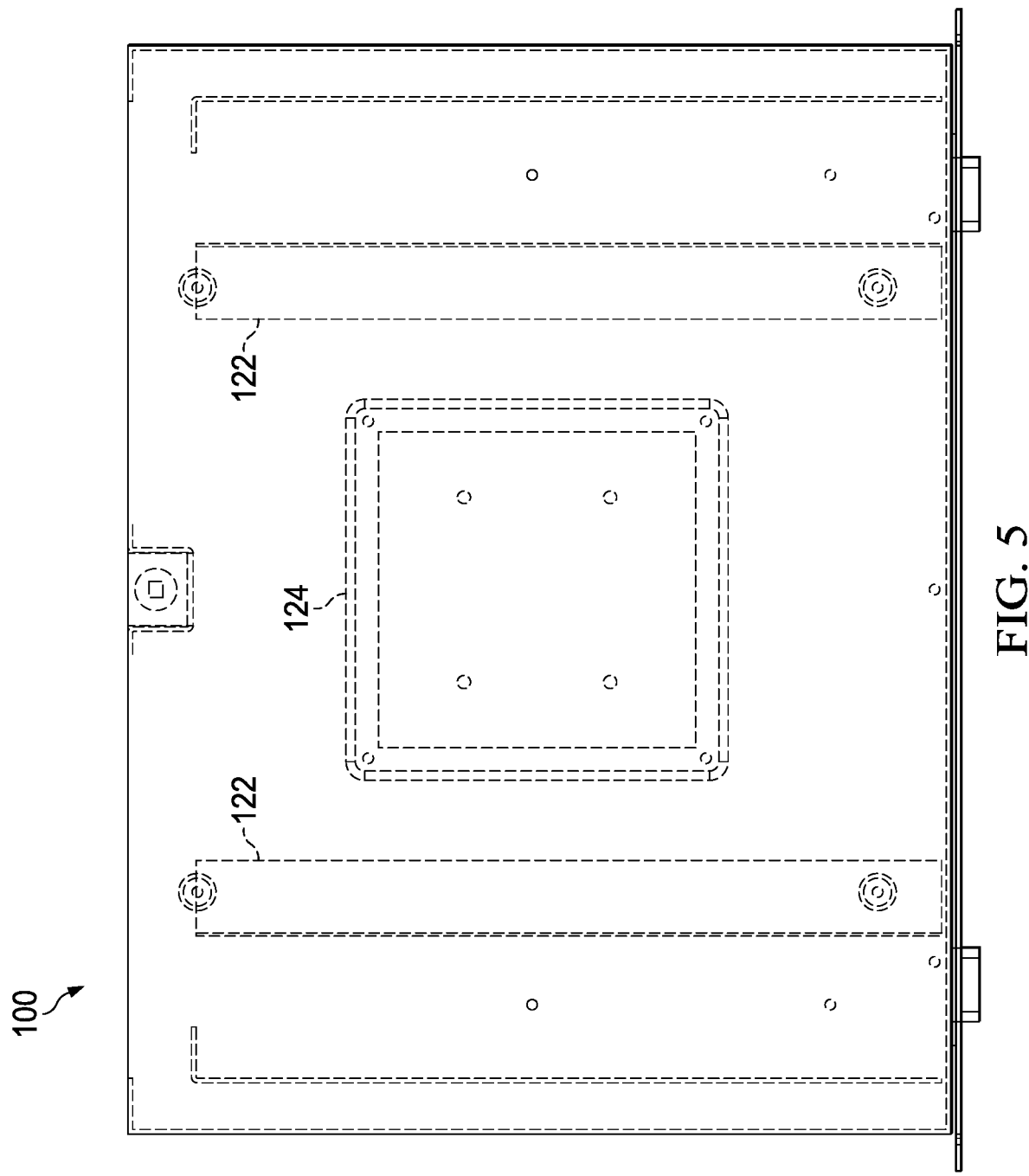
FIG. 5 is a bottom view of the RFID box of FIG. 1.

As best shown in FIG. 2 through FIG. 4, the lip extending around the front of the RFID box 100 may further comprise a number of latches 120. These latches 120 may be configured to temporarily secure the door 114 in the closed position against the housing. The latches 120 may be magnetic devices configured to interact with the door 114 itself or magnets located thereon such that the door 114 is held securely in place against the housing until acted upon by a user.

FIG. 2 through FIG. 4 also illustrates the interior of the RFID box 100. A pair of guide rails 122 may be used to guide an inventory basket 238 (best shown in FIGS. 15-16), tray, or other container for various objects to be inventoried. Any number, size, shape, or location of guide rails 122 are contemplated. In exemplary embodiments of the present invention, the guide rails 122 are configured to mate with the inventory basket 238 or other container and keep it centered as it is placed within the RFID box 100.

A gasket 132 may be located along the perimeter of the front surface of the housing for the RFID box 100. In exemplary embodiments, the gasket 132 may extend along the lip created by the enclosure 110 and the side panels 112. The gasket may be comprised of a conductive material and may be a foam, tape, pad, or the like. An RFID antenna 124 may be located along the bottom surface of the RFID box 100. The RFID antenna 124 may be configured to communicate with a series of RFID tags 300 (as shown in FIGS. 17A-C, for example). Preferably, the guide rails 122 are configured to keep the inventory basket 238 or other container above the RFID antenna 124 and thus prevent inadvertent contact or damage.

As best illustrated in FIG. 7A, an RFID antenna/reader 128 may be located along the top of the RFID box 100. The location of the RFID antenna 124 and RFID antenna/reader 128 are merely exemplary, any location is contemplated. Further, any number of RFID antennas 124 and RFID antenna/reader 128 are contemplated. The RFID antenna 124 and the RFID antenna/reader 128 may be electrically connected, preferably by a wire 130. The wire 130 may comprise wire for supplying power to components of the RFID box 100, including, but not limited to, the RFID antenna 124 and the RFID antenna/reader 128, as well as wire for facilitating the communication of data to and from components of the RFID box 100, including but not limited to the RFID antenna 124 and the RFID antenna/reader 128. In order to minimize electromagnetic leakage, the wire 130 may exit the RFID box 100 thorough a pass through device 126.

In exemplary embodiments of the present invention, the pass through device 126 may be configured to cover the aperture in the RFID box 100 where the wire 130 passes outside of the RFID box 100. The pass-through device 126 may comprise an enclosure defining a channel which extends along the rear wall of the RFID box 100 for the wire 130 to pass through. The pass through device 126 may be fastened, welded, or otherwise adhered to the inside rear wall of the RFID box 100. Preferably, conductive tape is used along the seams between the pass through device 126 and the RFID box 100 to minimize electromagnetic leakage. The pass through device 126 may comprise a coupler 134 (as best illustrated in FIG. 7B) that connects the internal wire 130 to an external wire 131. The coupler 134 may be configured to substantially seal the aperture otherwise required to allow the wire 130 to pass outside of the RFID box 100. In exemplary embodiments of the present invention, the coupler 134 may be a female to female Ethernet and power connector.

One or more mechanical stops 119 may be located along the rear wall of the RFID box 100, though such is not required. The mechanical stops 119 may be configured to prevent the inventory basket 238 or other container from contacting the pass through device 126 and/or the rear wall of the RFID box. In other exemplary embodiments of the present invention, the pass through device 126 may act as a mechanical stop 119.

The components of the RFID box 100, including, but not limited to, the enclosure 110, the side panels 112, and the pass-through device 126 may be fastened, welded, adhered, or otherwise secured in their respective locations preferably by conductive materials. Conductive tape or other conductive material may be additionally placed along the seams of the components of the RFID box 100 so as to minimize RFID leakage. These components may be comprised of a metallic, conductive material such as, but not limited to, aluminum. Specifically, they may be comprised of ⅛" thick aluminum, though any thickness is contemplated. The use of a conductive material may serve to substantially electromagnetically "seal" the RFID box 100, thus minimizing RFID leakage, which thereby ensures accuracy in RFID readings by ensuring that the RFID antenna 124 and RFID antenna/reader 128 only detect RFID signals being emitted from within the RFID box 100.

Figure 8:
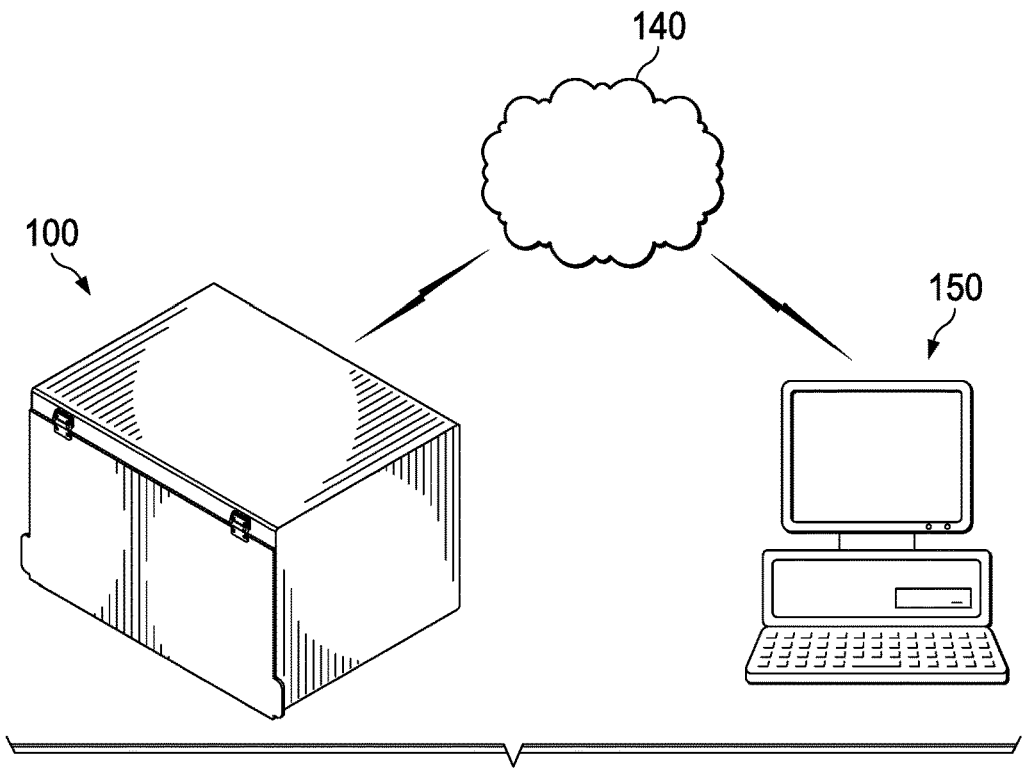
FIG. 8 is a plan view of an exemplary system in accordance with the present invention.

FIG. 8 is a plan view of an exemplary system in accordance with this invention. The system may comprise the RFID box 100, a server 140, and an electronic device 150. The RFID box 100 may be electrically connected to the server 140, which may be electrically connected to the electronic device 150. The electrical connection may be wired or wireless. In exemplary embodiments of the present invention, the server 140 is located remote from the RFID box 100 and the electronic device 150. For example, without limitation, the server 140 may be a cloud based data storage and processing server. Likewise, the electronic device 150 may be located remote from the server 140 and the RFID box 100. The RFID box 100, server 140, and electronic device 150 may be connected via the world wide web, the internet, intranet, or other communications network. The electronic device 150 may be a laptop, personal computer, tablet, smart phone, or the like.

Figure 9:
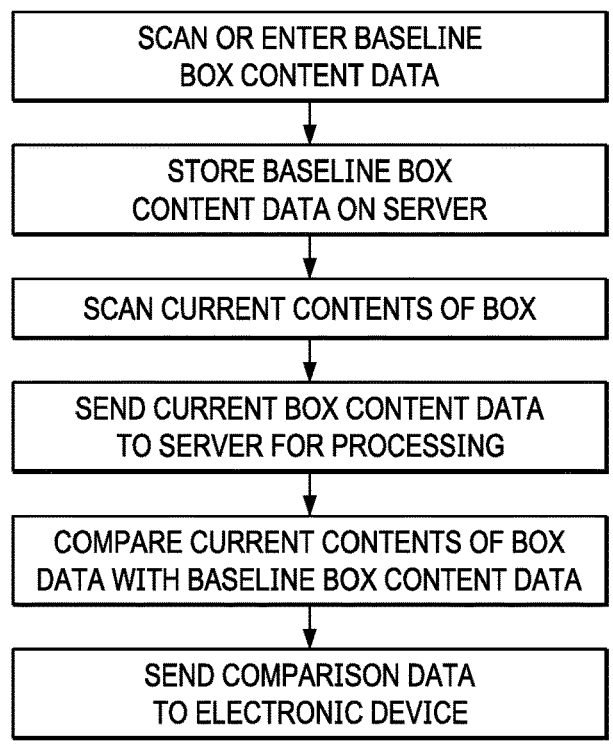
FIG. 9 is a flow chart of exemplary logic for use with the system of FIG. 8 and in accordance with the present invention.
Figure 10:
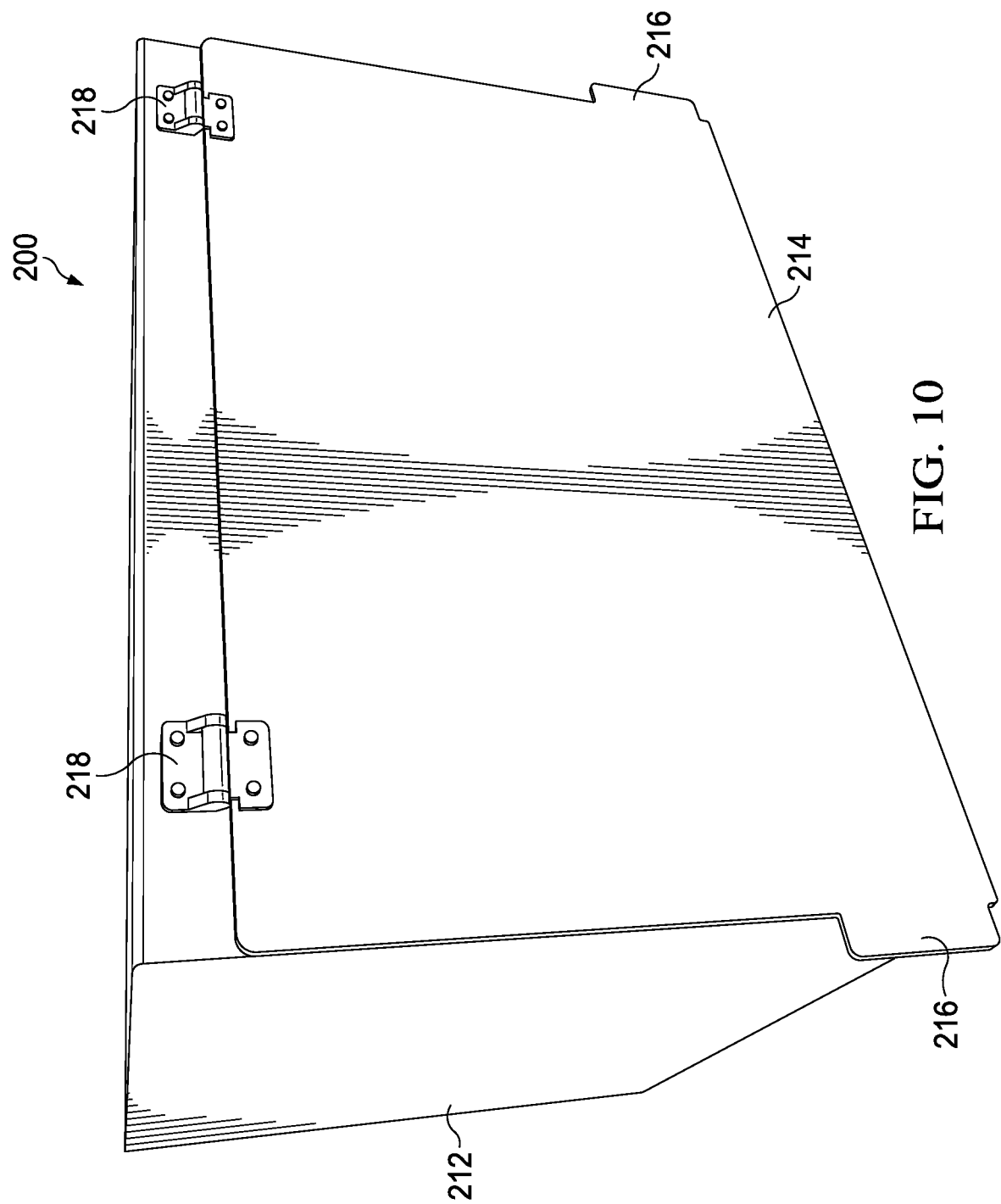
FIG. 10 is a front perspective view of another exemplary embodiment of the RFID box of the present invention.

FIG. 9 is a flow chart of exemplary logic for use with the system of FIG. 8. Initially, the RFID box 100 may perform a scan of the inventory located therein. This may be accomplished by known methods. The data pertaining to contents of the RFID box 100 and related information are hereinafter referred to as the baseline box content data. In other exemplary embodiments of the present invention, the baseline box content data may be generated in whole or part by manual entry. This baseline box content data may include the contents of the RFID box 100, names for the contents, serial numbers, and the like. For example, but without limitation, the RFID box 100 may be used in a medical setting for the inventory of medications. In such a case, the baseline box content data may include the number, type, name, expiration date, prescribing physician, date stored, date removed, and the like for each medication in the RFID box 100. Of course, this application is merely exemplary and is not intended to be limiting. Any application for the RFID box 100 is contemplated.

The baseline box content data may be transmitted to and stored on the server 140. At a later time, the contents of the RFID box 100 may be scanned and the data recorded, this data is hereinafter referred to as the current box content data. The current box content data may then be transmitted to the server 140 for storage and processing. The server 140 may compare the current box content data with the baseline box content data and produce summary of the comparison, hereinafter referred to as the comparison data. The comparison data may then be transmitted to the electronic device 150 for display.

Figure 11:
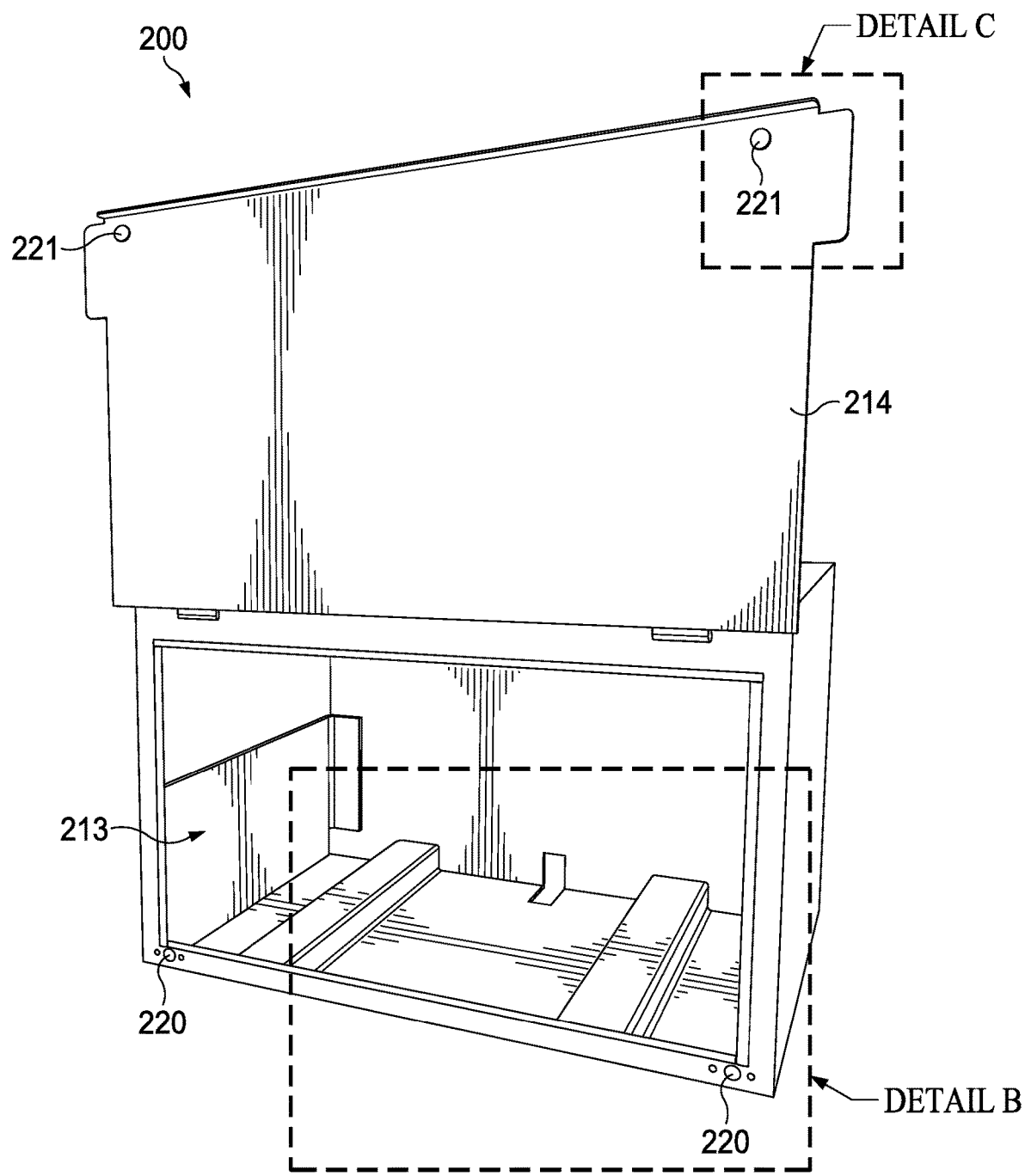
FIG. 11 is a front perspective view of the device of FIG. 10 shown with the door in an opened position and indicating Detail B and Detail C.
Figure 12:
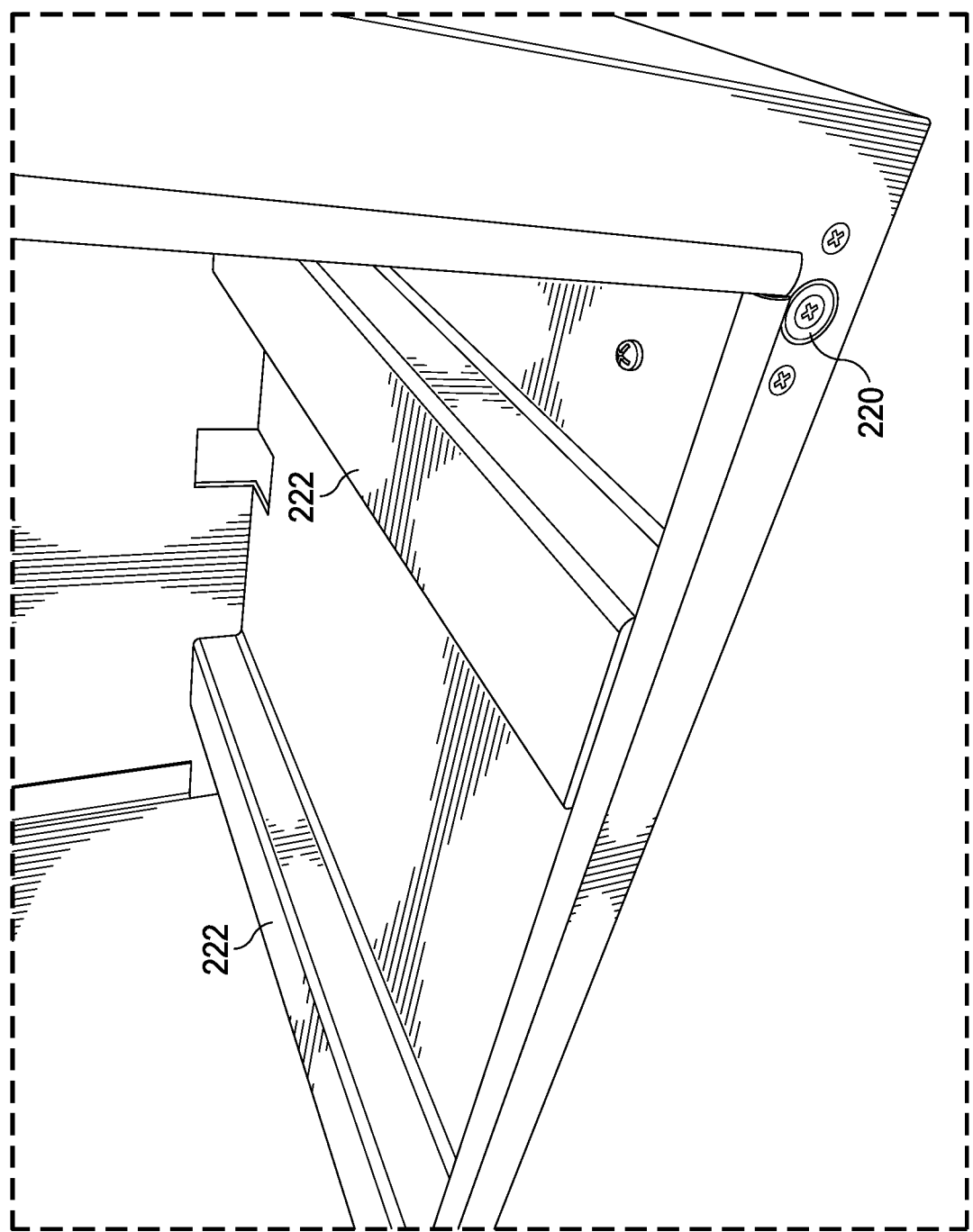
FIG. 12 is a detailed front perspective view of Detail B shown in FIG. 11.
Figure 13:
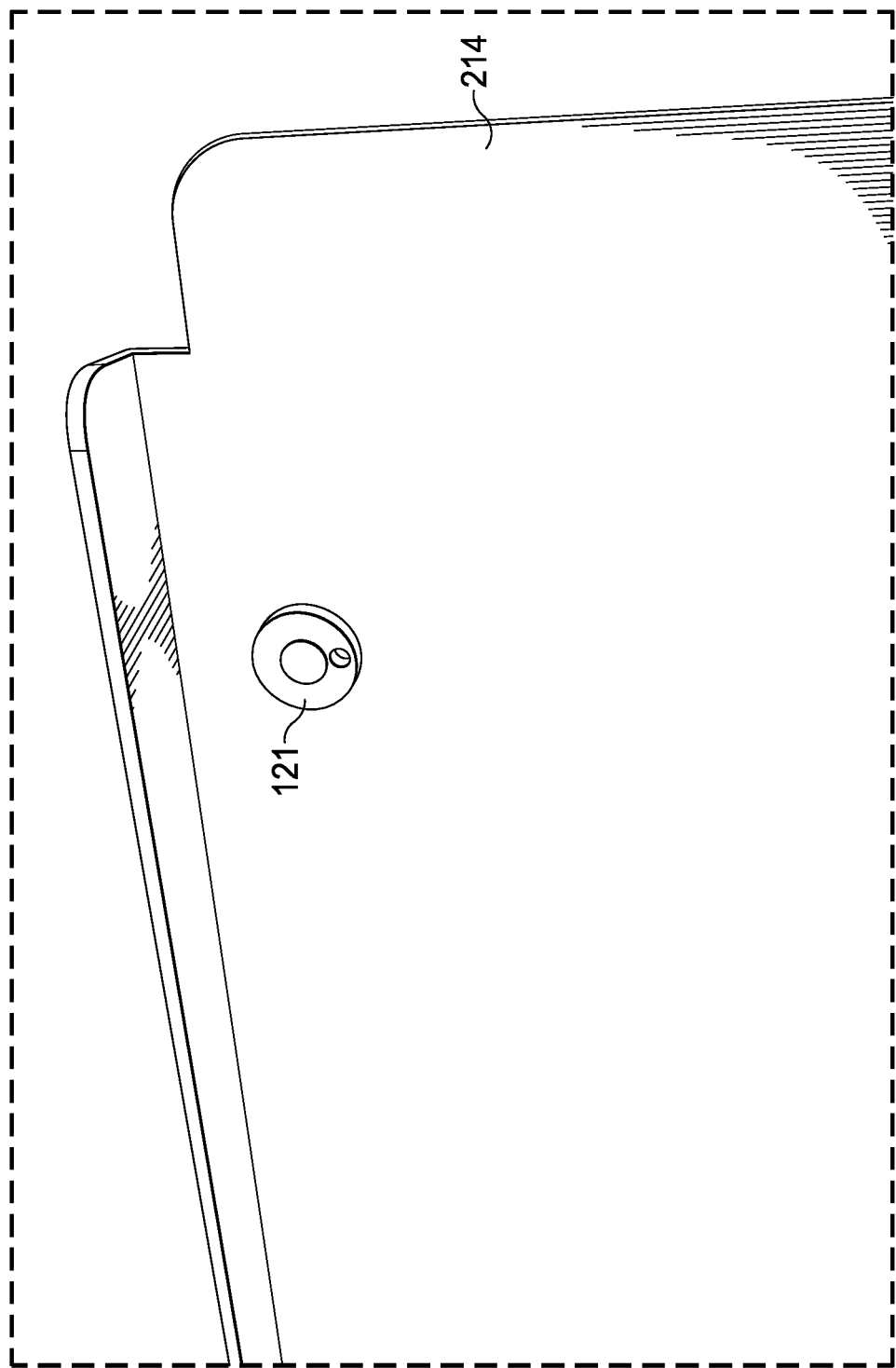
FIG. 13 is a detailed front perspective view of Detail C shown in FIG. 11.

FIG. 10 through FIG. 16 illustrates another exemplary embodiment of the present invention. In these figures, like elements have been labeled similarly to the first embodiment (e.g., RFID box 200, interior enclosure 213, door 214, tabs 216, guide rails 222, etc.). FIG. 11 through FIG. 13 illustrate how the latches 220 may interact. For example, the latches 220 may be magnetic devices placed on the lip of the RFID box 200 and may be configured to interact with a series of magnets 221 placed on the door 214. The magnets may be located and oriented such that they are attracted to one another and hold the door 214 shut when the door 214 is located in a closed position.

Figure 14:
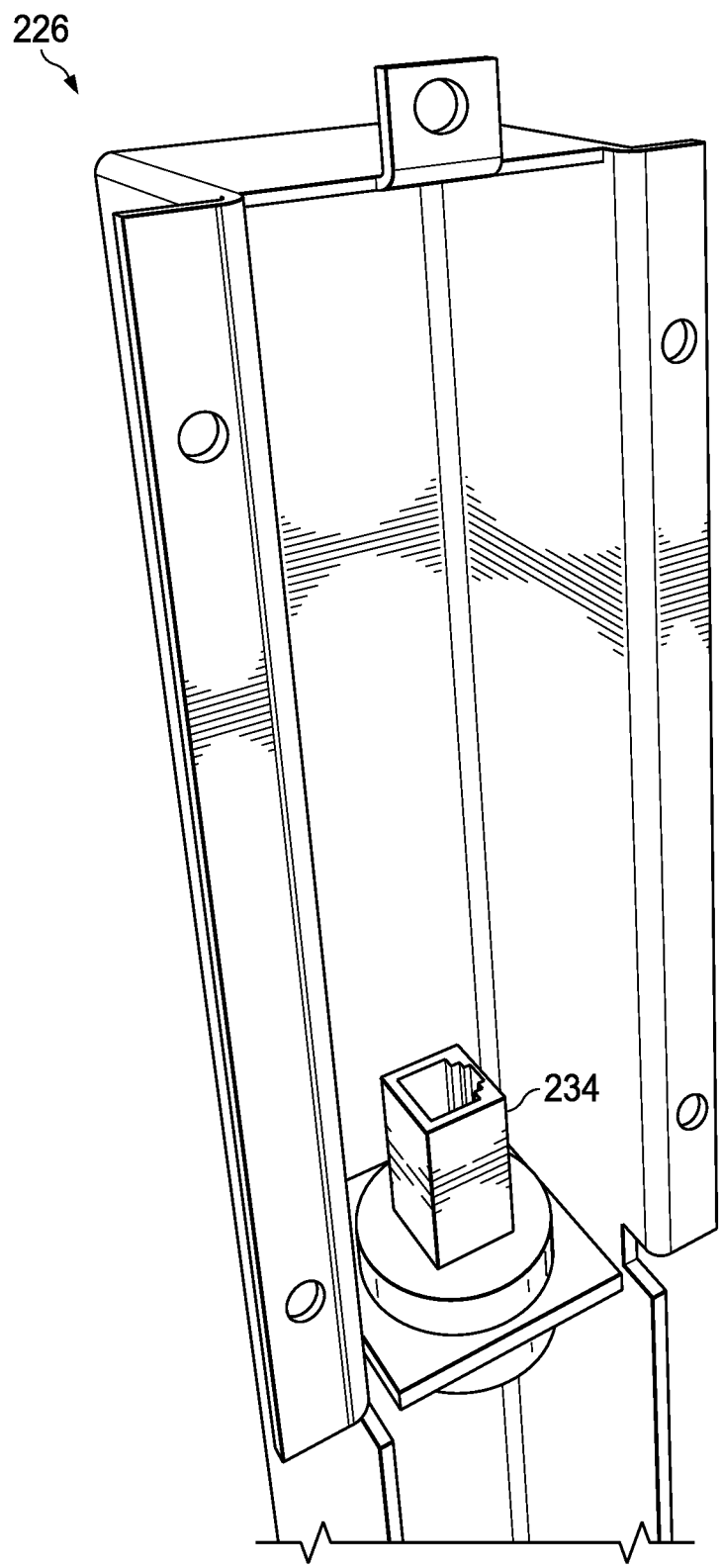
FIG. 14 is a detailed front perspective view of an exemplary pass through device used with the RFID box of FIG. 10.

FIG. 14 illustrates the rear view of and interior of another exemplary pass through device 226. In the present embodiment, the pass-through device 226 may be substantially rectangular in shape and contain the coupler 234 positioned on a bottom portion thereof and extended between a plate that substantially fills the interior of the pass-through device 226.

Figure 15:
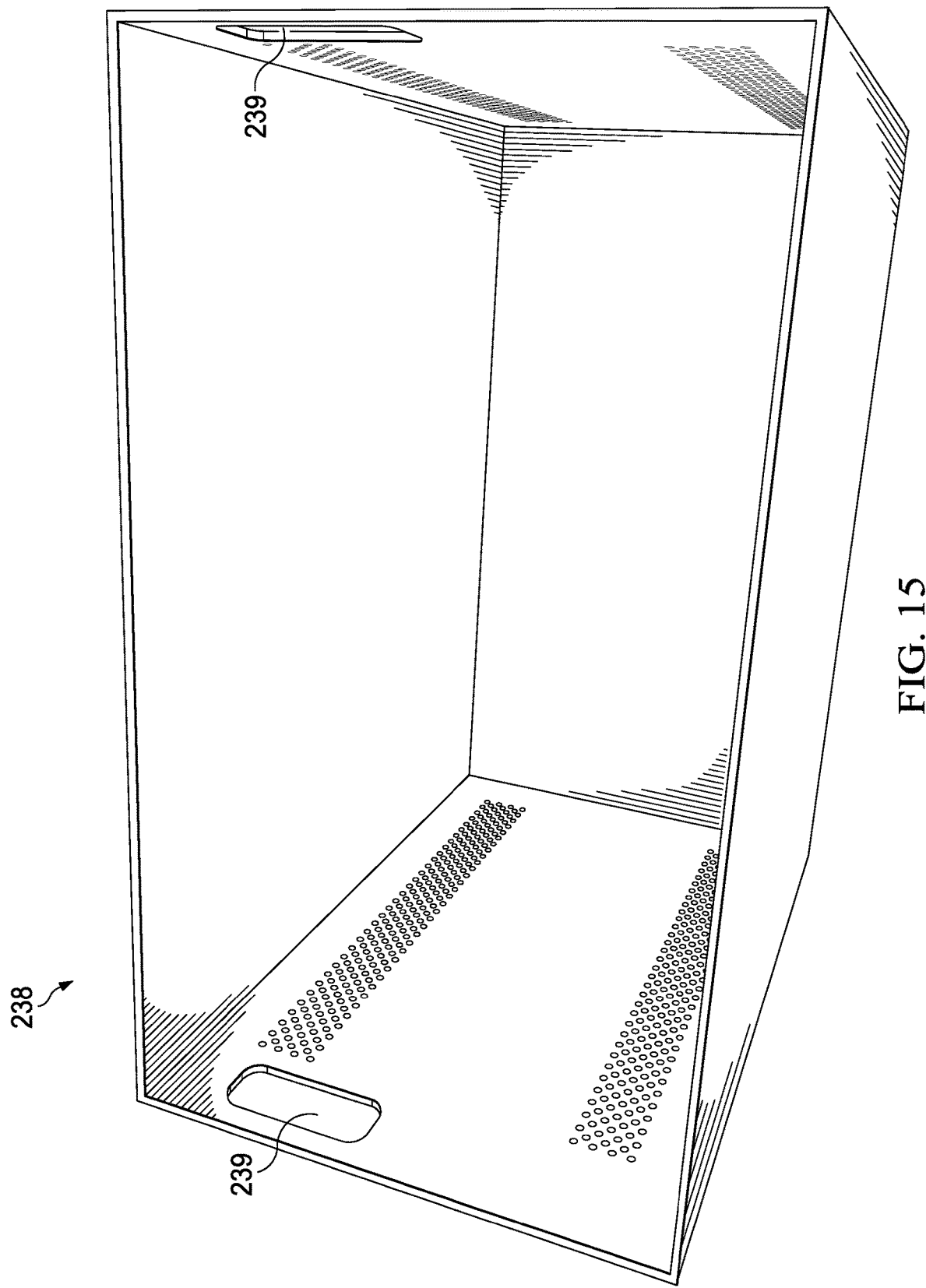
FIG. 15 is a perspective view of an inventory basket used with the RFID box of FIG. 10.
Figure 18:
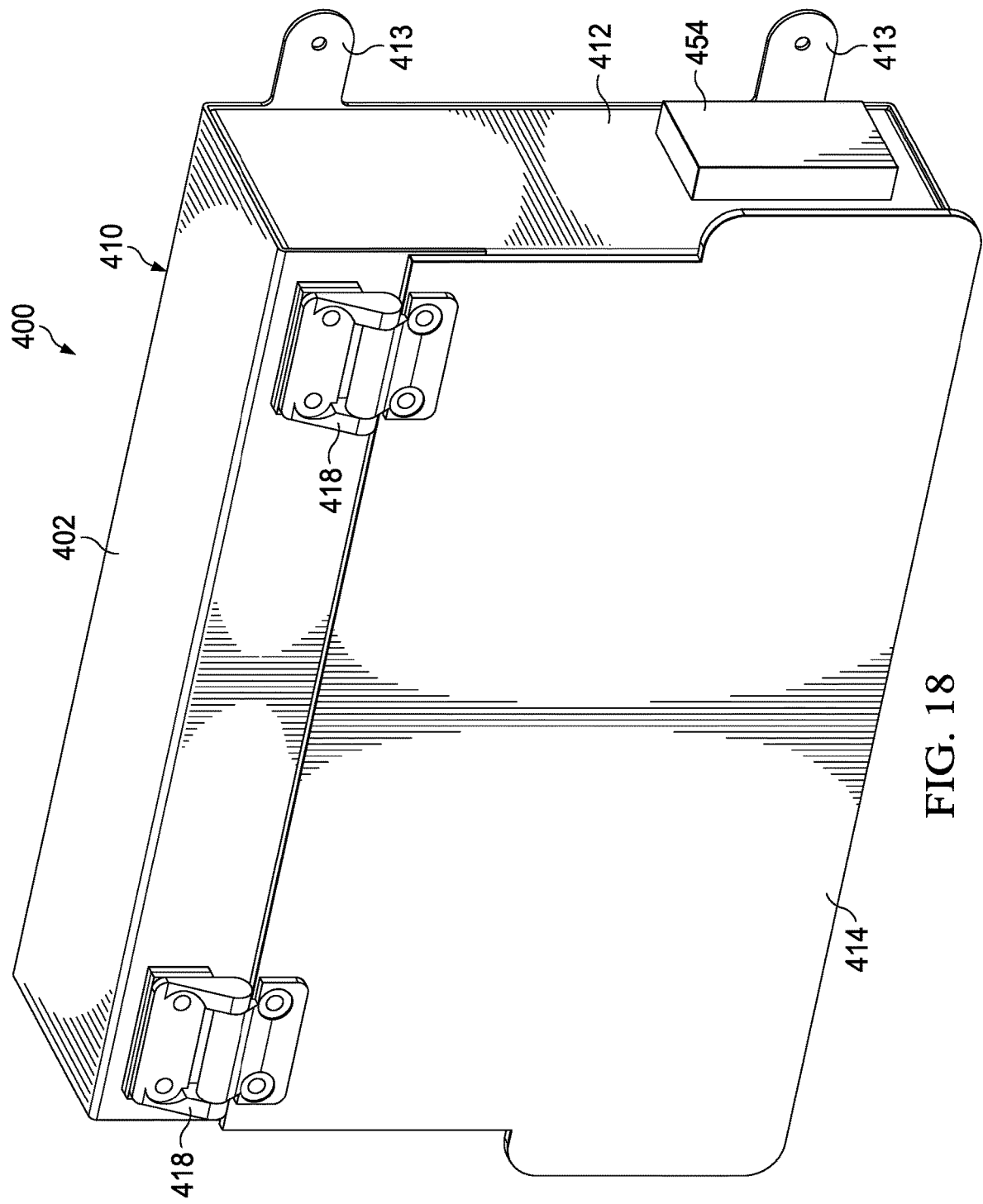
FIG. 18 is a perspective view of an exemplary RFID distribution box.
Figure 19:
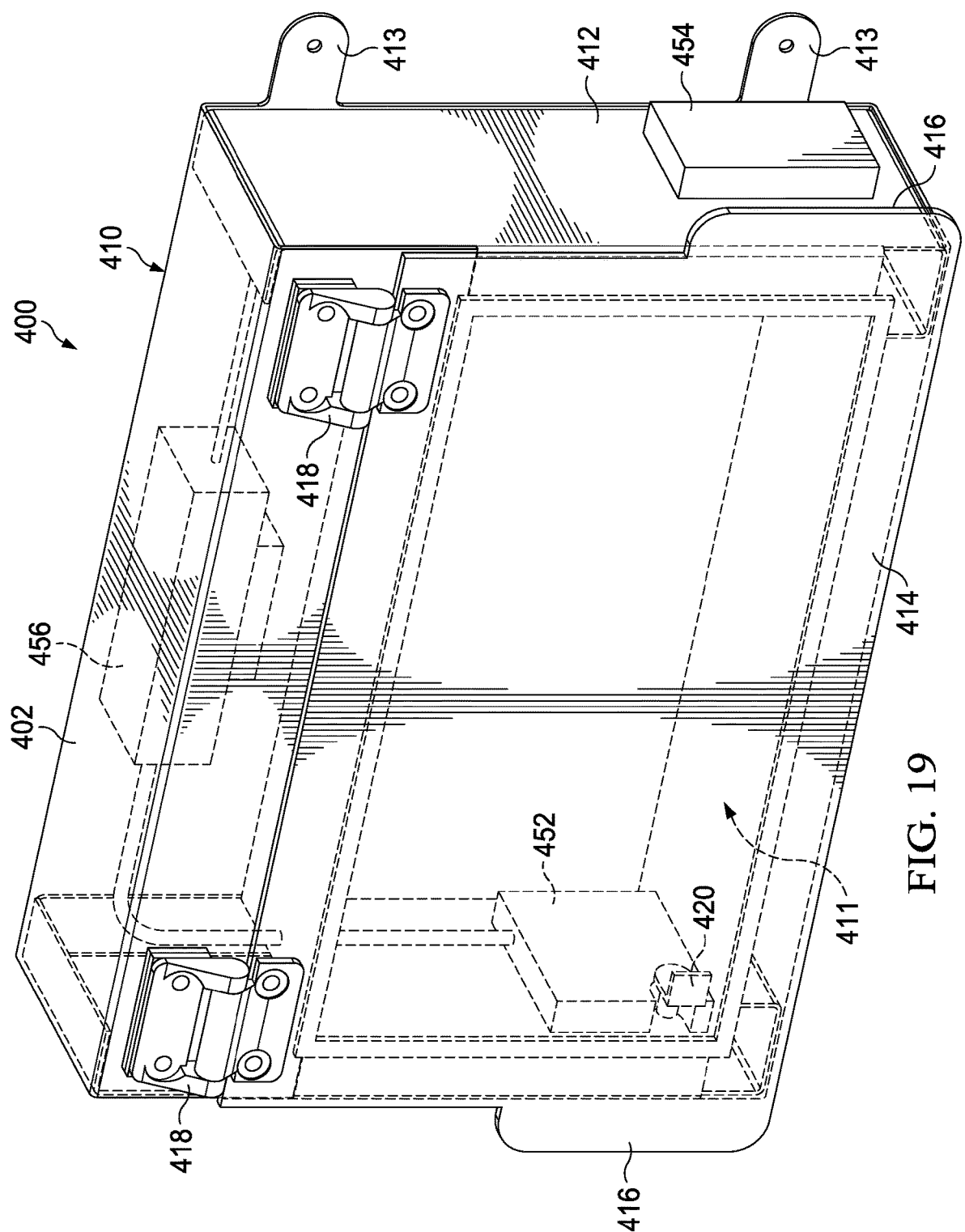
FIG. 19 is a perspective partially transparent view of the device of FIG. 18.

In exemplary embodiments of the present invention, as illustrated in FIGS. 15 and 16, the inventory basket 238 may be sized and configured to substantially fill the interior cavity of the RFID box 200. The inventory basket 238 may comprise grab handles 239 for ease of use.

FIGS. 17A and 17B illustrate an exemplary RFID tag 300 for use with the present invention. The RFID tag 300 may comprise a tail section 302 connected to a first tab 304, which is connected to a second tab 306. The first tab 304 and the second tab 306 may be separated by a perforation 308. Some or all of the rear surface of the RFID tag 300 may comprise an adhesive such that the RFID tag 300 may be placed on an object to be inventoried, such as, but not limited to, a medication container. The tail section 302 may be sized and configured to wrap around an object to be inventoried such that the first tab 304 sticks out from the object to be inventoried. Preferably, the tail section 302 has a reduced thickness relative to the first and second tabs 304 and 306 such that the object to be inventoried can be clearly seen. For example, without limitation, if placed around a medicine container, the label on the container and the drug itself can be clearly viewed. The second tab 306 may be removed, preferably along the perforation 308, and adhered to an object to be inventoried. In other exemplary embodiments, the second tab 306 may be folded onto the first tab 304 along the perforation 308 to form a flag.

The first tab 304 and the second tab 306 may each comprise an identification number 312 and/or a code 314 such as, but not limited to, a bar code, QR code, or the like. The second tab 306 may further comprise an RFID antenna 310 configured to communicate with the RFID antennas 124 and the RFID antenna/reader 128.

In an exemplary embodiment, each tab 306, 304 has a length of approximately 1.189 inches and a height of 0.6 inches. The tail has a height of 0.188 inches. The RFID tag 300 has an overall length of 4.75 inches, prior to any folding. The RFID tag has a thickness of 0.005 inches. In other embodiments, the dimensions of the RFID tag may vary as desired. Any size, shape, or design of the RFID tag 300 is contemplated.

A further exemplary embodiment of the invention that includes access control and auditing features is depicted in connection with FIGS. 18-25. In applications in which the present invention is deployed in connection with control substance inventories and other similarly controlled and dangerous items, it may be desirable for access to such inventories to be monitored and controlled. In the case of pharmaceutical deployment, for instance, such as at a healthcare facility, drugs inventoried utilizing the RFID box discussed herein may be distributed about the facility for use and expedient access during the provision of healthcare services. For example, distribution boxes such as box 400 may be placed in convenient locations throughout a facility for access by healthcare professionals, patients and the like, as needed.

In some embodiments, the distribution boxes may be networked with an inventory system such as shown in connection with FIG. 8 above, and may log deposits and withdraws of an inventory kit or basket and the contents thereof at each event. In other embodiments, the distribution boxes may be configured to authenticate a user attempting to access the box before access is granted. In some of these embodiments, the distribution boxes may further or separately track box access for audit purposes or regulatory compliance, for example, such as for use in furthering Joint Commission (JCAHO) compliance goals.

An exemplary embodiment of the distribution box 400 is shown with Faraday cage construction shielding methods similar to those described in connection with the RFID box 100. An enclosure 410 may be C-shaped such that it forms the top 402, rear 404, and bottom 406 surfaces of the housing. The enclosure 410 may additionally include lips 408 and 409 that extend vertically from the top 402 and the bottom 406 surfaces such that it forms a portion of the front surface of the housing and partially defines an aperture 411 in the front surface of the housing. In some embodiments, it may be convenient to mount the invented distribution box 400 on a vertical surface, such as the wall of a hospital operating room or patient room, such that mounting brackets 413 are provided for securing said box 400 to said vertical surface. A pair of side panels 412 may be configured to fit within the enclosure 410 on either side thereof such that the side panels 412 forms the side surfaces of the distribution box 400. In exemplary embodiments of the present invention, the side panels 412 may be open top box shaped such that they likewise create a lip that protrudes inwardly from the left and right side panels such that it forms a portion of the front surface of the housing and partially defines an aperture 411 in the front surface of the housing.

One or more hinge mechanisms 418 may connect the door 414 to the housing such that the distribution box 400 is completely enclosed. In an exemplary embodiment of the present invention, one or more hinges 418 are located on the lip formed along the upper edge of the enclosure 410 and connect the door 414 to the enclosure 410. This may reduce sagging of the door 414 otherwise resulting from placing the hinges on the side of the distribution box 400. Sagging of the door 414 may create gaps in the distribution box 400 housing and result in electromagnetic leakage, which is undesirable in applications in which the inventory items in a kit are being logged.

In exemplary embodiments of the present invention, the hinges 418 are continuous tension hinges that are configured to bias the door 414 in the opened position, preferably at a 170° angle from the front surface of the distribution box 400. The door 414 may be sized and located to cover the front of the distribution box 400 and be substantially flush with the side and bottom edges thereof, thereby preferably overlapping with at least a portion of the front face of the box 400 created by the lips of the enclosure 410 and the side panels 412. In exemplary embodiments of the present invention, the door 414 may comprise one or more tabs 416 that protrude beyond the side panels 412 to facilitate a user manipulating the door 414 between a closed position and an opened position. In other exemplary embodiments of the present invention, the door 414 may comprise pull handles, knobs, or other devices for opening and closing the door 414.

Figure 20:
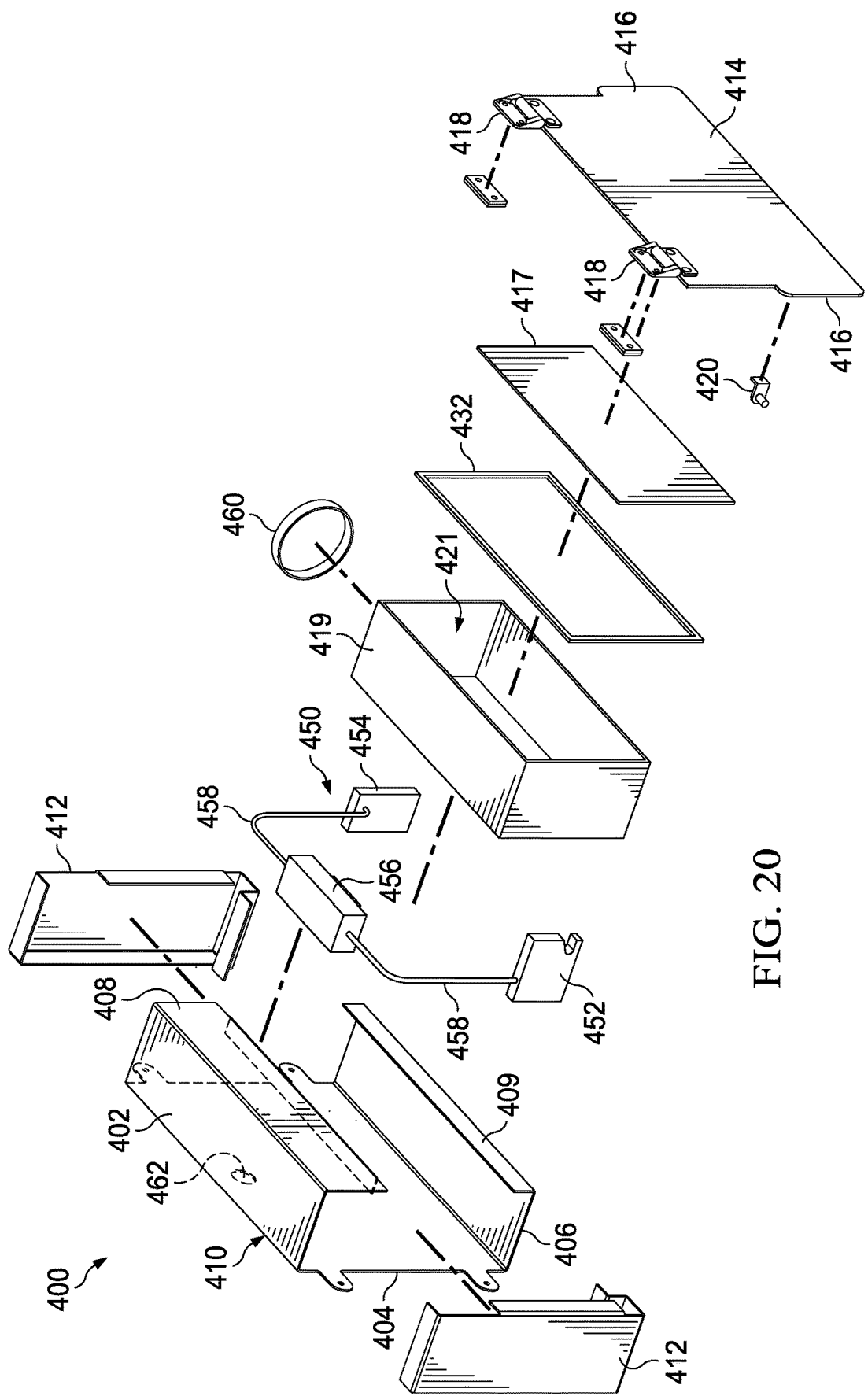
FIG. 20 is an exploded view of the device of FIG. 18.
Figure 21:
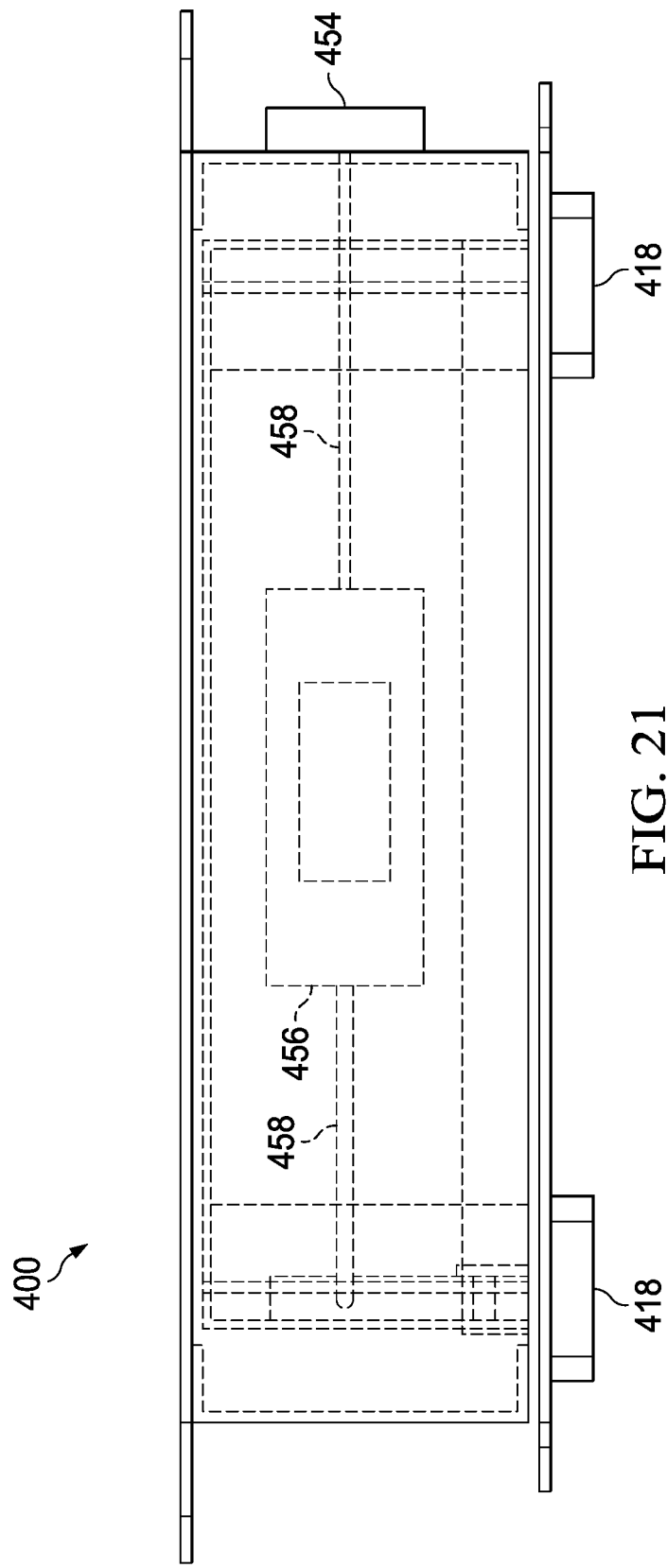
FIG. 21 is a top plan view of the device of FIG. 18 with transparency.
Figure 22:
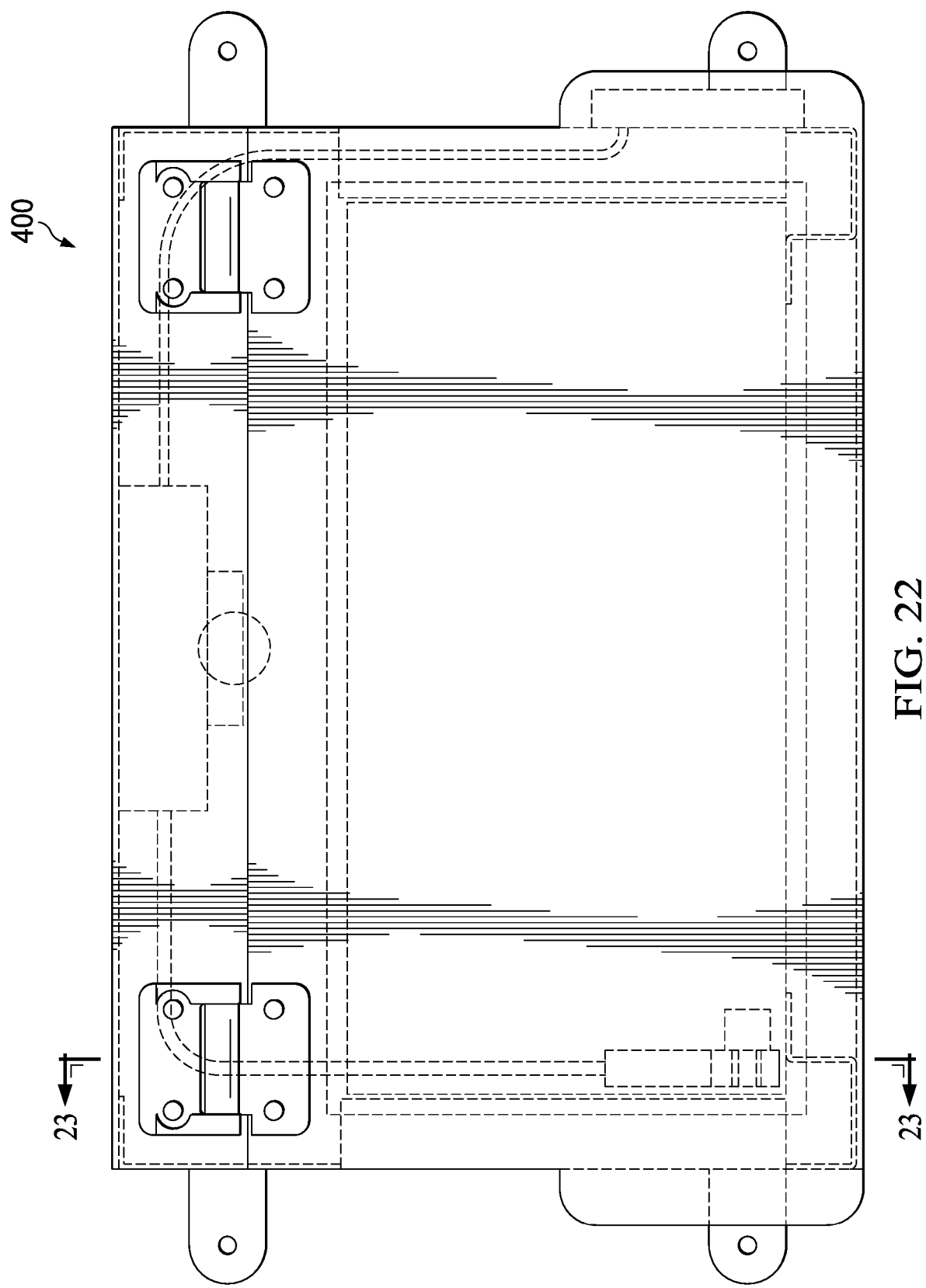
FIG. 22 is a front elevation view of the device of FIG. 18 with transparency.
Figure 23:
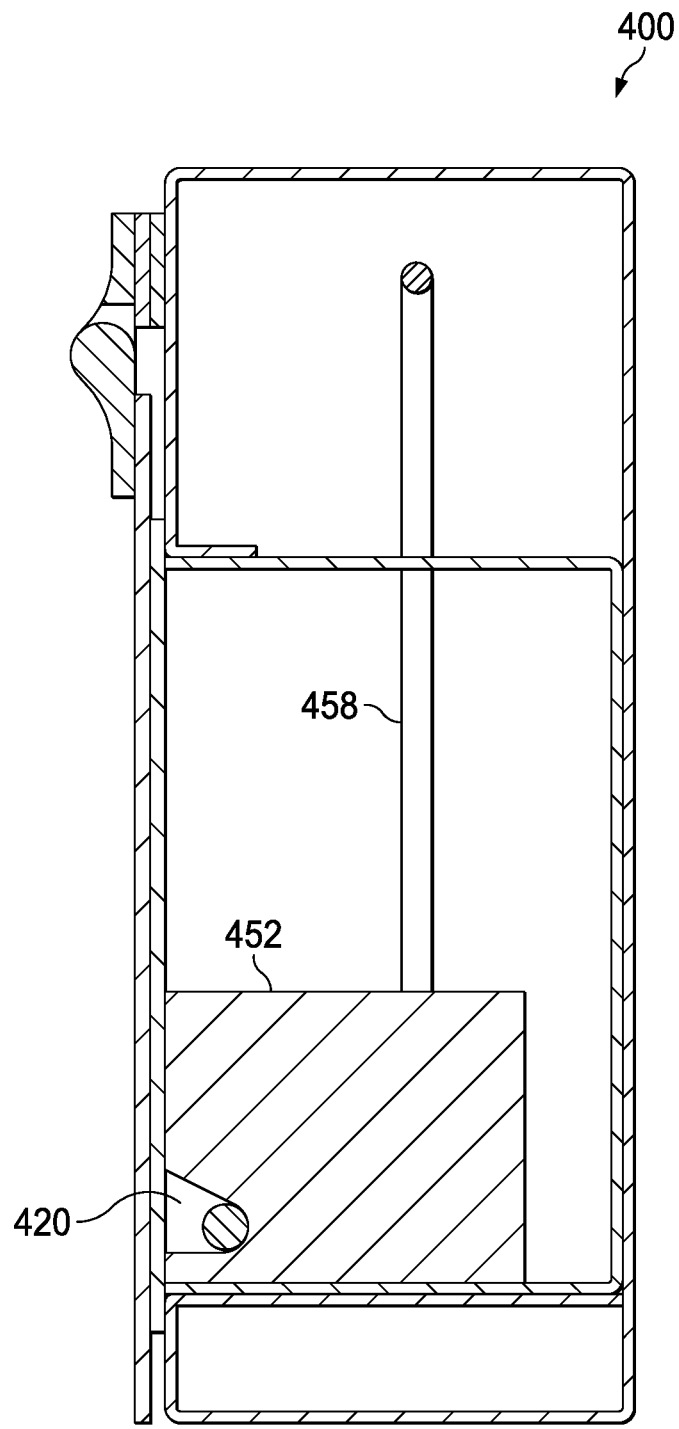
FIG. 23 is a side elevation section view taken through line 23-23 of FIG. 22.
Figure 24:
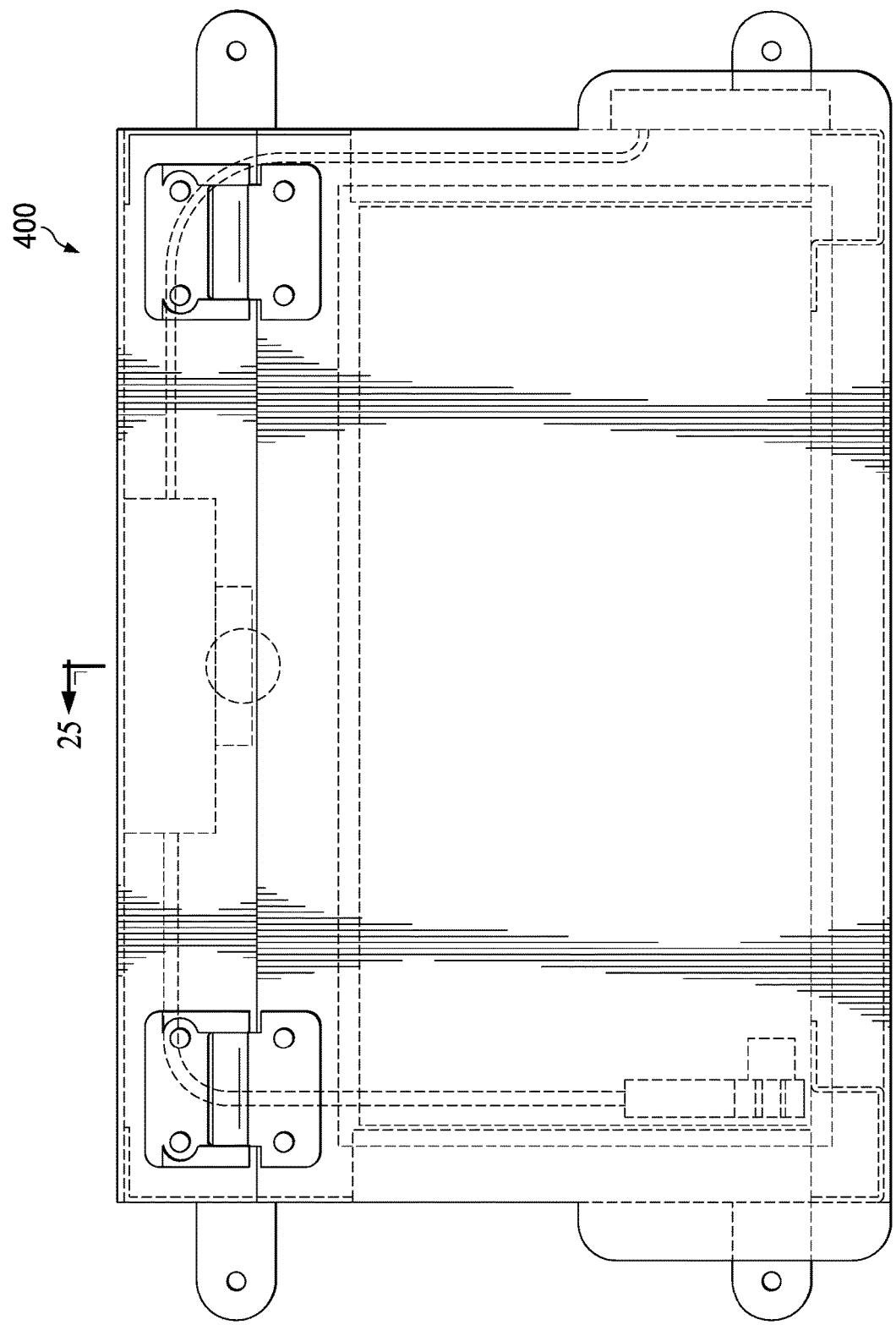
FIG. 24 is a front elevation view of the device of FIG. 18 with transparency.
Figure 25:
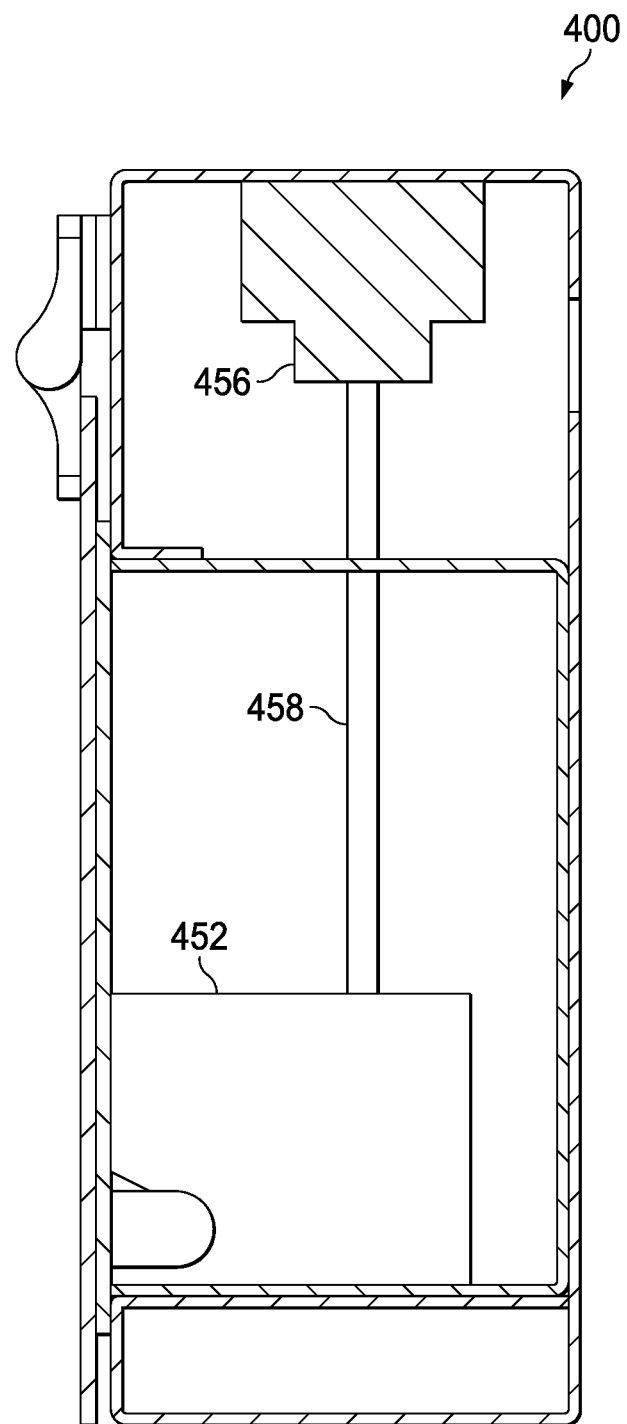
FIG. 25 is a side elevation section view taken through line 25-25 of FIG. 24.

As best shown in FIG. 20, the lip extending around the front of the distribution box 400 may further comprise a number of latches 420. The latches 420 may be configured to temporarily secure the door 414 in the closed position against the housing. The latches 420 may be magnetic devices configured to interact with the door 414 itself, magnets located thereon such that the door 414 is held securely in place against the housing until acted upon by a user, or similar spring-biased mechanical equivalents, for example.

A gasket 432 may be located along the perimeter of the front surface of the housing for the distribution box 400. In exemplary embodiments, the gasket 432 may extend along the lip created by the enclosure 410 and the side panels 412. The gasket 432 may be comprised of a conductive material and may be a foam, tape, pad, or the like. The door 416 may further be provided with additional insulation or electromagnetic shielding material, as at 417. Similarly, an interior enclosure 419 with an open face may be affixed within the enclosure 410 and generally within the box 400, wherein the open face 421 is aligned with the aperture 411. The interior enclosure 419, which surrounds the interior cavity 415, may be used to provide additional electromagnetic insulative capacity to the box 400, and provide a smooth working surface for inventory storage.

A control system 450 is also provided in the exemplary embodiment shown in connection with FIGS. 18-25. In some embodiments, the control system 450 is utilized as an access control or audit system, an inventory tracking system, or a combination thereof. In some embodiments, the distribution box 400 may be configured with an access control or audit system 450 that includes a lock mechanism 452, and authentication mechanism 454, an access control unit 456 and associated communicative coupling means 458. The distribution box 400 may also be provided with a latch 420 secured to the door 416 corresponding to and complementary to said locking mechanism 452, whereupon the door 416 is secured in default a closed position in which the box 400 cannot be opened to access its contents without proper authentication via the authentication means 454.

Depending upon the deployment environment, the authentication means 454 may be provided in a manner conducive and complementary to existing authentication means already in use at a location. For example, a lock access point may be provided which includes an RFID antenna located at a surface of the distribution box 400. The RFID antenna may be configured to communicate with a series of RFID tags 300 (as shown in FIGS. 17A-C, for example), an ID badge, or wrist band, such as the wrist band 460 depicted in connection with FIG. 20. In some embodiments, the authentication means 454 is an RFID antenna secured to the distribution box 400 outside of the shielded envelop of the box 400. When a user wearing an RFID-enabled wrist band 460 or other similar device passes the device 460 in close proximity to the lock access point 454, the RFID antenna receives the ID transmitted by the band 460, and passes the signal via conductive wire 458 to an access control unit 456 for further processing.

An electronic lock mechanism 452 is provided to couple to the door latch 420 to prevent unauthorized access to the contents of the distribution box 400. This lock receives actuation signals from the access control unit 456 via conductive wires 458, which in turn receives and processes inputs from the lock access mechanism 454. In some embodiments, RFID-enabled cards, badges, wrist bands, or bracelets 460 are provided to users, such as hospital staff, and the access control unit 456 is programmed to open the lock mechanism 452 upon a successful scan of a predetermined ID range received at the lock access device 454. In other embodiments, the distribution box 400 may be networked with the RFID inventory box system (see, e.g., FIG. 8) which it may query to determine authorized ID ranges. In the latter case, temporary ID bracelets 460 may be issued, such as for patients, wherein access to a distribution box 400 is restricted to a particular location (e.g., the patient's room) or a particular length of time (e.g., during a hospital stay).

Importantly, the invented distribution box 400 and access control system 450 may be configured to log access to the distribution box 400, either locally in a memory unit of the access control unit 456 or remotely (e.g., 150 in FIG. 8). Therefore, the distribution box 400 ensures an audit trail is created of inventory access at a granular level. A user desiring to view the audit trail may do so by accessing a web portal that provides information about the status and history of items in the box, as well as the users that have accessed the box. The web portal may also be used to change settings, including which users (RFID-enabled cards, wrist bands, or bracelets) are authorized to access the box.

In some embodiments, the lock access mechanism 454 may be configured with other alternative types of access readers, as is desired in a particular application. For example, the lock access mechanism could be provided as an RFID antenna, a biometric reader, a proximity induction-based card reader, a mag-stripe reader, a keypad, or a combination thereof.

In some cases, the distribution box 400 may further include an internal RFID antenna as part of the access control unit 456 for tracking and logging inventory items present both before and after an access event. While the box 400 may be configured with a targeted RF leak at the location of the lock access mechanism 454, exemplary embodiments may include two antennas (internal and external) shielded from one another to track box access and inventory levels. Network access, power source or both for the access control unit 456 may be achieved, for example, via an Ethernet pass-through 462 in the housing 410. Those skilled in the art will appreciate that, while an exemplary configuration of the lock 452 and latch 420 mechanism, lock access reader mechanism 454, access control unit 456 and pass-through 462 is shown in connection with FIGS. 18-25, other suitable configurations are possible without departing from the scope of the instant invention as needed for a particular application. Those skilled in the art will also appreciate that in other exemplary embodiments the box 400 may include a mechanical lock that can be accessed with a physical key in addition to the lock access mechanism. The mechanical lock may provide secondary security or be configured to override the lock access mechanism 454. In such an embodiment, the key may be used to open the box when the power is out.

The components of the distribution box 400, including but not limited to the enclosure 410 and the side panels 412, may be fastened, welded, adhered, or otherwise secured in their respective locations preferably by conductive materials. Conductive tape or other conductive material may be additionally placed along the seams of the components of the RFID box 400 so as to minimize RFID leakage. These components may be comprised of a metallic, conductive material such as, but not limited to, aluminum. Specifically, they may be comprised of ⅛" thick aluminum, though any thickness is contemplated. The use of a conductive material may serve to substantially electromagnetically "seal" the distribution box 400 thus minimizing RFID leakage, which thereby ensures accuracy in RFID readings by ensuring that an RFID antenna and RFID antenna/reader only detect RFID signals being emitted from within the RFID box 400 for accuracy and efficacy in inventory tracking procedures.

Figure 26:
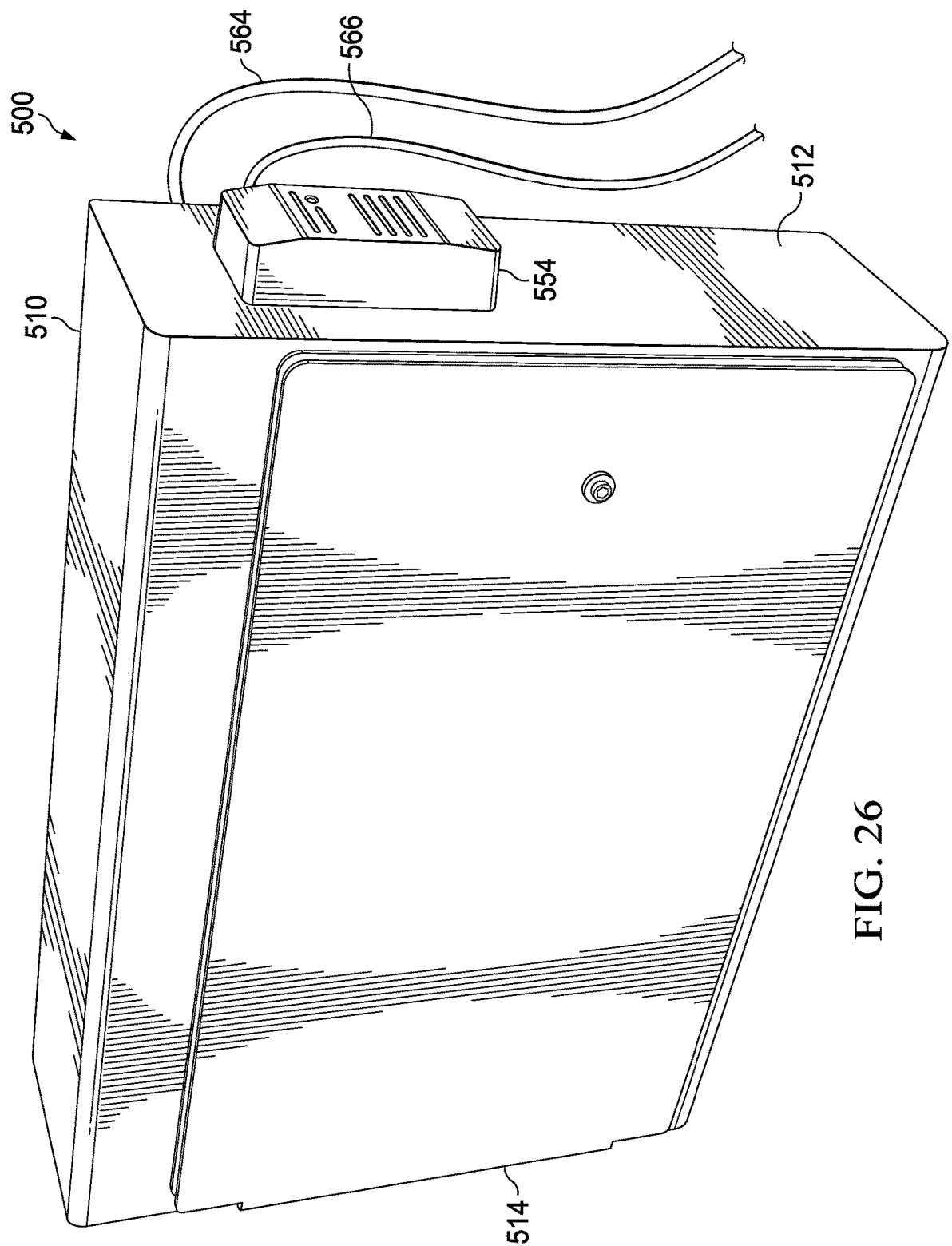
FIG. 26 is a perspective view of a further exemplary RFID distribution box.
Figure 28:
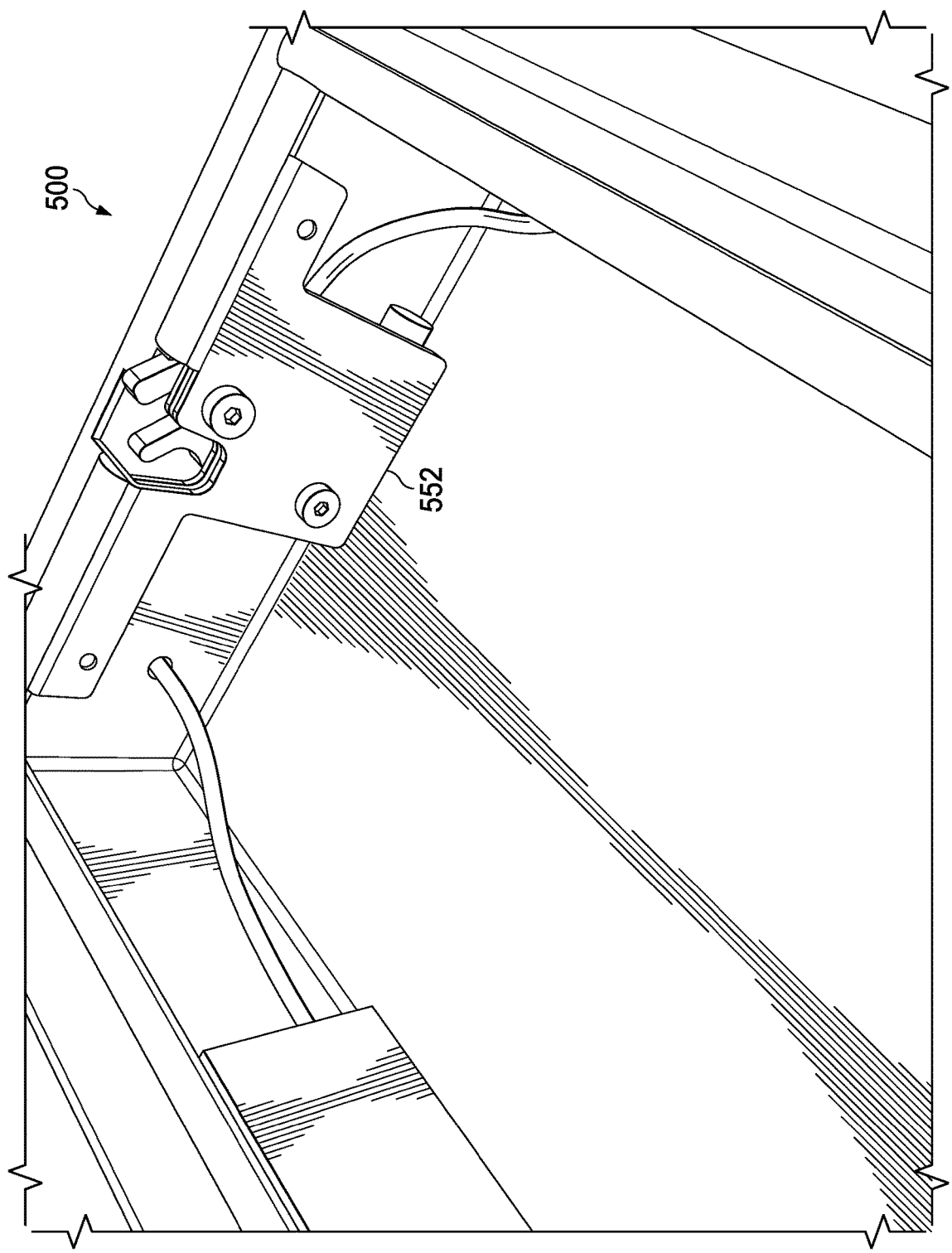
FIG. 28 is another perspective view of the device of FIG. 26.
Figure 29:
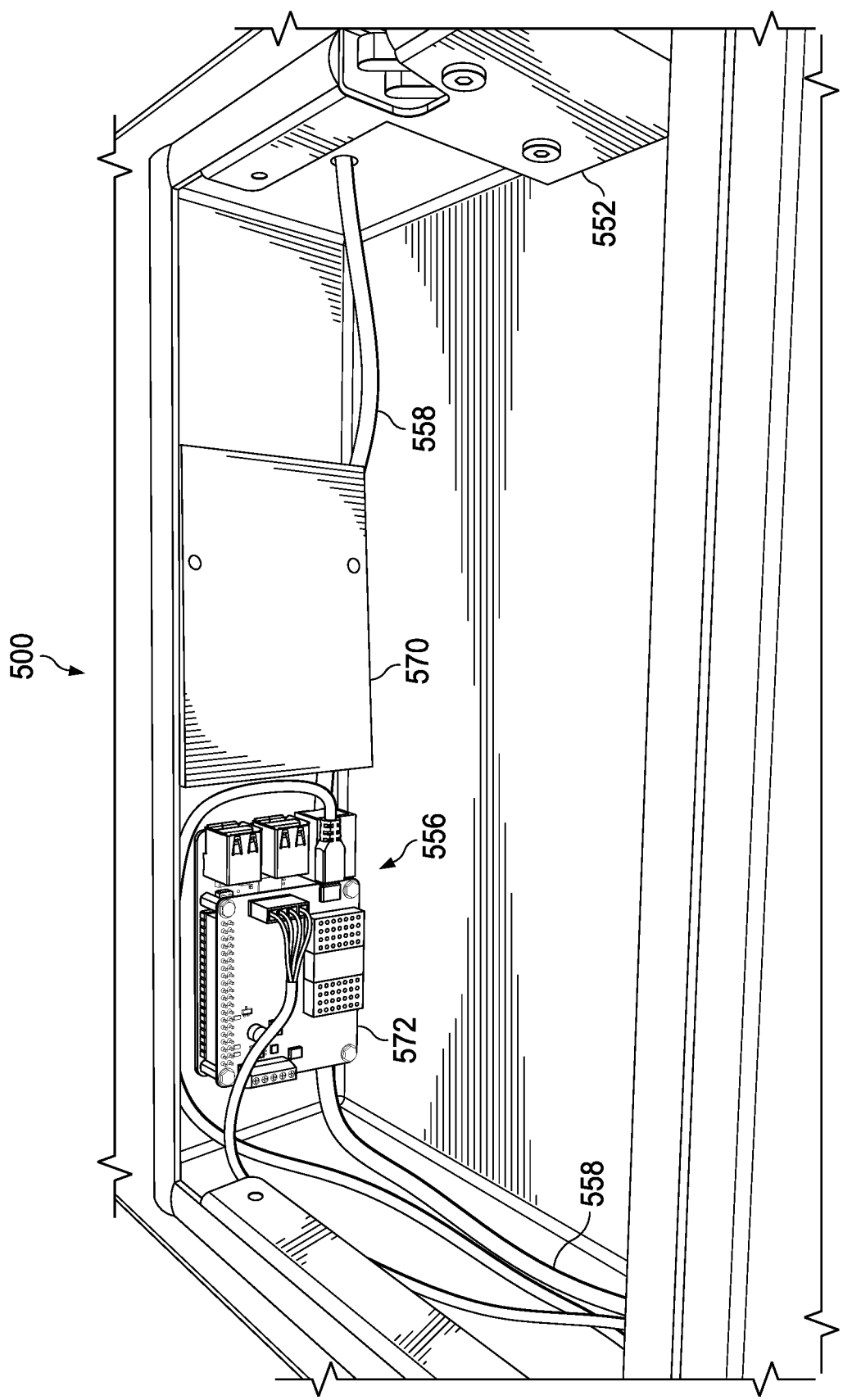
FIG. 29 is another perspective view of the device of FIG. 26.
Figure 30:
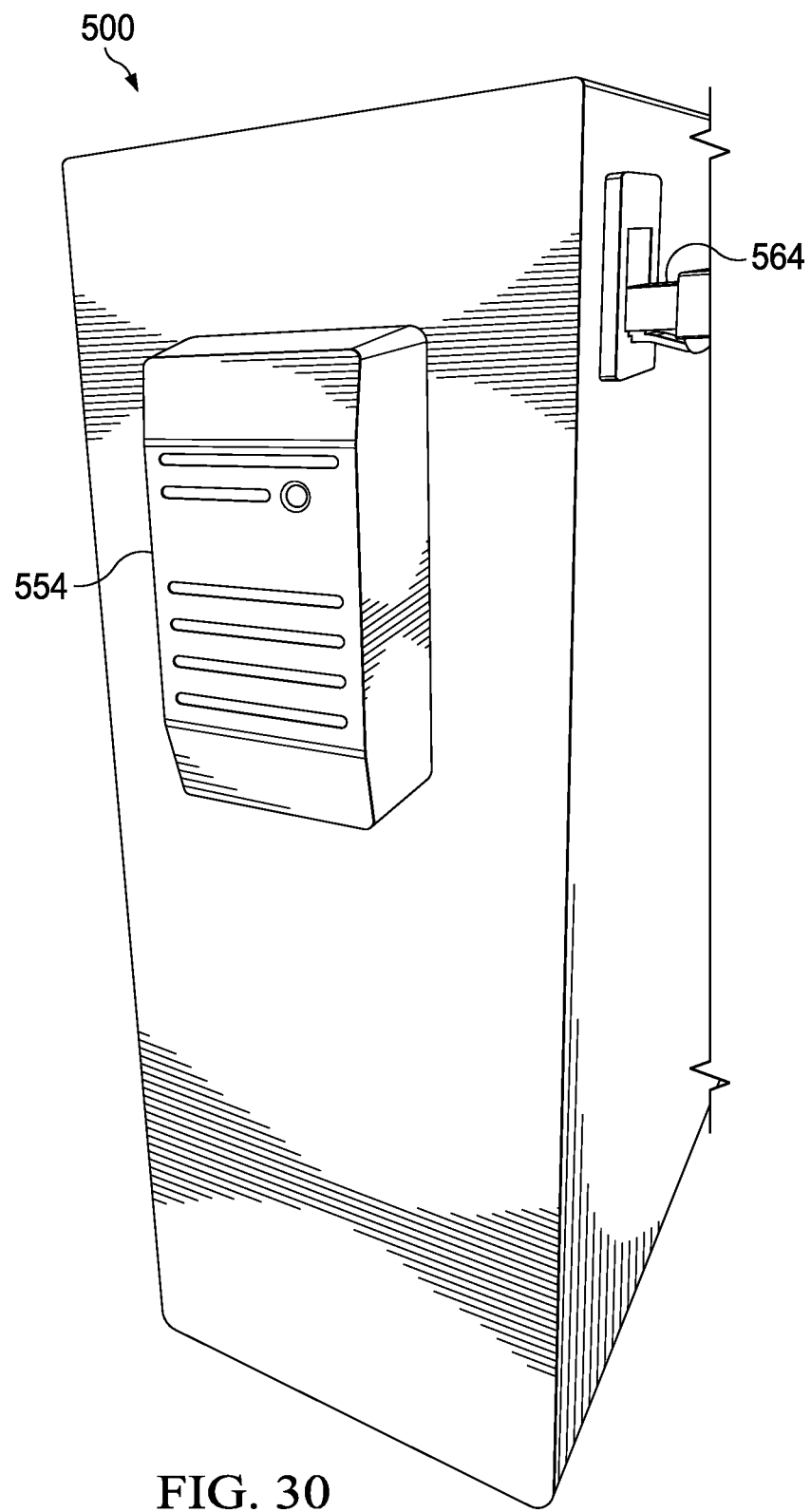
FIG. 30 is another perspective view of the device of FIG. 26.

A second exemplary embodiment of a distribution box 500 and its components are shown in connection with FIGS. 26-33. FIG. 26 depicts the exterior of the exemplary box 500, which is formed of a C-shaped housing 510, side panels 512 and a door 514. A lock access mechanism 554 is mounted to the side panel 512, and in this embodiment is an HID-brand proximity card reader unit. In other embodiments, other alternative access mechanisms may be substituted or used in conjunction with such an element as discussed above. Ethernet 564 and power 566 are shown leading to the control unit 556 inside of the enclosure 510. FIG. 30 also depicts the box 500 from a rearward side perspective, and illustrates the entry point of the network cable 564 and mounted reader unit 554.

Figure 27:
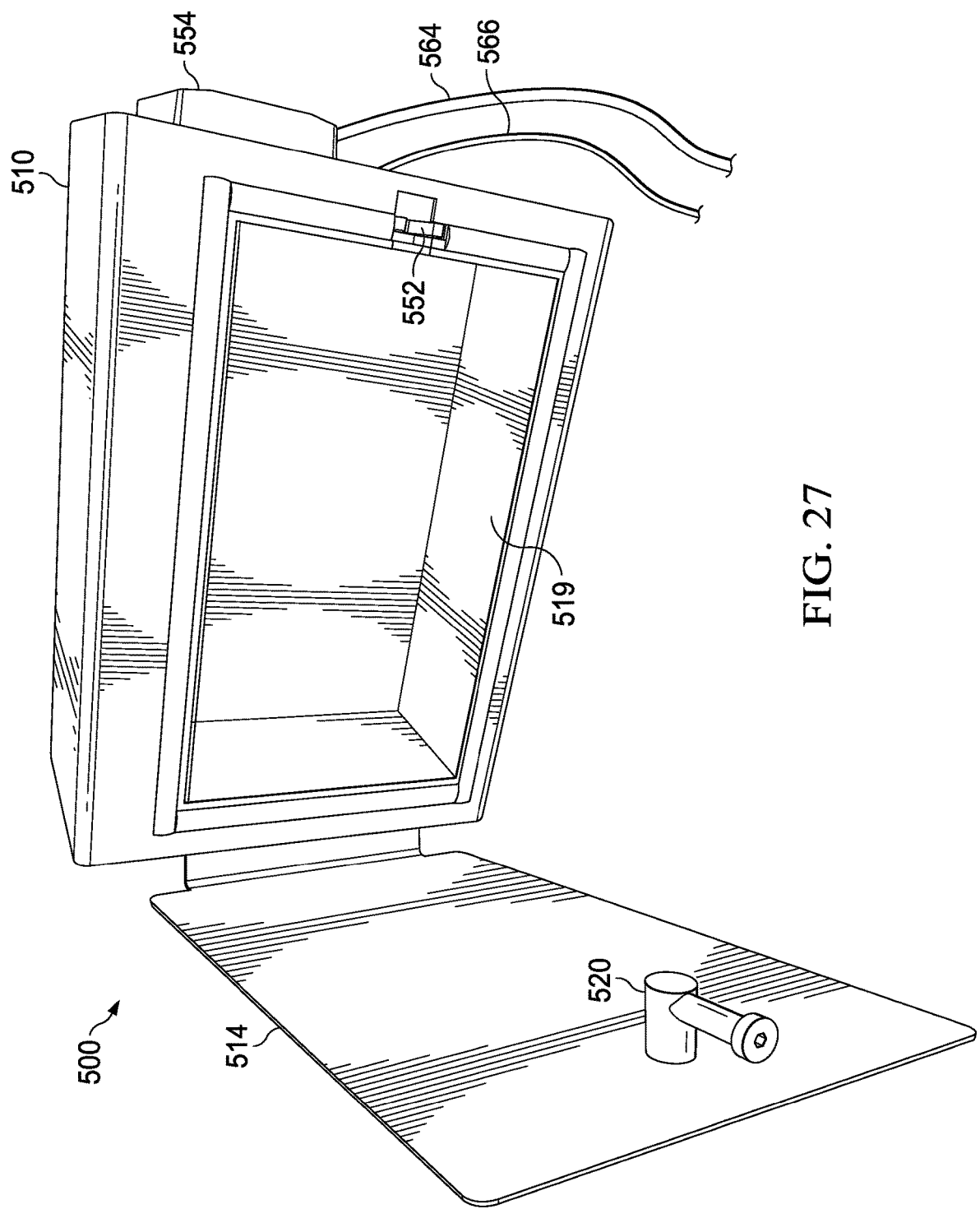
FIG. 27 is a further perspective view of the device of FIG. 26.

FIG. 27 illustrates the box 500 with the door 514 in the open position, hinged to the left side of the enclosure 510. The latch 520 is fixed to the right side of the door 514 in a position for complementary mating registration with the electronic latch 552 secured to the box 500 at the lower end of the right side panel 512, below the access reader unit 554. An interior enclosure 519 with an open face is affixed within the enclosure 510 and generally within the box 500. FIG. 28 is a perspective view of the right interior side of the box 500 with the interior enclosure removed. The electronic lock strike 552 is shown mounted therein.

Figure 31:
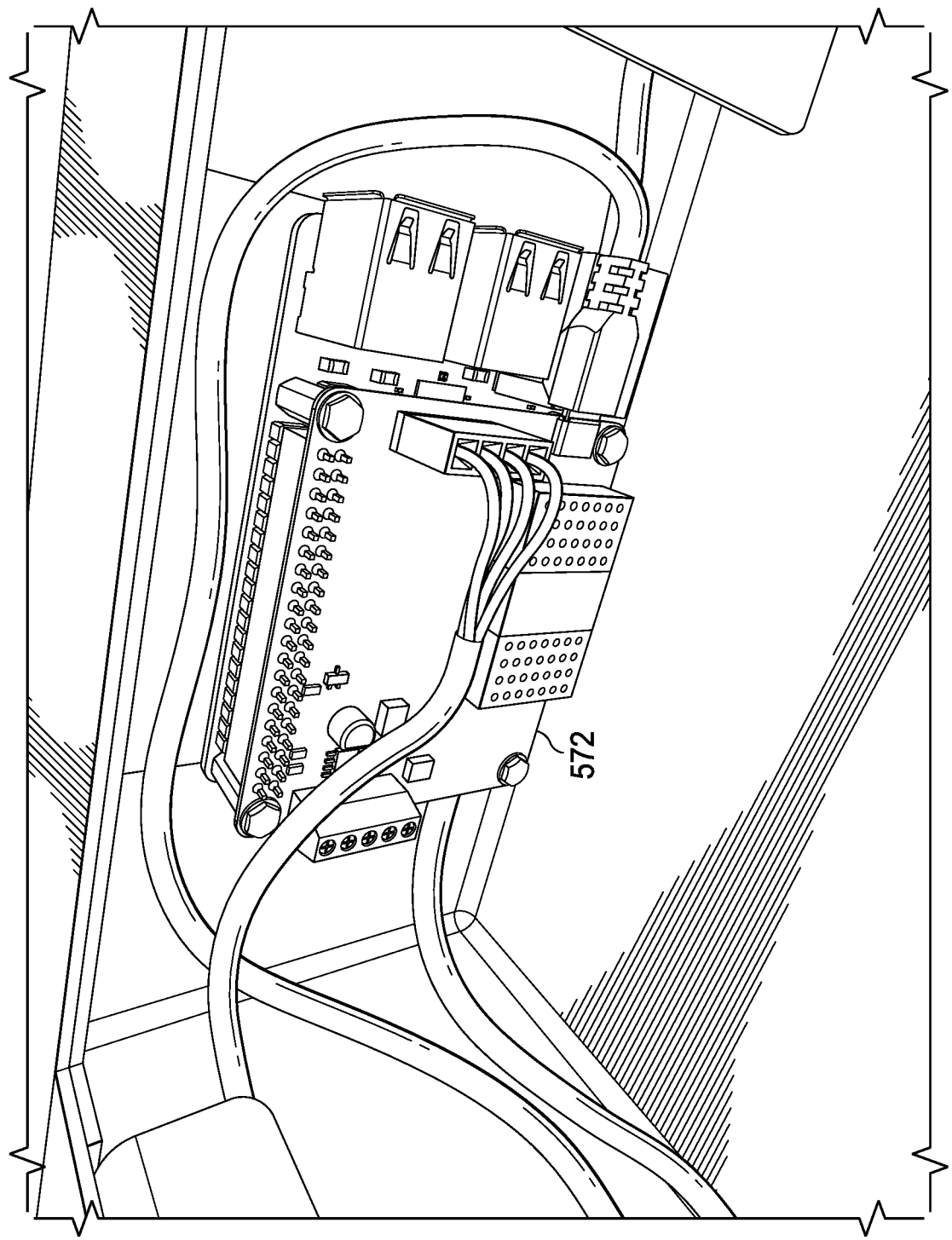
FIG. 31 is another perspective view of the device of FIG. 26.

FIG. 29 is a further perspective view of the interior of the box 500 with the interior enclosure 519 removed, primarily focused on the upper portion of the box interior. Here, the elements of the access control unit 556 can be seen, as well as electric connections 558 coupling the components of the control system generally. In this exemplary embodiment, the control unit of the box 500 can be seen to include a processing unit 570, a lock mechanism 552, connections 558, RFID reader 572 and access reader unit 554. In this embodiment, the box 500 is provided with a ThingMagic M6E-MICRO RFID reader unit 572, which is used to receive RFID signals from inventory items and kit baskets placed within or removed from the box 500. The processing unit 570 utilizes a Raspberry Pi 3 Model B Motherboard for processing the RFID information received from the reader 572 and the access reader unit 554, and handling network communications and lock mechanism 552 actuation. FIG. 31 shows a second view of the reader unit 572 for clarity.

Figure 32:
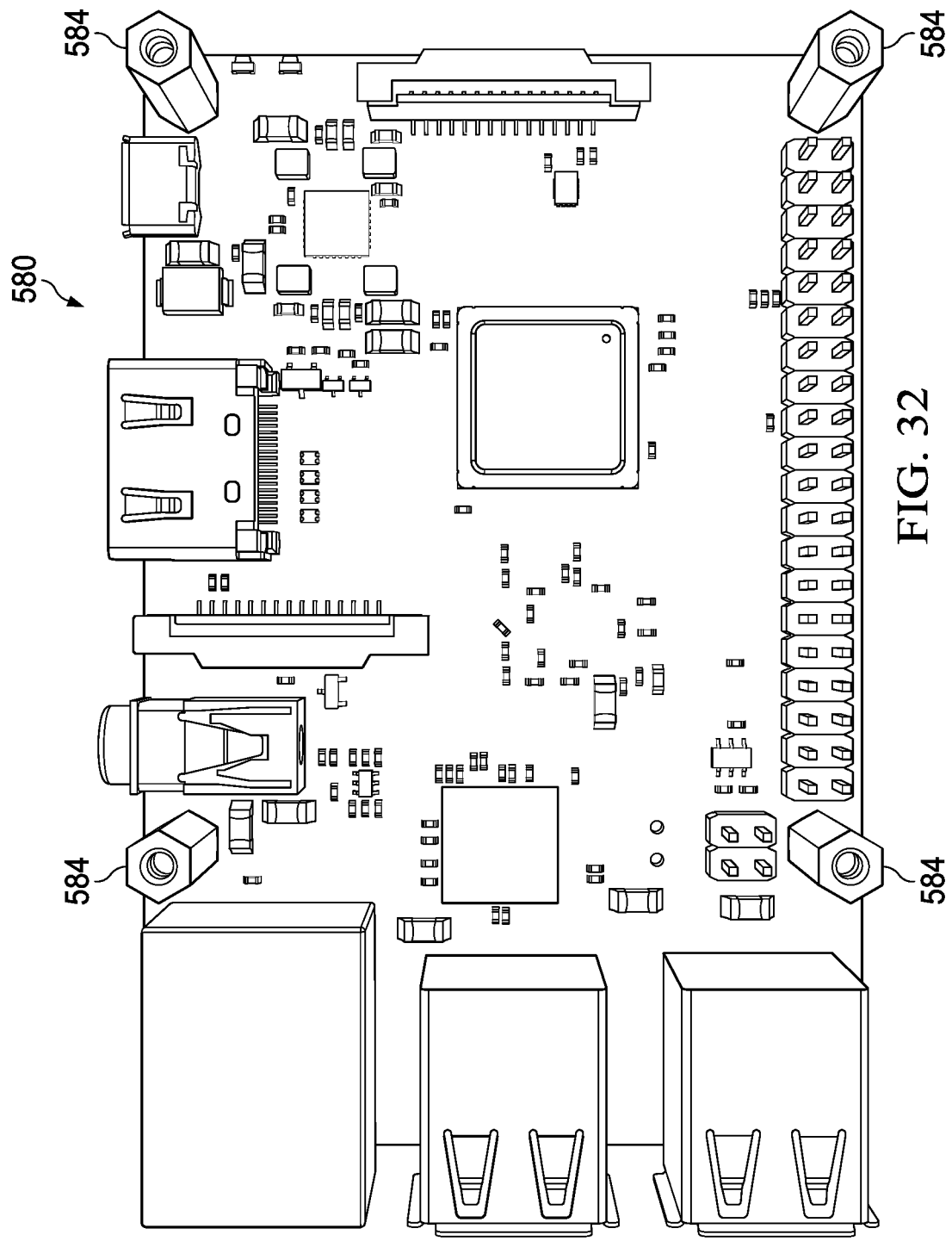
FIG. 32 is a plan view of an element of a process control unit of the device of FIG. 26.
Figure 33:
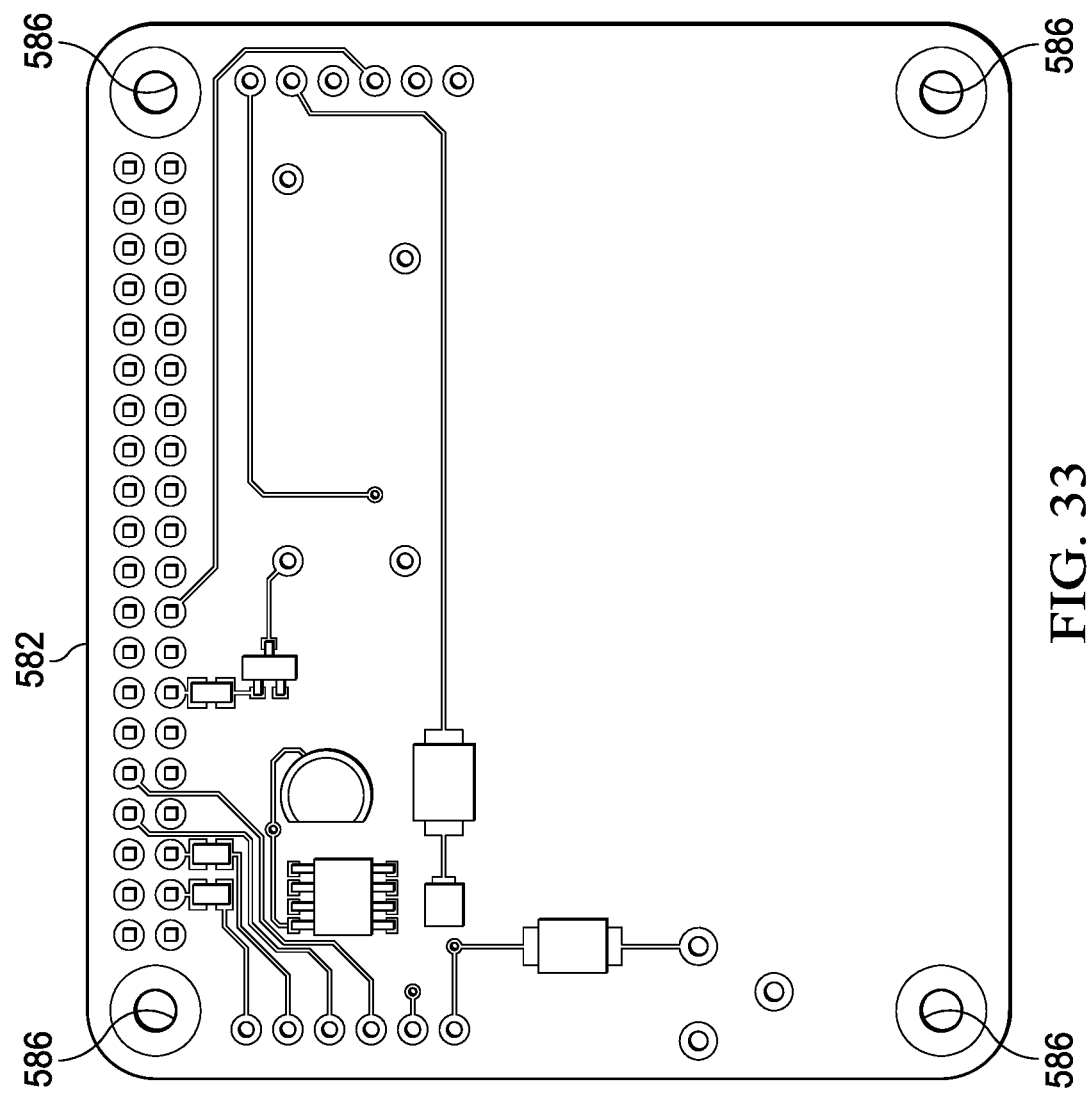
FIG. 33 is a plan view of an element of a process control unit of the device of FIG. 26.

FIGS. 32 and 33 depict components of the processing unit 570 used in this exemplary embodiment. The Raspberry Pi 3 Model B Motherboard 580 is shown in FIG. 32, and a daughter card 582 is shown in FIG. 33. The daughter card 582 is secured to the motherboard 580 via threaded fasteners (not shown) screwed into the threaded mounts 584 on the motherboard, via apertures 586 in the daughter card. The daughter card provides the necessary circuitry for actuation of the lock mechanism 552 with suitable boosts to voltage.

In certain embodiments, the processing unit 570 allows for local processing of authorization requests and comparison of baseline information against inventory scans. While changes in user roles and changes to baseline information may be effected through a web portal, the box 500 can perform many operations locally, allowing it to maintain operability even when network/internet connection is unavailable.

Figure 34:
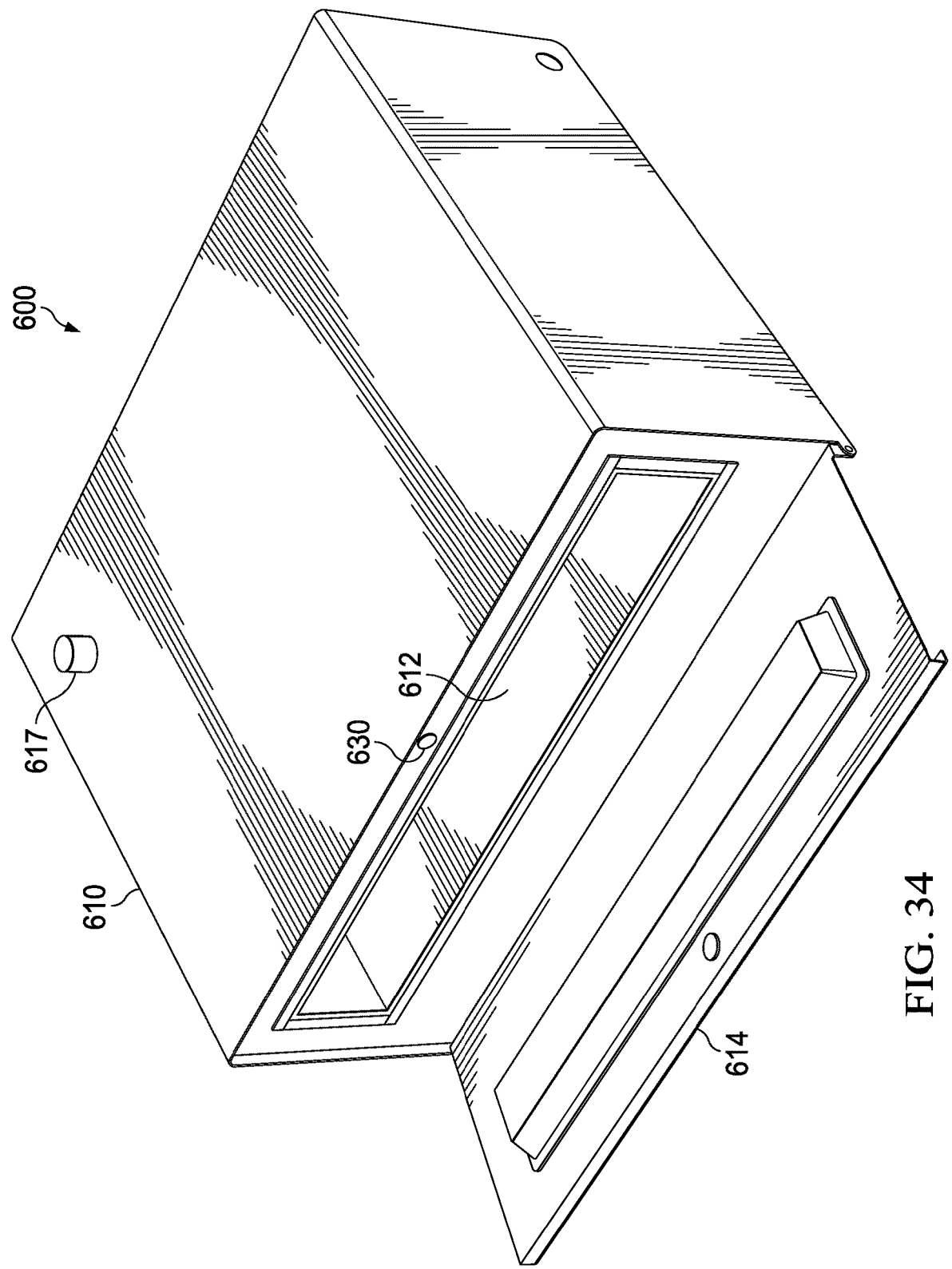
FIG. 34 is a perspective view of a further exemplary RFID distribution box.
Figure 35:
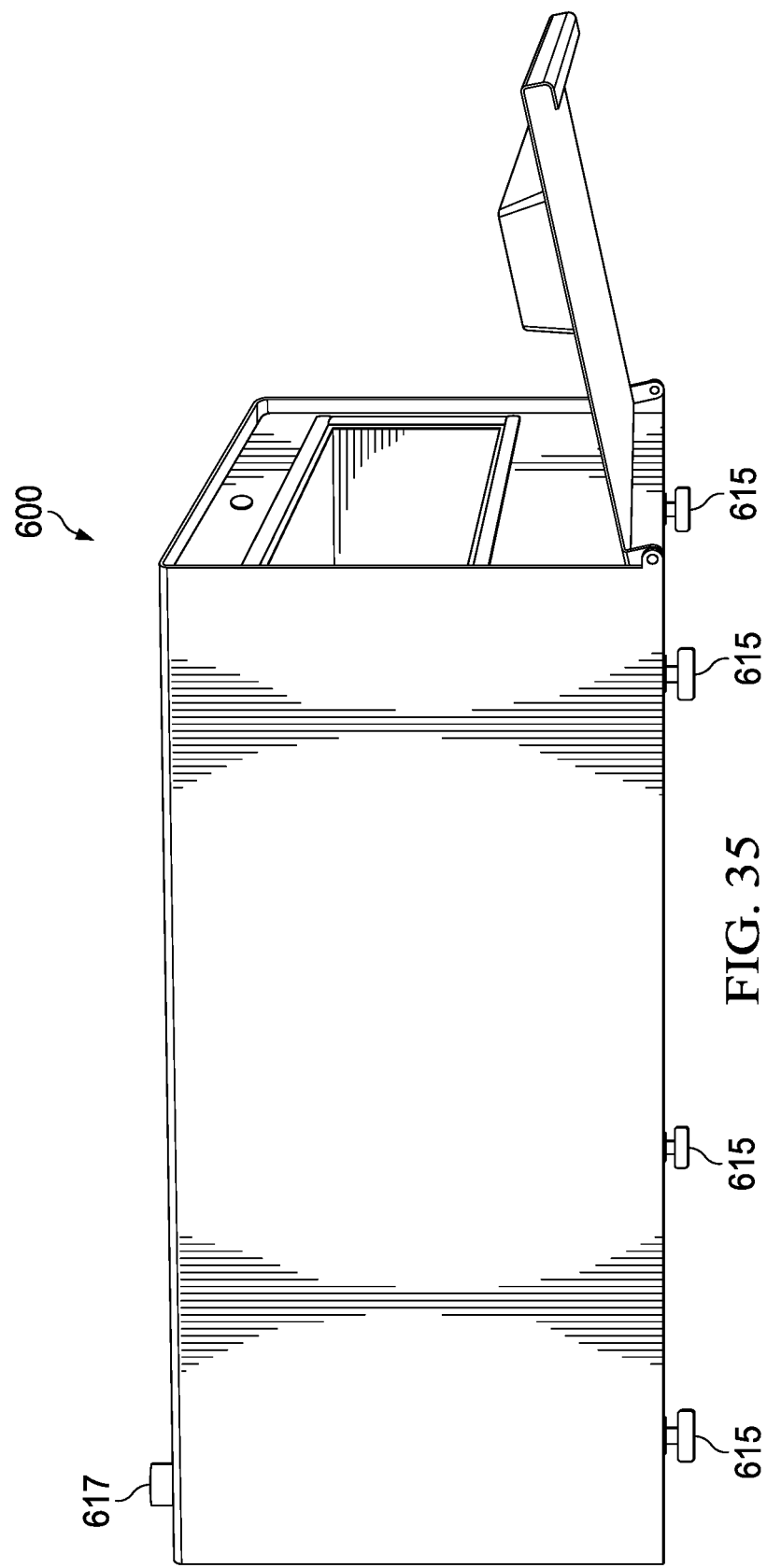
FIG. 35 is another perspective view of the device of FIG. 34.
Figure 36:
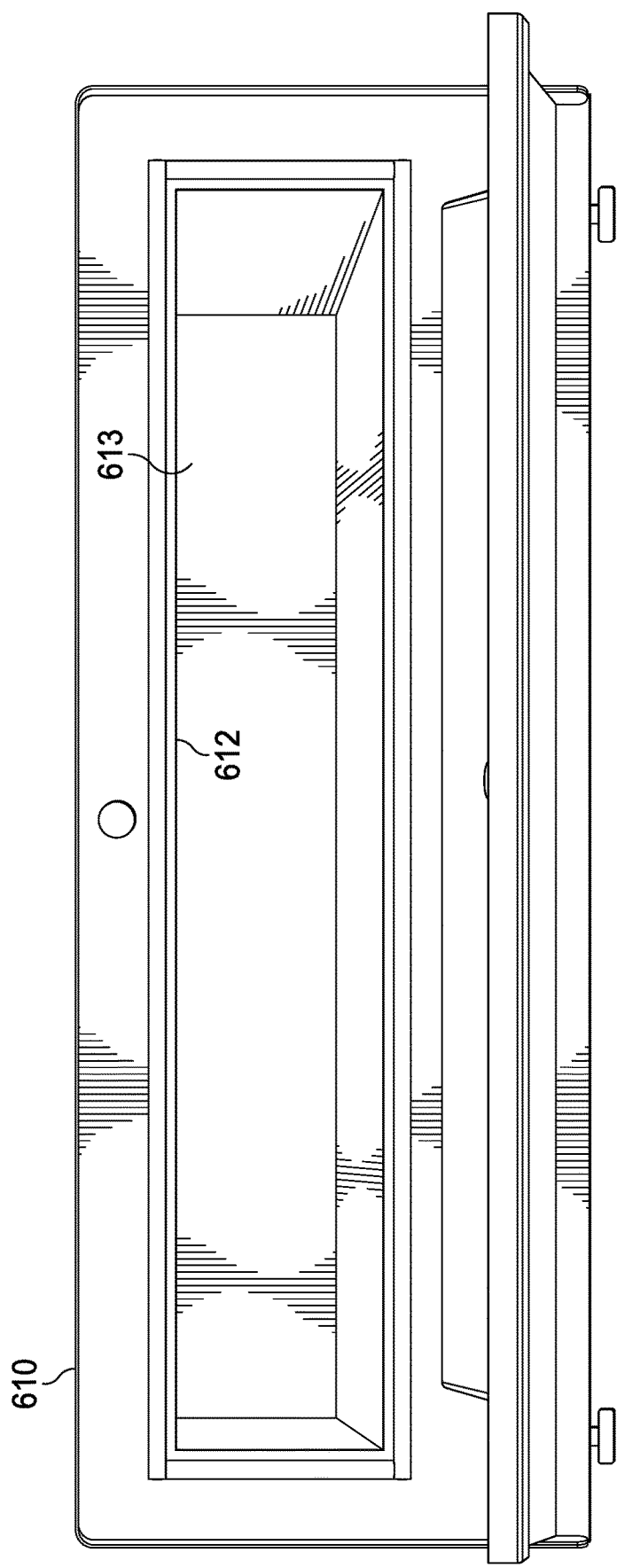
FIG. 36 is a front elevation view of the device of FIG. 34.
Figure 37:
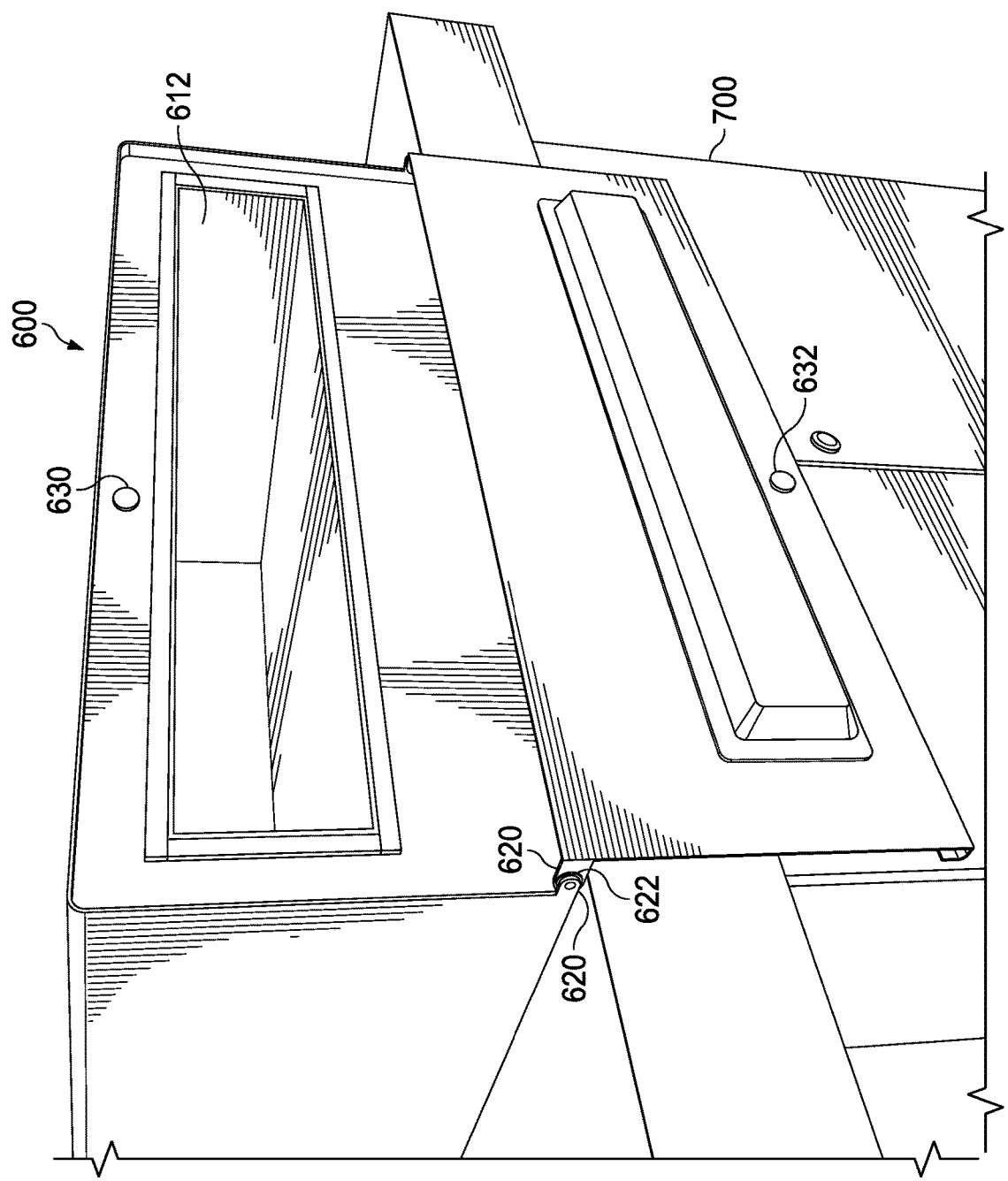
FIG. 37 is another perspective view of the device of FIG. 34.

Another embodiment of a distribution box 600 having different shape and size is shown in connection with FIGS. 34 through 37. FIG. 34 depicts the exterior of the exemplary box 600, which is formed of a housing 610 and a door 614. In this embodiment, and as best seen in FIG. 37, the door hinges are comprised of tabs 620 formed from the same sheets of metal as the door and cabinet, with a bearing 622 in-between, providing for a seamless appearance. A lock access mechanism (not shown) and card reader unit (not shown) may be mounted to the housing 610 as desired. An interior enclosure 612 defines an interior cavity 613 for receiving items. The box and cavity may be sized to receive a single tray containing pharmaceutical items and/or other items. In an exemplary embodiment, the dimensions of the interior cavity 613 may be 24.5 inches in width, 3.875 inches in height, and 16.7 inches in depth. Of course, in other embodiments the dimensions of the interior cavity 613 may vary as desired. While this embodiment could be attached to a wall, it may also be placed on a surface such as a counter top or on top of a cabinet 700, as shown in FIG. 37. In some embodiments the box may contain bottom brackets allowing it to be secured to surface. The compact nature of the box allows it to be used in locations that may have little space available, such as a fire station.

As shown in FIGS. 35 and 36, the box 600 has four adjustable feet 615, each located at a bottom corner of the box, which may be adjusted as necessary to allow the box 600 to be level or avoid wobbling when in use.

The box 600 may have a status light 617 located on the housing. The status light 617 may display one or more colors that communicate information to a user. In an exemplary embodiment, the light can turn green, orange and red. When a scan reveals that all items are present, and all items are unexpired, the light 617 may be green. A user can take one look at the box and upon seeing the green light know that there is no need to replace any expired items, and that all items are present. The light 617 turns orange when one or more items are expired, providing a visual notification to the user that restocking is necessary. When the scan indicates that according to baseline box content data an item is missing, the box may turn red, again providing a visual notification to the user that restocking is necessary and possibly a review of the audit records is necessary as well to see what user removed the item. Of course, in different embodiments, the light may be configured in different ways. The light may be an LED light in electronic communication with the motherboard 580. The box 600 may be powered by PoE (power over ethernet) or other means. An ethernet port may be located on its back side or other surface. In some embodiments, the box may include a battery to allow it to remain operable when the power goes out or during transport.

This embodiment may have a mechanical lock in addition to the lock operated by the lock access mechanism. The mechanical lock may be completely separate to and provide a secondary level of security to the lock access mechanism. This may allow for increased security. The mechanical lock may also be configured to override the lock access mechanism in times when the power is out or in other emergency situations.

Different embodiments may also have a display screen integrated into the box itself to provide written notifications to users. For example, the screen may display the name of a pharmaceutical item that has expired along with its expiration date. In some embodiments, the screen may display the name of the last user that has accessed the box. The screen may be sized such that it can only provide a few words to a user or it may be larger and even have touch-screen capabilities to allow users to configure settings, enter queries, or otherwise obtain information about contents and access history.

It will be appreciated by one of ordinary skill in the art that a box shaped like the embodiment in FIGS. 34 through 37 may contain many of the features shown in other embodiments of the figures as desired to provide a convenient solution to a consumer.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A device for scanning and tracking RFID-tagged inventory comprising:
   a housing surrounding an interior cavity, said housing having a front side with an aperture for receiving one or more items into said interior cavity;
   a door, said door adapted for movement between an open position allowing access to said interior cavity and a closed position preventing access to said interior cavity;
   at least one RFID antenna located within said interior cavity; said antenna configured to communicate with one or more RFID tags;
   at least one RFID antenna/reader located within said interior cavity; said antenna/reader configured to communicate with one or more RFID tags;
   a processor, said processor in electronic communication with said at least one RFID antenna and said at least one RFID antenna/reader; and
   at least two guide rails adapted to support an inventory container that contains RFID-tagged inventory, said at least two guide rails located on an interior bottom surface of said inner cavity such that said at least one RFID antenna is positioned between said at least two guide rails on said interior bottom surface of said inner cavity and further such that said at least two guide rails are adapted to keep an inventory container that contains RFID-tagged inventory above said at least one RFID antenna to limit inadvertent contact with said at least one RFID antenna;
   wherein, said processor is adapted to instruct said at least one RFID antenna and said at least one RFID antenna/reader to perform a scan to identify items present in said interior cavity.

2. The device of claim 1, wherein said housing is comprised of a c-shaped enclosure and a pair of side panels.

3. The device of claim 1, wherein said door is biased in said open position.

4. The device of claim 1, wherein said door further comprises at least one tab that protrudes beyond the side panels.

5. The device of claim 1, wherein said door further comprises a lip around at least a portion of said aperture.

6. The device of claim 1, further comprising at least one locking mechanism for securing said door in said closed position.

7. The device of claim 6, wherein said device further comprises a lock access mechanism in communication with said at least one locking mechanism, said lock access mechanism able to communicate requests for access to said processor.

8. The device of claim 7, wherein said processor is in communication with a memory for storing an audit trail of users that obtain access to said interior cavity.

9. The device of claim 1, further comprising a light protruding from the surface of said housing, said light having at least one status that represents a notification for a user.

10. The device of claim 1, further comprising at least one bracket for securing said device to a wall.

11. The device of claim 1, wherein an interior enclosure comprised of electromagnetic shielding material is affixed within said housing and surrounds said interior cavity.

12. The device of claim 1, wherein access information is communicated from said processor to a cloud based web server for eventual display on a user device.

13. The device of claim 1, wherein said antenna/reader is able to receive information from a plurality of RFID tags placed on items located in said interior cavity.

14. A system for scanning and tracking RFID-tagged inventory, comprising:
a box for receiving one or more items, said box comprised of a housing that defines an opening, an interior enclosure located within said opening and comprised of electromagnetic shielding material, an antenna located within said opening and capable of communicating with one or more RFID tags, an antenna/reader located within said opening and capable of transmitting information received from said one or more RFID tags to a processor, and at least two guide rails adapted to support an inventory container that contains RFID-tagged inventory, said at least two guide rails located on an interior bottom surface of said interior enclosure such that said antenna is positioned between said at least two guide rails on said interior bottom surface of said interior enclosure and further such that said at least two guide rails are adapted to keep an inventory container that contains RFID-tagged inventory above said antenna to limit inadvertent contact with said antenna;
a server, said server located remotely from said box and in wireless communication with said processor;
one or more RFID tags, each of said one or more RFID tags adapted to be applied to an item, each of said RFID tags display unique identifying information.

15. The system of claim 14, wherein said processor is capable of receiving baseline data from said server, and comparing said baseline data against information received from said one or more RFID tags.

16. The system of claim 14, wherein said unique identifying information comprises an identification number.

17. The system of claim 14, wherein said unique identifying information comprises a bar code.

18. The system of claim 14, wherein said processor restricts access to said interior enclosure.

19. The system of claim 14, wherein said box further comprises mounting brackets for securing said box to a wall.

* * * * *